US008032860B2

(12) United States Patent
Piehler et al.

(10) Patent No.: US 8,032,860 B2
(45) **Date of Patent: *Oct. 4, 2011**

(54) METHODS FOR TYPE-INDEPENDENT SOURCE CODE EDITING

(75) Inventors: Britton Worth Piehler, Seattle, WA (US); Kevin Zatloukal, Cambridge, MA (US); David Glen Garber, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1034 days.

This patent is subject to a terminal disclaimer.

(21) Appl. No.: 10/785,787

(22) Filed: Feb. 24, 2004

(65) Prior Publication Data

US 2005/0114771 A1 May 26, 2005

Related U.S. Application Data

(60) Provisional application No. 60/449,984, filed on Feb. 26, 2003.

(51) Int. Cl.
*G06F 9/44* (2006.01)
*G06F 9/45* (2006.01)

(52) U.S. Cl. ........................................ 717/110; 717/140

(58) Field of Classification Search ........................ None
See application file for complete search history.

(56) References Cited

U.S. PATENT DOCUMENTS 5,321,841 A 6/1994 East et al.
5,469,562 A 11/1995 Saether
5,604,860 A 2/1997 McLaughlin ................ 715/866
5,630,131 A 5/1997 Palevich ...................... 717/108
5,748,975 A 5/1998 Van De Vanter
5,801,958 A 9/1998 Dangelo et al.
5,835,769 A 11/1998 Jervis et al.

(Continued)

FOREIGN PATENT DOCUMENTS

CA 2 248 634 A1 3/2000

(Continued)

OTHER PUBLICATIONS

R. A. Kilgore, Multi-Language, Open-Source Modeling Using the Microsoft .NET Architecture, 2002, IEEE, pp. 629-633.*

(Continued)

*Primary Examiner* — Tuan Dam
*Assistant Examiner* — Ben Wang
(74) *Attorney, Agent, or Firm* — Squire, Sanders & Dempsey (US) LLP

(57) ABSTRACT

An extensible, data-driven, language independent source code editor is presented, with an embedded, extensible multi-language compiler framework. Such an editor can be tightly integrated with a compiler framework that provides detailed information about the language currently being edited by the user. This information can be provided in a language-neutral way effectively decoupling the editor from the underlying set of languages being edited. In addition, a language-independent editor can expose a set of APIs that makes it easy to customize behavior for specific languages that have characteristics not shared by most languages. This set of APIs can also enable the development of customized views, such as for developing visual editors that represent and allow the user to manipulate aspects of the source code pictorially.
This description is not intended to be a complete description of, or limit the scope of, the invention. Other features, aspects, and objects of the invention can be obtained from a review of the specification, the figures, and the claims.

38 Claims, 3 Drawing Sheets

100

U.S. PATENT DOCUMENTS

| | | | | |
|---|---|---|---|---|
| 5,836,014 | A | 11/1998 | Faiman | |
| 5,867,822 | A | 2/1999 | Sankar | 705/8 |
| 5,944,794 | A | 8/1999 | Okamoto | |
| 5,961,593 | A | 10/1999 | Gabber et al. | |
| 5,966,535 | A | 10/1999 | Benedikt et al. | |
| 6,012,083 | A | 1/2000 | Savitzky | 709/202 |
| 6,016,495 | A | 1/2000 | McKeehan | |
| 6,018,730 | A | 1/2000 | Nichols | 706/45 |
| 6,023,578 | A | 2/2000 | Birsan | 717/105 |
| 6,028,997 | A | 2/2000 | Leymann et al. | |
| 6,029,000 | A | 2/2000 | Woolsey et al. | |
| 6,044,217 | A | 3/2000 | Brealey et al. | |
| 6,067,623 | A | 5/2000 | Blakley, III et al. | |
| 6,070,184 | A | 5/2000 | Blount | 709/200 |
| 6,092,102 | A | 7/2000 | Wagner | 340/7.29 |
| 6,119,149 | A | 9/2000 | Notani | |
| 6,141,701 | A | 10/2000 | Whitney | 710/5 |
| 6,148,336 | A | 11/2000 | Thomas | |
| 6,185,734 | B1 | 2/2001 | Saboff | |
| 6,212,546 | B1 | 4/2001 | Starkovich | 709/203 |
| 6,222,533 | B1 | 4/2001 | Notani | 715/733 |
| 6,226,675 | B1 | 5/2001 | Meltzer et al. | |
| 6,230,287 | B1 | 5/2001 | Pinard et al. | |
| 6,230,309 | B1 | 5/2001 | Turner | |
| 6,237,135 | B1 | 5/2001 | Timbol | |
| 6,243,737 | B1 | 6/2001 | Flanagan | 709/202 |
| 6,292,932 | B1 | 9/2001 | Baisley | 717/114 |
| 6,311,327 | B1 | 10/2001 | O'Brien | |
| 6,330,569 | B1 | 12/2001 | Baisley | 707/203 |
| 6,334,114 | B1 | 12/2001 | Jacobs | |
| 6,338,064 | B1 | 1/2002 | Ault et al. | |
| 6,343,265 | B1 | 1/2002 | Glebov | 703/25 |
| 6,353,923 | B1 | 3/2002 | Bogle et al. | |
| 6,360,358 | B1 | 3/2002 | Elsbree | |
| 6,367,068 | B1 * | 4/2002 | Vaidyanathan et al. | 717/143 |
| 6,377,939 | B1 | 4/2002 | Young | 705/34 |
| 6,408,311 | B1 | 6/2002 | Baisley | 707/203 |
| 6,411,698 | B1 | 6/2002 | Bauer | 379/207.01 |
| 6,445,711 | B1 | 9/2002 | Scheel | 370/402 |
| 6,470,364 | B1 | 10/2002 | Prinzing | 715/530 |
| 6,516,322 | B1 | 2/2003 | Meredith | |
| 6,560,769 | B1 | 5/2003 | Moore | 717/100 |
| 6,567,738 | B2 | 5/2003 | Gopp | 701/109 |
| 6,584,454 | B1 | 6/2003 | Hummel | |
| 6,594,693 | B1 | 7/2003 | Borwankar | |
| 6,594,700 | B1 | 7/2003 | Graham | 709/230 |
| 6,601,113 | B1 | 7/2003 | Koistinen | |
| 6,604,198 | B1 | 8/2003 | Beckman et al. | |
| 6,609,115 | B1 | 8/2003 | Mehring | |
| 6,615,258 | B1 | 9/2003 | Barry | |
| 6,636,491 | B1 | 10/2003 | Kari | |
| 6,637,020 | B1 | 10/2003 | Hammond | 717/107 |
| 6,643,652 | B2 | 11/2003 | Helgeson | 707/10 |
| 6,654,932 | B1 | 11/2003 | Bahrs | 715/507 |
| 6,662,357 | B1 | 12/2003 | Bowman-Amuah | |
| 6,678,518 | B2 | 1/2004 | Eerola | 455/422.1 |
| 6,684,388 | B1 | 1/2004 | Gupta | |
| 6,687,702 | B2 | 2/2004 | Vaitheeswaran | 707/10 |
| 6,687,848 | B1 | 2/2004 | Najmi | 714/4 |
| 6,721,740 | B1 | 4/2004 | Skinner | |
| 6,721,779 | B1 | 4/2004 | Maffeis | 709/202 |
| 6,732,237 | B1 | 5/2004 | Jacobs et al. | |
| 6,748,420 | B1 | 6/2004 | Quatrano | 709/205 |
| 6,754,884 | B1 | 6/2004 | Lucas | |
| 6,757,689 | B2 | 6/2004 | Battas | 707/101 |
| 6,789,054 | B1 | 9/2004 | Makhlouf | 703/6 |
| 6,795,967 | B1 | 9/2004 | Evans et al. | |
| 6,799,718 | B2 | 10/2004 | Chan | |
| 6,802,000 | B1 | 10/2004 | Greene et al. | |
| 6,804,686 | B1 | 10/2004 | Stone et al. | |
| 6,823,495 | B1 | 11/2004 | Vedula | |
| 6,832,238 | B1 | 12/2004 | Sharma | 709/201 |
| 6,836,883 | B1 * | 12/2004 | Abrams et al. | 717/140 |
| 6,847,981 | B2 * | 1/2005 | Song et al. | 707/104.1 |
| 6,850,979 | B1 | 2/2005 | Saulpaugh | 709/225 |
| 6,859,180 | B1 | 2/2005 | Rivera | |
| 6,874,143 | B1 | 3/2005 | Murray | |
| 6,889,244 | B1 | 5/2005 | Gaither | 709/202 |
| 6,915,519 | B2 | 7/2005 | Williamson | 719/313 |
| 6,918,084 | B1 | 7/2005 | Slaughter | 709/513 |
| 6,922,827 | B2 | 7/2005 | Vasilik | |
| 6,948,150 | B1 * | 9/2005 | Pepin | 717/107 |
| 6,950,872 | B2 | 9/2005 | Todd, II | |
| 6,959,307 | B2 | 10/2005 | Apte | 707/104.1 |
| 6,963,914 | B1 | 11/2005 | Breitbart | 709/226 |
| 6,971,096 | B1 | 11/2005 | Ankireddipally | |
| 6,976,086 | B2 | 12/2005 | Sadeghi | 709/236 |
| 7,000,219 | B2 | 2/2006 | Barrett | |
| 7,017,146 | B2 | 3/2006 | Dellarocas | 717/106 |
| 7,043,722 | B2 | 5/2006 | Bau, III | |
| 7,047,530 | B2 * | 5/2006 | Lu | 718/102 |
| 7,051,072 | B2 | 5/2006 | Stewart | 709/204 |
| 7,051,316 | B2 | 5/2006 | Charisius | 717/103 |
| 7,054,858 | B2 | 5/2006 | Sutherland | 707/4 |
| 7,062,718 | B2 | 6/2006 | Kodosky | 715/771 |
| 7,069,507 | B1 | 6/2006 | Alcazar | |
| 7,072,934 | B2 | 7/2006 | Helgeson | 709/203 |
| 7,073,167 | B2 | 7/2006 | Iwashita | |
| 7,076,772 | B2 * | 7/2006 | Zatloukal | 717/147 |
| 7,089,584 | B1 | 8/2006 | Sharma | |
| 7,096,422 | B2 | 8/2006 | Rothschiller | |
| 7,107,578 | B1 | 9/2006 | Alpern | 717/124 |
| 7,111,243 | B1 | 9/2006 | Ballard | 715/744 |
| 7,117,504 | B2 | 10/2006 | Smith | 709/201 |
| 7,127,704 | B2 * | 10/2006 | Van De Vanter et al. | 717/112 |
| 7,143,186 | B2 | 11/2006 | Stewart | |
| 7,146,422 | B1 | 12/2006 | Marlatt | |
| 7,155,705 | B1 | 12/2006 | Hershberg | |
| 7,165,041 | B1 | 1/2007 | Guheen | |
| 7,181,731 | B2 | 2/2007 | Pace | |
| 7,184,967 | B1 | 2/2007 | Mital | |
| 7,240,331 | B2 | 7/2007 | Vion-Dury | |
| 7,260,599 | B2 | 8/2007 | Bauch | |
| 7,260,818 | B1 | 8/2007 | Iterum | |
| 7,283,991 | B1 * | 10/2007 | Kimmerly | 707/3 |
| 2002/0004848 | A1 | 1/2002 | Sudarshan | |
| 2002/0010781 | A1 | 1/2002 | Tuatini | |
| 2002/0010803 | A1 | 1/2002 | Oberstein | |
| 2002/0016759 | A1 | 2/2002 | Macready et al. | |
| 2002/0035604 | A1 | 3/2002 | Cohen | |
| 2002/0049788 | A1 | 4/2002 | Lipkin | |
| 2002/0073236 | A1 | 6/2002 | Helgeson | |
| 2002/0073396 | A1 | 6/2002 | Crupi | |
| 2002/0078365 | A1 | 6/2002 | Burnett et al. | |
| 2002/0083075 | A1 | 6/2002 | Brummel | |
| 2002/0111922 | A1 | 8/2002 | Young | |
| 2002/0116454 | A1 | 8/2002 | Dyla | |
| 2002/0120685 | A1 | 8/2002 | Srivastava | |
| 2002/0143960 | A1 | 10/2002 | Goren | |
| 2002/0152106 | A1 | 10/2002 | Stoxen | |
| 2002/0161826 | A1 | 10/2002 | Arteaga | |
| 2002/0165936 | A1 | 11/2002 | Alston et al. | |
| 2002/0169644 | A1 | 11/2002 | Greene | |
| 2002/0174178 | A1 | 11/2002 | Stawikowski | |
| 2002/0174241 | A1 | 11/2002 | Beged-Dov | |
| 2002/0184610 | A1 | 12/2002 | Chong | |
| 2002/0188486 | A1 | 12/2002 | Gil | |
| 2002/0194244 | A1 | 12/2002 | Raventos | |
| 2002/0194267 | A1 | 12/2002 | Flesner | |
| 2002/0194495 | A1 | 12/2002 | Gladstone | |
| 2003/0004746 | A1 | 1/2003 | Kheirolomoom | |
| 2003/0005181 | A1 * | 1/2003 | Bau et al. | 709/330 |
| 2003/0014439 | A1 | 1/2003 | Boughannam | |
| 2003/0018661 | A1 | 1/2003 | Darugar | |
| 2003/0018665 | A1 | 1/2003 | Dovin et al. | |
| 2003/0018832 | A1 | 1/2003 | Amirisetty | |
| 2003/0018963 | A1 | 1/2003 | Ashworth | |
| 2003/0023957 | A1 | 1/2003 | Bau | |
| 2003/0028364 | A1 | 2/2003 | Chan | |
| 2003/0028579 | A1 | 2/2003 | Kulkarni | |
| 2003/0041198 | A1 | 2/2003 | Exton et al. | |
| 2003/0043191 | A1 | 3/2003 | Tinsley | |
| 2003/0046591 | A1 | 3/2003 | Asghari-Kamrani | |
| 2003/0051066 | A1 | 3/2003 | Pace | |
| 2003/0055868 | A1 | 3/2003 | Fletcher | |
| 2003/0055878 | A1 | 3/2003 | Fletcher | |
| 2003/0074217 | A1 | 4/2003 | Beisiegel | |

2003/0079029 A1 4/2003 Garimella
2003/0084203 A1 5/2003 Yoshida
2003/0110117 A1 6/2003 Saidenberg et al.
2003/0110446 A1 6/2003 Nemer
2003/0126136 A1 7/2003 Omoigui
2003/0149791 A1 8/2003 Kane
2003/0167358 A1 9/2003 Marvin
2003/0196168 A1 10/2003 Hu
2004/0003335 A1* 1/2004 Gertz et al. .................. 714/758
2004/0019645 A1 1/2004 Goodman
2004/0040011 A1 2/2004 Bosworth
2004/0078373 A1 4/2004 Ghoneimy
2004/0103406 A1* 5/2004 Patel ............................ 717/140
2004/0133660 A1 7/2004 Junghuber et al.
2004/0148336 A1 7/2004 Hubbard
2004/0204976 A1 10/2004 Oyama
2004/0216086 A1 10/2004 Bau
2004/0225995 A1 11/2004 Marvin et al.
2004/0260715 A1 12/2004 Mongeon
2005/0050068 A1 3/2005 Vaschillo
2005/0278585 A1 12/2005 Spencer
2006/0206856 A1* 9/2006 Breeden et al. ............... 717/101
2006/0234678 A1 10/2006 Juitt
2007/0038500 A1 2/2007 Hammitt

FOREIGN PATENT DOCUMENTS

WO WO 99/23558 5/1999
WO WO 00/29924 A 5/2000

OTHER PUBLICATIONS

Microsoft, “Microsoft .net Framework”, 2001, Microsoft Corporation, pp. 1-50.*

Edward D. Willink, “Meta-Compilation for C++”, Jan. 2000, University of Surrey, pp. 362.*

Blake, Rule-Driven Coordination Agents: “A Self-Configurable Agent Architecture for Distributed Control”, IEEE Mar. 2001, pp. 271-277.

Dahalin et al., Workflow Interoperability Using Extensible Markup Language (XML), IEEE, Jul. 2002, pp. 513-516.

Kunisetty, “Workflow Modeling and Simulation Using an Extensible Object-Oriented Knowledge Based Management System” Citeseer, 1996 pp. 1-60.

Van Der Aaist et al., Verification of XRL: An XML-Based Workflow Lnaguage, IEEE, Jul. 2001, pp. 427-432.

Embury, S.M., et al., “Assisting the Comprehension of Legacy Transactions,” Proceedings of the 8th Working Conference on Reverse Engineering, Oct. 2-5, 2001, pp. 345-354.

Mays, E., et al., “A Persistent Store for Large Shared Knowledge Bases,” IEEE Transactions on Knowledge and Data Engineering, vol. 3, No. 1, Mar. 1991, pp. 33-41.

Tang, C., et al., “Integrating Remote Invocation and Distributed Shared State,” Proceedings of the 18th International Parallel and Distributed Processing Symposium, IEEE, Apr. 26-30, 2004.

JAVA™ Debugging Interface—definition, retrieved from <URL http://java.sun.com/j2se/1.4.2/docs/guide/jpda/jdi/overview-summary.html on Feb. 21, 2007.

Hewlett-Packard Company, “hp application server,” developer’s guide version 8.0, 1999-2001, pp. 27-81, 127-160, 195-271.

Bogunovic, N., “A Programming Model for Composing Data-Flow Collaborative Applications,” *ecbs*, p. 106, IEEE Conference and Workshop on Engineering of Computer-Based Systems, 1999.

Sung, S.Y., et al., “A Multimedia Authoring Tool for the Internet,” Proceedings of the 1997 IEEE International Symposium on Consumer Electronics, Dec. 1997, pp. 304-308.

Smith, M., et al., “Marching Towards a Software Resuse Future,” ACM SIGAda Ada Letters, vol. XIV, Issue 6, Nov./Dec. 1994, pp. 62-72.

Chen, et al., “eCo Architecture to Electronic Commerce Interoperability,” Jun. 29, 1999, CommerceNet.

Sosnoski, “XML and Java Technologies: Data binding, Part 1: Code generation approaches—JAXB and more,” IBM, pp. 1-11, Jan. 2003.

Erich Liebmann et al., “Adaptive Data Dissemination and Caching for Edge Service Architectures built with the J2EE,” Mar. 2004, ACM Press, 2004 ACM Symposium on Applied Computing, pp. 1717-1724.

Alonso, G., et al., “Advanced Transaction Models in Workflow Contexts,” Proceedings of 12th International Conference on Data Engineering, Feb. 1996, retrieved from http://citeseer.ist.psu.edu/alonso96advanced.html.

Van Der Aalst, W., et al., “XML Based Schema Definition for Support of Inter-organizational Workflow,” University of Colorado and University of Eindhoven report, 2000, retrieved from http://citeseer.ist.psu.edu/vanderaalst00xml.html.

Plaindoux, D., “XML Transducers in Java,” The 11th International World Wide Web Conference, May 2002, retrieved from http://www2002.org/CDROM/poster/132/index.html.

BEA Systems, Inc., “Transforming Data Using Xquery Mapper,” 2006, BEA AquaLogic Service Bus 2.0 Documentation, pp. 1-19.

Stylus Studio, “Xquery Mapper,” www.stylusstudio.com/xquery_mapper.html, printed Jun. 5, 2007, pp. 1-6.

Altova, “XML-to-XML Mapping,” 2007, Altova, pp. 1-3.

Jamper, “Jamper-Java XML Mapper,” 2007, Sourceforge, pp. 1-4.

Mohan, C., et al., “ARIES: A Transaction Recovery Method Supporting Fine-Granularity Locking and Partial Rollbacks Using Write-Ahead Logging,” ACM Transactions on Database Systems, vol. 17, No. 1, Mar. 1992, pp. 94-162.

Müller, Robert, “Event-Oriented Dynamic Adaptation of Workflows: Model, Architecture, and Implementation”, University of Leipzig, Germany, pp. i-viv, 1-342.

Peltz, Chris, “Web Services Orchestration,” Hewlett-Packard Company, Jan. 2003, pp. 1-20.

Allamaraju, et al., “Professional Java Server Programming J2EE 1.3 Edition,” Sep. 2001, WROX, XP002442953, ISBN: 1-861005-37-7, pp. 1009-1057.

Sun Microsystems, “J2EE™ Connector Architecture Specification,” Version 1.0 Final Release, Aug. 2001, XP002442954, pp. 1-179.

Ort, Ed, et al., “Java Architecture for XML Binding (JAXB),” http://java.sun.com/developer/technicalArticles/WebServices/jaxb/, Mar. 2003, Java-Sun, pp. 1-12.

Wikipedia, “Java Architecture for XML Binding (JAXB),” http://en.wikipedia.org/wiki/Java_Architecture_for_XML_Binding 10/, Oct. 2007, pp. 1-3 (last modified Sep. 24, 2009).

Shannon Bill, “Java 2 Platform Enterprise Edition Specification,” http://jcp.org/aboutJava/communityprocess/first/jsr058/j2ee-1_3-pfd-spec.pdf, Oct. 20, 2000 v1.3, Proposed Final Draft.

Paul, Laura Gibbons, “Rosetta Net: Teaching Business to Work together”, http://www.developercom/xml/article.php/616641/RosettaNet-Teaching-businesses-to-work-together.htmOct. 1, 1999; pp. 1-3.

Christopher Lauer; “Introducing Microsoft Dotnet,” http://www.freevbcode.com/ShowCode.asp?ID=2171, Jul. 2, 2002; pp. 1-8.

International Search Report and Written Opinion of the International Searching Authority; Issued on Application No. PCT/US04/05479, Mailed Dec. 3, 2004.

* cited by examiner

100

Figure 2:
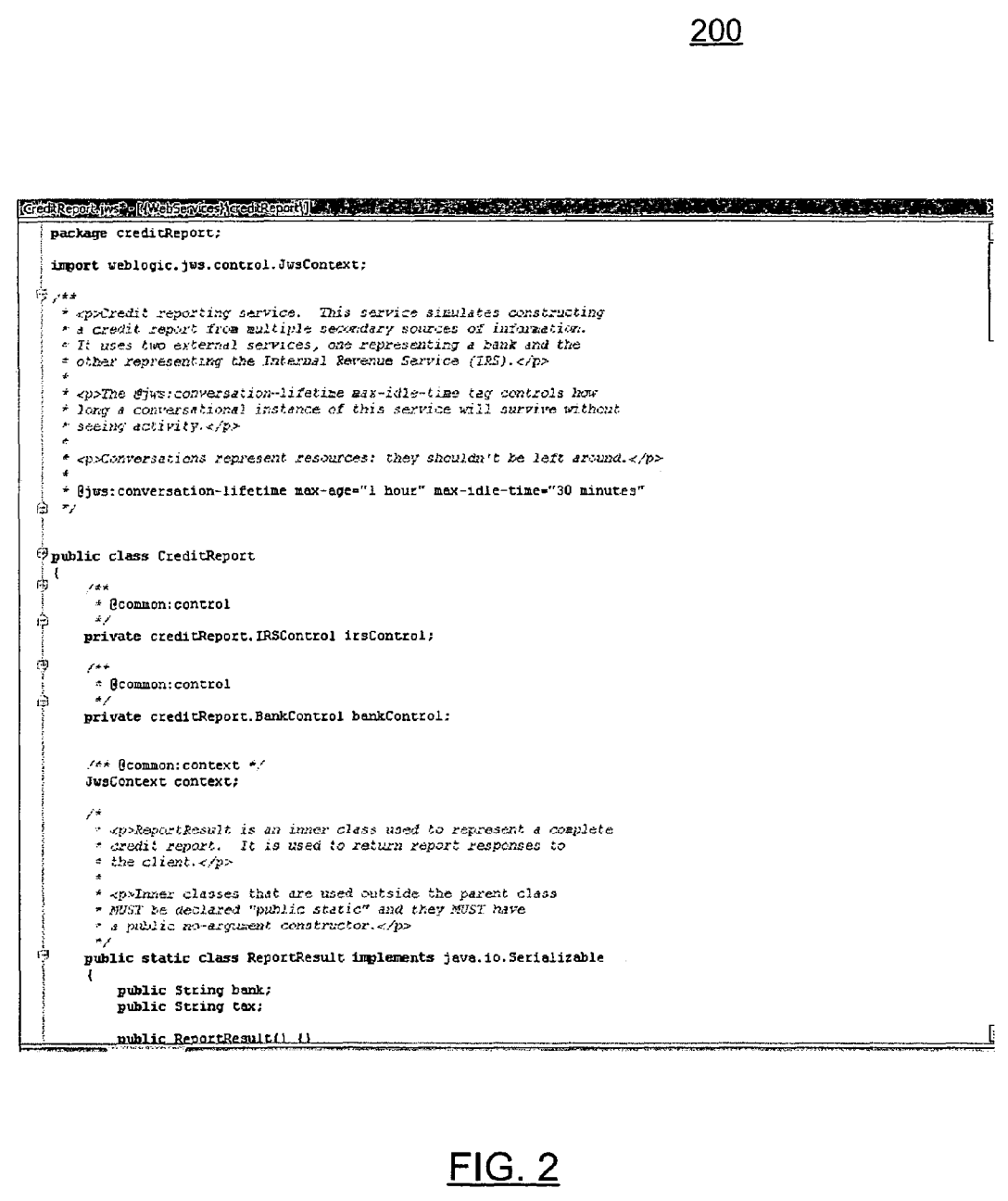

200

```
CreditReport.jws* - [/WebServices/creditReport]
package creditReport;

import weblogic.jws.control.JwsContext;

/**
 * <p>Credit reporting service.  This service simulates constructing
 * a credit report from multiple secondary sources of information.
 * It uses two external services, one representing a bank and the
 * other representing the Internal Revenue Service (IRS).</p>
 *
 * <p>The @jws:conversation-lifetime max-idle-time tag controls how
 * long a conversational instance of this service will survive without
 * seeing activity.</p>
 *
 * <p>Conversations represent resources: they shouldn't be left around.</p>
 *
 * @jws:conversation-lifetime max-age="1 hour" max-idle-time="30 minutes"
 */

public class CreditReport
{
    /**
     * @common:control
     */
    private creditReport.IRSControl irsControl;

    /**
     * @common:control
     */
    private creditReport.BankControl bankControl;


    /** @common:context */
    JwsContext context;

    /*
     * <p>ReportResult is an inner class used to represent a complete
     * credit report.  It is used to return report responses to
     * the client.</p>
     *
     * <p>Inner classes that are used outside the parent class
     * MUST be declared "public static" and they MUST have
     * a public no-argument constructor.</p>
     */
    public static class ReportResult implements java.io.Serializable
    {
        public String bank;
        public String tax;

        public ReportResult() {}
```

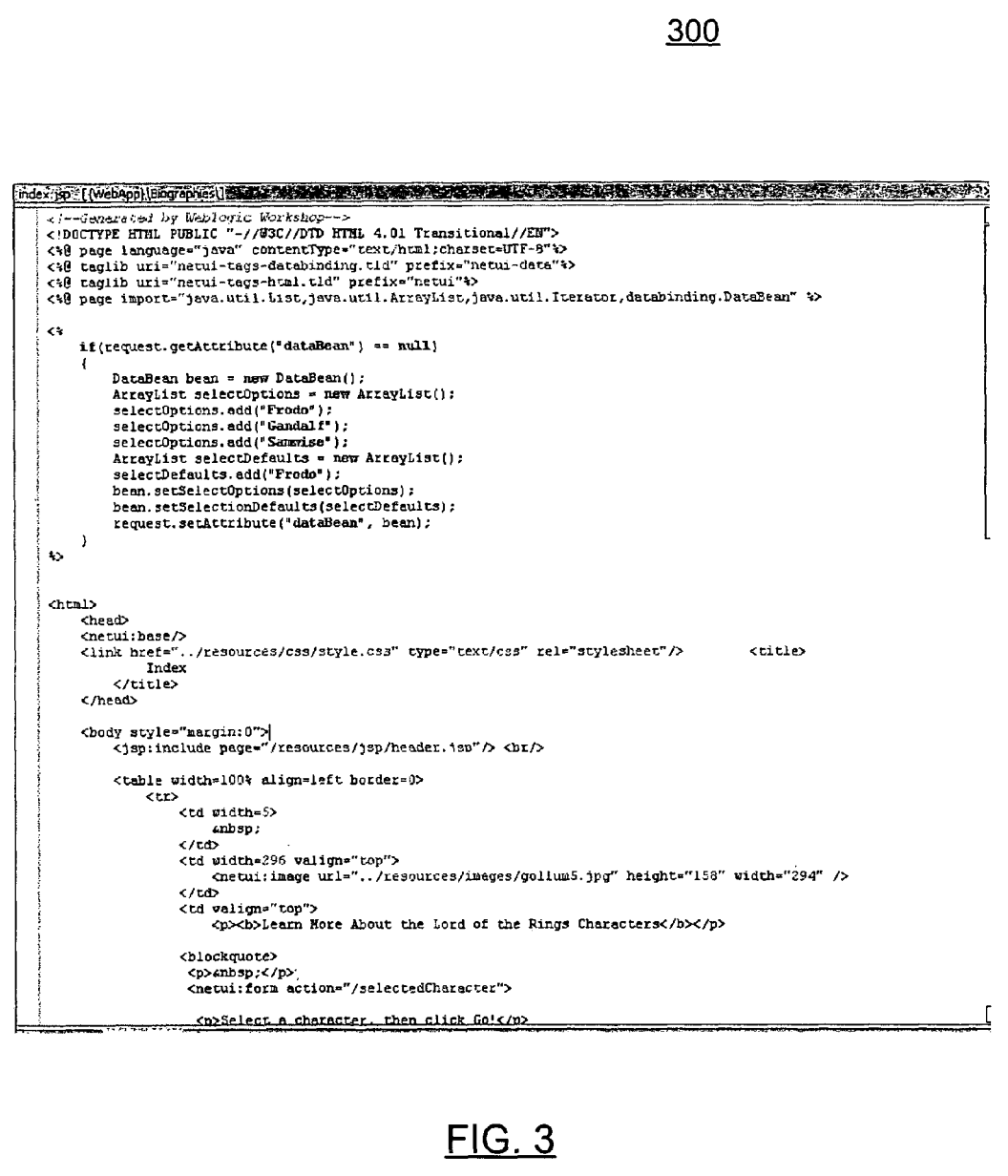

```
index.jsp [(WebApp)\Biographies\]
<!--Generated by Weblogic Workshop-->
<!DOCTYPE HTML PUBLIC "-//W3C//DTD HTML 4.01 Transitional//EN">
<%@ page language="java" contentType="text/html;charset=UTF-8"%>
<%@ taglib uri="netui-tags-databinding.tld" prefix="netui-data"%>
<%@ taglib uri="netui-tags-html.tld" prefix="netui"%>
<%@ page import="java.util.List,java.util.ArrayList,java.util.Iterator,databinding.DataBean" %>

<%
    if(request.getAttribute("dataBean") == null)
    {
        DataBean bean = new DataBean();
        ArrayList selectOptions = new ArrayList();
        selectOptions.add("Frodo");
        selectOptions.add("Gandalf");
        selectOptions.add("Samwise");
        ArrayList selectDefaults = new ArrayList();
        selectDefaults.add("Frodo");
        bean.setSelectOptions(selectOptions);
        bean.setSelectionDefaults(selectDefaults);
        request.setAttribute("dataBean", bean);
    }
%>


<html>
    <head>
    <netui:base/>
    <link href="../resources/css/style.css" type="text/css" rel="stylesheet"/>        <title>
            Index
        </title>
    </head>

    <body style="margin:0">
        <jsp:include page="/resources/jsp/header.jsp"/> <br/>

        <table width=100% align=left border=0>
            <tr>
                <td width=5>
                     
                </td>
                <td width=296 valign="top">
                    <netui:image url="../resources/images/gollum5.jpg" height="158" width="294" />
                </td>
                <td valign="top">
                    <p><b>Learn More About the Lord of the Rings Characters</b></p>

                <blockquote>
                 <p> </p>
                 <netui:form action="/selectedCharacter">

                  <p>Select a character, then click Go!</p>
```

FIG. 3

METHODS FOR TYPE-INDEPENDENT SOURCE CODE EDITING

CLAIM TO PRIORITY

The present application claims the benefit of priority under 35 U.S.C. §119(e) to U.S. Provisional Patent Application entitled "SYSTEMS AND METHODS FOR TYPE INDEPENDENT SOURCE CODE EDITING", Application No. 60/449,984, filed on Feb. 26, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the editing of software and software components.

BACKGROUND

Modern "smart" source code editors provide a wide range of features to the software developer based on increased understanding of the underlying programming language. For example, these editors may provide syntax coloring to highlight various components of the language grammar (class definitions, fields, methods, comments, etc.) The editors may also highlight known errors in the code. In general, this increased understanding of the underlying programming language is achieved by adding a language specific lexical analyzer and/or parser to the editor.

Unfortunately, most large-scale development projects include several programming languages targeted at different domains and different classes of developers. For example, it is not uncommon for a modern web application to include Java, Java Server Pages (JSP), JavaScript, the Hypertext Markup Language (HTML) and the eXtensible Markup Language (XML). Therefore, a typical development environment may effectively include several "smart" source code editors, each with an embedded lexical analyzer and/or parser specific to a given language.

Developing and maintaining a separate editor for each language in the development environment is costly and time consuming. Each time a new language is needed, a new editor must be constructed. Each time a new editing feature is added, it must be added to each language module. In addition, keeping the features of the language editors in sync can be a challenge. Minor differences between the editors in a given development environment can result in an inconsistent and confusing experience for the developer.

In addition, it is becoming increasingly useful to embed one language inside another within a single source file. For example, JSP pages include Java and JSP tags embedded within HTML. Emerging languages, such as ECMAScript for XML(E4X) embed XML within JavaScript. Other emerging technologies, such as Java for Web Service (JWS) embed a small annotation language inside Java comments to succinctly describe how that Java class should be exposed as a web service. In some cases, several languages can be nested several layers deep in a single source file.

The simple lexical analyzers and parsers embedded in common source editors are usually not sophisticated enough to recognize and process nested languages. Therefore, in some environments advanced source code editing features are simply not available for nested languages.

In other environments, a new editor might be constructed specially tailored to handle each new language combination even if separate editors already exist for each of the nested languages. For example, a JSP editor might be constructed to handle the combination of HTML, JSP tags and Java, even though separate HTML and Java editors already exist in the development environment. A new E4X editor may be constructed even though separate ECMAScript and XML editors already exist. This may result in duplication of code and will likely result in inconsistent behaviors as the different language editors evolve.

As language nesting becomes more popular, the increase in cost and time required to develop and maintain a comprehensive suite of smart editors using traditional methods becomes combinatorial.

To make matters worse, some nested languages appear in several contexts. For example, XML may be embedded in ECMAScript, Java and JWS annotations. In addition, small expression languages such as those required to understand date and time formats (e.g., YYYY-MM-DDThh:mm:ssTZD from ISO 8601) or time durations (e.g., 15 h 4 m30 s) may be embedded in several different languages. Adding these common sub-languages separately to each editor's lexical analyzer and/or parser again results in increased development and maintenance costs and potentially inconsistent behaviors. Any changes to the way these common sub-expressions are handled should be applied uniformly across all applicable host languages.

In a typical Integrated Development Environment (IDE), there are often two compilers. The first compiler is run from the command line, displaying a list of errors or emitting runable code. The second compiler exists as part of the IDE. Initially, this compiler may only implement lexical analysis of source code in order to support syntax coloring. Then it may implement syntactic analysis in order to support the structure pane and class browser. Eventually, this compiler will contain a nearly complete front-end in order to support code completion.

The trend of moving more and more of the compiler into the IDE is understandable: advanced IDE features are often based on advanced understanding of the language being edited. Unfortunately, it is not normally possible to use the command-line compiler inside the IDE. First, it is normally not componentized in such a way that the information needed by the IDE is easily accessible. Second, it is usually far too slow for interactive use as changes are made, especially if it takes multiple passes over the files. Third, it almost always recovers poorly from errors, which amongst other problems, makes code completion impossible.

These issues force the IDE to create its own compiler. However, supporting two compilers has many disadvantages. First, it is nearly twice the work of implementing a single compiler, particularly where the back-end is a fairly high-level language (i.e. Java bytecodes) and no optimization is performed. Second, the IDE's compiler is typically the second class citizen, and as a result, it is usually of lesser quality. Few IDE's actually implement 100% of the analysis in the command line compiler. Furthermore, the IDE's compiler is often designed in an evolutionary manner as new features are needed, resulting in a poorly organized compiler. Third, two different code bases need to be updated in order to make changes to the language. This makes creating a new language a slow and painful process. These problems get worse as the platform is scaled in the number of languages it supports and in the number and sophistication of IDE features.

SUMMARY

In one embodiment, a source editor capable of editing multiple languages and a compiler framework are configured to communicate with language independent data. In one embodiment, the editor works using compiler meta data that is language independent. Thus, when a new language is introduced into the environment for editing and/or compiling, separate instructions regarding how to integrate the language for compiling or editing are not required. For these and other reasons, the editor provides an edit rich experience without using language specific knowledge.

BRIEF DESCRIPTION OF THE DRAWINGS

FIG. 2 is an illustration of an editor interface in accordance with one embodiment of the present invention.

FIG. 3 is an illustration of an editor interface in accordance with one embodiment of the present invention.

DETAILED DESCRIPTION

Figure 1:
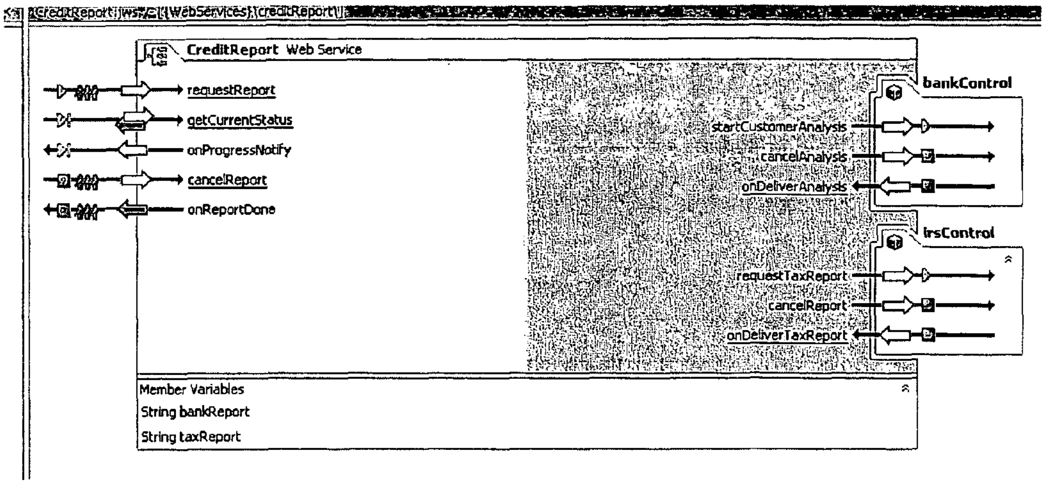
FIG. 1 is an illustration of an editor interface in accordance with one embodiment of the present invention.

In one embodiment, a source editor capable of editing multiple languages and a compiler framework are configured to communicate with language independent data. In one embodiment, the editor works using compiler meta data that is language independent. Thus, when a new language is introduced into the environment for editing and/or compiling, separate instructions regarding how to integrate the language for compiling or editing are not required. For these and other reasons, the editor provides an edit rich experience without using language specific knowledge.

To be competitive, a modern IDE should support multiple languages and many sophisticated IDE features. In addition, it is also useful for a compiler to support mixing and nesting languages within the same source file. For example, in emerging language such as E4X, the IDE should display errors for mismatched start and end tags in embedded XML and it should perform auto-completion of XML tags embedded in the source code. These features should be available independent of the host language embedding XML. As another example, JWS annotations should be treated as a nested language and the IDE should support features such as syntax coloring and code completion when editing the annotations.

Systems and methods in accordance with embodiments of the present invention overcomes problems in existing editing systems by providing and/or utilizing an extensible, data-driven, language independent source code editor with an embedded, extensible multi-language compiler framework. This editor may not include a language specific lexical analyzer or parser. Instead, the editor can be tightly integrated with a compiler framework that provides detailed information about the language currently being edited by the user. This information can be provided in a language-neutral way effectively decoupling the editor from the underlying set of languages being edited.

In addition, a language-independent editor can expose a set of APIs that makes it easy to customize behavior for specific languages that have characteristics not shared by most languages. This set of APIs can also enable the development of customized views, such as for developing visual editors that represent and allow the user to manipulate aspects of the source code pictorially.

Multi-Language, Compiler Framework

A multi-language compiler framework can be used inside the language independent editor. The compiler framework can be used to perform the task of a normal command-line compiler, and can also provide the language information necessary for implementing editor features. Having a single compiler can reduce the amount of work needed to add a new language and to modify and extend that language. It can also ensure that the editor's compiler is of the highest quality.

In addition, the compiler framework can make it easy to turn language information into editor features. This can allow language designers to focus on their language and not have to worry about implementing the editor-side as well.

The tight integration of the compiler into the editor, along with the extra time made available by not having to implement a separate compiler for the editor, significantly improves the language-based features of an editor. Here are some examples of the improvements that a compiler framework can make possible:

Performance

The performance many command-line compilers is not good enough for use in an editor, where reparsing occurs each time the user pauses after typing. Therefore, editing a 2000 line file can be very cumbersome.

The compiler framework makes it possible to reparse in "near real-time" with no performance degradation noticeable to the user.

Error Display

In general, editors provide visual indication of errors in a single language.

The compiler framework enables the editor to provide visual indication of errors throughout a source file with mixed languages. Furthermore, the compiler framework keeps track of errors in all source files in the project so that the user can have a complete list of every error in the source, even in unopened files, at all times.

Error Correction

Typical command-line compilers do a poor job of recovering from errors. Often a single error by the user will cause a hundred error messages to display. Poor error recovery also causes other features, like code completion, to be unavailable more often that necessary.

The compiler framework provides parsers that automatically include sophisticated error recovery. This should make most errors cause only a single error message, with the parser continuing as if the error had not occurred. This will make code completion much more robust, with failure a very rare event.

The compiler framework also has error correction in the code-generation of the compiler. This allows the user to run their code even if there are errors in it. Only if the user tries to execute a line for which correction was not possible will it fail.

Auto Correction

The compiler framework also makes it possible to provide the next level of help to users. Instead of just telling the user that there are errors in the code, it can offer to fix them. For example, if the user misspells a variable name, it can provide the user with a list of closely matching names. If the user references a class that is not imported but exists somewhere in the source, it can offer to add an import of the class. If the user forgets a semicolon, it can insert it for them.

These are only a few examples of the kinds of features a compiler framework can provide by tightly integrating into the editor. The compiler framework can make all of the information produced by the compiler available in real-time for the editor to use, making possible almost any conceivable editor feature.

Compiler Framework Services

The sections below describe what a compiler framework can do for various consumers of the compiler framework functionality, such as runtime, editor, or language designer consumers. Also included is an exemplary list of languages that can be supported.

Runtime

Produce Annotated .Class Files

Pointed at a directory of source code, the compiler framework produces a set of .class files that will correctly implement the semantics described by the source files. Each .class file may additionally contain annotation information (metadata) that also affects runtime behavior. See "Languages" below for the set of supported file types.

Language Designers

Provide Compiler Tools

The framework includes tools to help with building compilers for specific languages. This includes a parser generator. It also includes a scanner generator as well.

Robust to Errors

The generated parsers are able to recover from the majority of user errors (particularly, the common ones). In particular, they are able to recover from all single token errors and also those that occur during code completion (typically, a missing identifier).

The scanners are able to recover sensibly from any error.

Support Language Nesting

The framework allows one language compiler to pass off processing of a section of the document to another language compiler. This language compiler will then get to scan, parse, and type check the contents. The parse tree produced by the inner compiler will be available to the outer compiler.

It is able to choose the language to nest based on type-checking information in the outer language.

It is able to allow either the inner or the outer language to determine where the span of the inner language content ends.

Expose Language Information

The framework allows languages to expose information about the contents of the document in order to enable editor features.

Easy

It is relative easy to expose existing compiler information in order to get editor features. In particular, it should take no more than a few minutes of work to get syntax coloring or bold matching chars from lexical information.

Encapsulates Syntax Details

The exposed information encapsulates the details of the syntax such that the syntax can be changed without breaking the editor features that consume the information.

Editor

Provide Project Information

For the project as a whole, the compiler framework provides the editor with the following information:

1. The names of all classes and packages defined in the source code or libraries.
2. The errors found in any of the source files.

Up-To-Date

All of this information is kept up-to-date for all files in the project. Once the compiler framework is notified of the change to a file, this information should be updated very rapidly.

Provide File Information

For an individual file, the compiler framework provides the editor with the following information:

1. The signatures of the classes defined by the file.
2. The errors found in the file.
3. The stack of nested languages at any point in the file.
4. The information exposed by any of the languages.

Up-To-Date

Once the compiler framework is notified of a change to the file, this information is updated within the time limits for a single-file recompile.

Provide File Information Changes

When the compiler framework is notified of a change to a previously compiled file, it recompiles the file and provides the editor with lists of the changes that occurred to the file information (see "Provide File Information" above).

Languages

Java initially supports the following languages:

| | |
|---|---|
| Java and JavaScript | The Java and script languages are directly supported. These include files of type .java and .js. |
| Controls | A set of source code annotations and coding conventions that simplify interaction with external entities, such as web services. These annotations may be embedded in a variety of languages and are defined in control definition files. |
| JWS | The Java for Web Services (JWS) language for implementing web services includes files of type .jws, .wsdl, and .xmlmap. In addition, it includes support for web services written in script. |
| JSPX | The JSPX language for implementing web UI includes files of type .jspx and.trd. Additionally, it includes support for web UI written in script. |
| WebFlow | The webflow language for implementing the flow between pages of web UI includes files of type .jwf (will change). Additionally, it includes support for flow written in script. |
| WSPL | The WSPL language for implementing business processes management includes files of type .jwf. Additionally, it includes support for processes written in script. |

The framework can include direct support for Java with annotations, script with annotations, and XML with Schema. The JWS, JSPX, and WSPL are implemented by extending and nesting the basic languages that the framework provides.

The annotations/schema information can define which tags and attributes are allowed in the document. (In the annotation case, this information may change dynamically based on the Java/script content.) This information can be used to check the validity of the tags and attributes. This information can also include code to perform additional validity checking.

Example Editor Features Enabled Across Languages

With the rich set of information provided by the compiler framework, it is possible to create a large set of useful source editor features that make it a more powerful tool. Below are some examples.

Editing Features

The editor for an IDE should know something about the languages it can edit and as a result it can provide a number of useful features which make it easier to edit source files in that language.

Token Coloring

Modern editors provide support for displaying certain tokens, such as keywords, comments and strings, in special colors to help the user better understand the source code.

Comment Editing Help

When editing multiline comments, the editor can insert characters when the user starts a new line. For instance, in Java the user might type "/**" followed by pressing enter, and the editor should insert a "*" automatically, following the standard Java formatting rules for multi-line comments (the auto-indenting should also come into play in this situation).

Auto-indenting

When the user is typing certain syntactic constructs, the editor can help them by adding the appropriate indentation when enter is pressed or when certain keys are pressed. For instance, after the user types a "{" and presses enter, the editor can indent the next line by the given indent width. In addition, the editor may automatically indent a line correctly when tab is pressed anywhere on the line, or when the user types certain tokens such as ";".

Matching Tokens

Certain tokens are naturally paired, such as "{" and "}" in Java or C++. The editor may allow the user to move the cursor from one member of a token pair to the other. In addition, it may use a visual indicator to show which tokens are paired either when the token is typed or when the cursor is adjacent to one of these tokens.

Edit by Token

When the user is moving the cursor, selecting text or deleting text, it is frequently useful to be able to do these actions based on token boundaries. For instance, a double-click can be used to select an entire token, control+left/right arrow can be used to move left or right a token at a time.

Code Information

There are many cases where type information can be used to provide the user with help understanding the meaning of identifiers or to help them understand what function calls and variable references are legal in a certain context.

Completion List

Whenever the user is editing their source code, they should be able to activate a feature which, based on the context in which they are editing, tells them possible text that may be inserted. There are a number of places where this feature could be used:

After the "." on an object.

After the "." on a package (in imports or elsewhere).

After the "new" keyword.

After the "<" on an XML start tag.

After the "</" on an XML end tag.

Parameter Information

When the user is editing the argument list for a method call, the editor may show a list which displays the different legal argument signatures, including the types and argument names (if available). As the user edits the signature, this list displays which argument the user is editing and shows which signature are still legal based on the types of the arguments the user has already entered.

Identifier Information

When the user mouses over (or otherwise selects) an identifier, full information about that identifier can be shown. If it is a variable, the type of the variable can be shown and if it is a function the full signature can be shown. In addition, the user can be taken to the declaration of the member and cycle through the other uses of that member.

Browsing and Navigation

Class Browser

A class browser allows the user to find out what classes are defined in a project, what members and methods the classes contain and the inheritance relationships between the classes. In addition, the user can typically go to any definition or use of a class, member or method.

Navigation Bar

The navigation bar allows the user to see the classes, members and methods defined in the current file and navigate to the location in the file where these items are defined.

Error Detection & Correction

Squiggly Underlines

When the user enters code that contains an error or warnings, these can be detected without a compile and indicated in the source file (like the spelling error squiggly underlines in MS Word). They may be updated in real time as the user types and when the user selects one of these errors, they can see the full error message. In addition, a complete list of these errors for all files can be displayed in the IDE, so that the user never has to recompile the project when they just want an up-to-date list of their errors.

Error Auto-Correct

Certain types of errors such as leaving out an import or misspelling an identifier have obvious auto-correct candidates which can be determined by an IDE integrated compiler. When the user selects these errors, they can be presented with a list of possible correction options which can be automatically inserted into the source code.

Benefits

The benefits of the language independent editor are numerous. This section lists several examples of benefits that can be obtained using embodiments of the present invention.

Rapid New Language Support

Adding new languages to a development environment no longer requires the development of a new smart editor. Because the communication between the compiler framework and the source editor is language independent, new languages can be added without a single change to the editor. The compiler framework will provide a rich set of information about the syntax and semantics of each newly added language, immediately enabling a rich set of smart editor features. This drastically reduces the time and effort required to add a new language to a development environment.

Rapid New Editor Features

Similarly, decoupling the editor from the specific set of compilers means new editor features can be developed once, but will benefit all programming languages plugged into the compiler framework. It is not necessary to add the new feature to a separate editor for each language.

Consistent Editing Experience

Because there can be a single implementation for all editor features applied to all languages in the compiler framework, the editor can perform uniformly and consistently no matter what language is being edited. Consequently, users who have become accustomed to certain features in one language can use them in another language. The keystrokes and other gestures required to activate and use those features will be the same. The behavior of the editor will be familiar and unsurprising even if the developer is editing a new an unfamiliar language.

Language Nesting

Because an editor can be language neutral, it can support arbitrarily nested languages. An underlying compiler framework can consult different language modules for each nested portion of the source code and provides information about the syntax and semantics in a language neutral form. The compiler framework can also inform the editor where each language begins and ends within a source file so the editor can apply different user preferences for each language (e.g., the user might like different syntax coloring schemes for different languages).

One of the benefits of such architecture is that a new language compiler and a new language editor do not have to be developed for each new combination of nested languages. For example, if the compiler framework already has an XML language module and an ECMAScript language module, nesting XML within ECMAScript requires relatively minor modifications to the ECMAScript language module. It is not necessary to create a new language module to enable this functionality and no modifications to the editor are required.

Common Sub-Languages

The language independent editor can reduce the time and cost of embedding common sub-languages within several host languages. The sub-language can be developed once as an independent language module and nested inside as many other languages as needed. Detailed information about the syntax and semantics of the sub-language need not be added separately to each host language.

In addition, an editor may not need to know the information provided by the compiler framework about the sub-language is derived from a different language module. Therefore, the sub-language can be added to an arbitrary number of host languages without requiring any modifications to the Editor.

Changes to the sub-language can be made in place and will be reflected in all host languages. The user experience working with these sub-languages will be consistent regardless of the host language in which they are embedded. All editor features, including syntax coloring, error reporting and statement completion will be uniform and familiar.

Customized Language Features

APIs exposed by a language independent editor can allow custom language features to be developed easily and quickly. An API can provide default implementations for all the built-in editor features, and can allow extensions to modify or replace existing features or add completely new features. This extensibility can be very useful when the editor does not provide all the desired features or for unusual languages where the existing features need to be customized.

Customized Views

A language independent editor can also expose APIs that allow third parties to add custom, language editing views to the editor. For example, a workflow programming language might provide a graphical editor for business processes that allows users to create and modify the business processes by dragging and dropping icons on the display. The underlying source code would be modified simultaneously and source code changes could be viewed in a second window while they occur. Alternately, a web service editor might provide a view for graphically understanding and manipulating how the web service interacts with clients and external entities (e.g., other web services). Error! Reference source not found. FIG. 1 shows an example of a visual web service editor.

Data Driven Editor

As discussed earlier, the features of the language independent editor can be driven by language independent data provided by the compiler framework. This section describes examples of some of the key pieces of information provided by the compiler framework. A complete description of the API that governs the interaction between the compiler and editor is described elsewhere herein.

One of the important pieces of information that can be provided by a compiler framework is a stream of token nodes. Each token node can identify the start, end and type of a particular token identified by the compiler. The editor can use this information to provide features such as syntax coloring. For example, Error! Reference source not found. FIG. 2 shows a source file highlighting keywords, identifiers, comments, annotations, attributes and attribute values using different color schemes.

Another important piece of information that can be provided by the compiler framework is a tree of language nodes representing the nested languages in the file. The compiler framework can determine the first language used in a source file by its file extension (e.g., .java, .jws, .jsp, etc.). The host language, based on its syntax, can identify subsequent languages. For example, the JSP language uses the delimiters <% and %> to identify nested sections of Java code. Each language node identifies where the nested language section starts and ends. In addition, it can identify the name of the language (e.g., via com.bea.compiler.ILanguage) and any additional nested language sections inside of it (via a getChildren( )method). A compiler can use this feature to e.g. allow users to specify different editor preferences for different languages.

A compiler framework can also provide information about the entire project, individual files, text buffers, errors in the code, changes to the code and more.

Principal Compiler Framework Components

Below are descriptions of the principal components of a compiler framework in accordance with one embodiment of the present invention.

Project Compiler

The Project Compiler contains the list of source directories and the class path. However, the principal data structure maintained by the project compiler is the type cache (part of the java type namespace).

The type cache contains Java signatures for all of the classes that exist in the project. Some of those classes come from .class files on the class path and the others come from files in one of the source directories. One of the most important jobs of the compiler in the IDE setting is to keep the type cache up to date by watching for changes in the files in the source directories. This task is performed by one of the worker threads in the thread pool (see below).

The type cache is indexed by file name and by class name. For each file, the entry contains the current list of errors. This means that at any time the IDE can know which files contain errors and can display those errors without opening the file. For each class, the type cache maintains a list of dependencies. A reverse index of dependencies also exists so that the compiler can quickly determine if changes made have broken dependencies in unchanged files.

Another important benefit of the type cache is improving the performance of type checking. The type cache allows a single file to be compiled without processing any other files. All external information needed to compile the file is contained in the type cache.

The project compiler (and its contained type cache) is serializable. The IDE will serialize the final state of the compiler to disk when the IDE is closed so that it can display the available classes when the IDE is reopened without parsing any files (other than those changed since closing).

File Compiler

A file compiler can be used to perform compilation of a single source file. It is designed to perform incremental compilation. Hence, it can maintain data structures containing the result of the previous scan, parse, and, in the case of a non-Java language, translation into Java classes. When changes are made to the file in memory, the next compile can reuse much of the previous results, vastly speeding up the process.

One of the unique features of this compiler is its built-in support for nesting of languages. The compiler maintains data structures containing information about where language nesting occurs (according to the last parse of the file). This is critical for the editor, which must react differently depending on which language contains the cursor at any given moment.

The compiler can support the interoperation of different languages. Specifically, any language can call into any other language. This is accomplished by using a common intermediate language. Since the target platform is the Java VM, the clear choice for intermediate language is Java itself. The compiler has a common Java back-end, which is used by all languages for producing byte codes. Each language is able to translate from its parse tree into Java classes. These classes are placed into the type cache to allow other languages to reference them.

Also important is the framework for language nesting. The outer language is able to determine where the inner language begins. Either the inner or the outer language may determine where the inner language ends. (In the normal case, the outer language will determine this. However, in special cases, the inner language can as well.) The file compiler will remember where the language nesting occurred for reuse on the next parse. Lastly, the outer language may implement a name resolution interface to allow the inner language to resolve references to names defined outside of the nested language.

Thread Pool

A thread pool can be used in both the IDE and runtime. In the context of the IDE, all parsing needs to be performed on background threads so that the process may be interrupted (if the user starts typing, for example). In the context of the runtime, the thread pool allows compilation of multiple files to be performed in parallel. Compilation should scale linearly to the number of processors. Naturally, all compiler data structures are implemented with appropriate synchronization. They do not assume that the client is accessing the APIs in a single-threaded manner.

Languages

Language objects can provide the editor with information needed to implement editor features. Language objects contain a method for retrieving different types of information using keys. If that language provides the information, the result of the lookup will be an object implementing a known interface. If not, the result will be null.

Standard interfaces exist for the type of information needed to implement standard editor features. Features that only exist for one language are implemented with custom interfaces. Standard interfaces also have default (abstract) implementations. Language implementers that want to provide such information only need to implement the abstract methods of the default implementation.

As an example, one standard interface provides information about matching characters in the token stream. This may be used to implement several features in the editor, such as the bolding of matching characters and the move to matching character keyboard command. To provide this information for a particular language, the language implementer only needs to implement methods describing which tokens match with which other tokens. The code that performs the search will be provided in the default base class.

These interfaces do not represent editor features directly. Rather they will represent types of information that is used to implement editor features. The code for turning this information into real features will exist in the editor.

As described above, data structures in the file compiler allow the editor to retrieve the stack of languages in affect a given point in the code. Maintaining languages as objects that can be retrieved in this manner is important because it provides that the same language features are available no matter where that language is used. For example, XML end tag completion should be available whether the user is editing a WSDL file, an XML map nested inside of an annotation in a JWS file, or XML in a script file. This will occur because all situations return the same language object for the XML part of the source.

Compiler Framework Interaction

When a new file is added to the project or an existing file is modified, the editor can notify the compiler of the change (e.g., via the interface com.bea.compiler.IProject). The compiler framework and the editor can both have access to the text buffer containing the contents of the file being edited. Each time the user modifies the file, the following exemplary steps can be taken.

1. The user types a character (or otherwise modifies the file)
2. The editor sends a change notification to the compiler framework identifying the changed file, changed text and the type of change (see the interfaces com.bea.compiler.IFileChange and com.bea.compiler.ITextChange)
3. The compiler framework reads and retokenizes the source updating the Token and Node information
4. The compiler framework then enqueues a task for itself to complete the rest of the compilation in a background thread so the user gets immediate feedback and does not detect any visible delay in typing responsiveness while the compiler finishes processing the change.
5. The editor then repaints the screen giving immediate feedback to the user and showing the syntax coloring associated with the new tokenization.
6. Every 250 milliseconds or so, the compiler framework empties the tasks it has enqueued for itself and completes the remaining steps in the background.
7. The compiler framework compiles the changed file(s) in the background. [Note, a change to one file might actually result in several files being recompiled and e.g., new errors being generated for those files. The compiler maintains a type cache that represents dependencies between files enabling it to determine which files must be recompiled based on a given change.]
8. The compiler framework notifies the editor and IDE of changes indicating which files have changed e.g. using the method com.bea.ide.sourceeditor.DefaultSourceDocument.mergeMetadata( )
9. The editor reexamines those files and merges the changes with its own internal representation of the parse tree (see section 0). It generates change notifications for each item it identifies that has changed.
10. The editor repaints the screen showing visual representations of the parsing results.

For example, newly introduced errors may be highlighted using squiggly red underlines. If the code structure has changed, the change may be reflected in the structure browser.

It is important to note that the compiler may only complete a small amount of work needed to give immediate feedback to the user while the user is typing. All the larger tasks can be staged for background computation, so as not to disrupt responsiveness to the user.

Parse Tree Merge Algorithm

To maintain a positive user experience, it can be important for the merge algorithm mentioned above to be very efficient and to identify the minimal number of changes required to synchronize the parse trees maintained by the editor and the compiler framework. Each change notification generated by this algorithm may result in a significant amount of additional work, which could slow the system down. Therefore, naïve comparison algorithms that tend to "get lost" and generate false positives for portions of the file that have not actually changed may not suffice.

One merge algorithm with acceptable characteristics is presented below. The algorithm is recursive and is initially called passing the root nodes of the destination parse tree and source parse tree as parameters. The trees are constructed of nodes with edges connecting each parent node to its child nodes. Each destination node has a set of properties, which must be updated based on the associated source node.

MergeParseTrees(destinationNode, sourceNode)

```
1. For each propery p on the destinationNode, set the value of p to the
   value of the property of the sourceNode with the same name as p.
2. Let numDestinationChildren = the number of child nodes of
   destinationNode
3. Let numSourceChildren = the number of child nodes of sourceNode
4. Let maxComparisons = minimum(numDestinationChildren,
   numSourceChildren)
5. // compare children left to right merging them until a match is not
   found
6. Let lastLeftMatch = −1
7. Let childEqual = true
8. Let i = 0
9. while (i < maxComparisons and childEqual == true)
     a. Set childEqual to true if destinationNode.child(i) is equal to
        sourceNode.child(i) (i.e., they refer to the same item in the
        document))
     b. Otherwise set childEqual to false.
     c. If childEqual == true
          i.  MergeParseTrees(destinationNode.child(i),
              sourceNode.child(i))
          ii. lastLeftMatch = i
     d. i = i + 1
10. // if all children have been compared equal, return
11. if (numDestinationChildren == numSourceChildren) and
    (lastLeftMatch == numSourceChildren−1)
     a. return
12. // compare children right to left merging them until a match is
    not found
13. Let lastRightMatch = maxComparisons
14. childEqual = true
15. i = maxComparisons −1
16. while (i > lastLeftMatch and childEqual == true)
     a. Set childEqual to true if destinationNode.child(i) is equal to
        sourceNode.child(i) (i.e., they refer to the same item in
        the document))
     b. Otherwise set childEqual to false.
     c. If childEqual == true
          i.  MergeParseTrees(destinationNode.child(i),
              sourceNode.child(i))
          ii. lastRightMatch = i
     d. i = i + 1
17. Let gap = lastRightMatch − lastLeftMatch − 1
18. Let sourceGap = numSourceChildren − maxComparisons + gap
19. Let destinationGap = numDestinationChildren −
    maxComparisons + gap
20. // remove deleted nodes
21. if (sourceGap == 0 and destinationGap > 0)
     a. for j = 0 to destinationGap
          i.  destinationNode.removeChild(lastLeftMatch + 1)
22. // add inserted nodes
23. else if (sourceGap > 0 and destinationGap == 0)
     a. for j = 0 to sourceGap
          i.  Let child = sourceNode.child(lastLeftMatch + j + 1)
          ii. destinationNode.insertChild(lastLeftMatch +
              j + 1, child)
```

-continued

MergeParseTrees(destinationNode, sourceNode)

```
24. // same number of nodes in gap. Replace or merge
25. else if (sourceGap == destinationGap)
     a. for j = 0 to destinationGap
          i.   Let sourceChild = sourceNode.child
               (j + lastLeftMatch + 1)
          ii.  Let destChild = destinationNode.child
               (j + lastLeftMatch + 1)
          iii. If sourceChild and destChild are the same type
               of node, MergeParseTrees(destchild, sourceChild)
          iv.  Otherwise, replace destChild with sourceChild in
               sourceNode
26. // different number of nodes in gap. Remove and Insert
27. else
     a. for j = destinationGap−1 downto 0
          i.  destinationNode.removeChild(lastLeftMatch + j + 1)
     b. for j = 0 to sourceGap
          i.  Let child = sourceNode.child(lastLeftMatch + j + 1)
          ii. destinationNode.insertChild(lastLeftMatch + j +
              1, child)
28. return
```

Language Nesting

Because an editor can be language independent, nested languages can be handled. All detailed knowledge about the various languages can be embedded in language modules plugged into the underlying compiler framework. A compiler framework can use language neutral APIs described elsewhere herein to communicate understanding of the language concepts to the editor (e.g., positions and types of tokens, errors, etc.).

The editor can use the information provided by the compiler framework to determine which language is currently being edited and detect when the user moves the cursor from one language to another. This is useful e.g. if the user wants to establish different editing or display preferences for each language. For example, FIG. 3 shows how different syntax coloring schemes might be applied for the Java, HTML and JSP tag languages in a JSP file.

The compiler can expose information about the languages used in a source file as a tree of language nodes. Each language node can identify a section of the file written in a particular language. The start position, stop position and information about the language (e.g., its name) are provided. If necessary, the editor can navigate this tree to understand all the languages used in a given source file and how they are nested inside one another.

The compiler framework can determine the initial language of each file using the file type (e.g., determined by a filename extension). It can then pass the file to language module that is registered to process files of that type. The language module in turn is programmed to identify the type and start position of any nested languages allowed in that language. The language module may also identify the end position of the nested language, but may request the assistance of the nested language processor for this task. Once the type and boundaries of a nested language are identified, the compiler framework will pass this portion of the file to the language module registered to process that language type. This process may continue allowing the editor and compiler framework to handle arbitrarily deeply nested languages.

Language Drivers

If the developer of a language module or custom language editing view wants to expose unique editing features tailored toward a specific language, they can implement a language driver. The language driver encapsulates the unique characteristics of the language and allows them to be plugged directly into the editor without requiring language specific features to be added to the editor itself. The complete API for developing language drivers is described in detail elsewhere herein.

Custom Editors and Views

Developers that wish to build custom editors for specific languages may do so by creating a class that implements the ISourceDocument interface specified elsewhere herein. The class DefaultSourceDocument can provide a default implementation of all the relevant editor features. Developers may derive their implementation from this class so they only have to override the specific behaviors they want to customize.

Likewise, developers wishing to build custom views for a specific language may do so by creating a class that implements the ISourceView interface specified also specified elsewhere herein. The class DefaultSourceView can provide a default implementation of all relevant view features. Developers may derive their implementation of ISourceView from this class so they only have to override the specific behaviors they want to customize.

Application Interfaces

Editor Extension API

A language independent editor can expose a set of APIs that can be used to define custom editor features and custom views for specific languages (e.g., visual editing tools). The full details of this API are described in this section.

| Packages | |
|---|---|
| com.bea.ide.sourceeditor | Defines how the editor can be extended to support custom editing features and views e.g. for a particular language |
| com.bea.ide.sourceeditor.compiler | Defines ways custom editors or views can interact with and get language information from the compiler |
| com.bea.ide.sourceeditor.driver | Defines how the editor can be extended with custom language drivers for implementing special language features inthe editor |

-continued

| Packages | |
|---|---|
| com.bea.ide.sourceeditor.element | Defines how the editor can be extended to support new or modified elements in the language. Elements are recognizable pieces of a document (e.g., a function name) |
| com.bea.ide.sourceeditor.model | Defines ways custom editors or views can interact with the document model. The document model is a data structure that contains the text of a document. |
| com.bea.ide.sourceeditor.ui | Defines mechanisms developers can use to implement custom UI features |

Package com.bea.ide.sourceeditor

This package defines how the editor can be extended to support custom editing features and views e.g. for a particular language. Its classes and interfaces are described below.

public class com.bea.ide.sourceeditor.SourceUndoManager extends
javax.swing.undo.UndoManager

```
Constructors  public SourceUndoManager(
                  ISourceDocument file)
Methods       public void discardAllEdits( )
              Clear all edits in the undo queue. These undos are then lost,
              and so the edits may not be undone.
              public void undo( )
              public void redo( )
              public void setIgnoreEdits(
                  boolean ignoreEdits)
              public boolean addEdit(
                  UndoableEdit e)
```

public interface com.bea.ide.sourceeditor.ISourceView implements com.bea.ide.document.IDocumentView The ISourceView interface allows for manipulation of many end-user visible attributes of a document's text view.

```
Methods  public boolean setSelection(
             int lineStart,
             int colStart,
             int lineEnd,
             int colEnd,
             int scrollMode)
         Selects the indicated text range. To simply move the cursor, rather than select text, pass −1
         for lineEnd and colEnd . To goto the start of a line, pass −1 for colStart . For example,
         selectSource(12, −1, −1, −1) moves the cursor to the start of line 12.
         public boolean setSelection(
             Range selRange,
             int scrollMode)
         Selects the range of text indicated.
         public boolean setSelection(
             ISourceElement el,
             int scrollMode)
         Selects the specified element. Note that calls to this method, unlike the other setSelection
         methods, are passed through to @link
         com.bea.ide.sourceeditor.driver.ISourceViewDriver#getSelectionRange
         ISourceViewDriver.getSelectionRange to determine the exact text range that should be
         selected.
         public boolean replaceSelectedText(
             String strReplacement)
         Replaces any selected text with the specified string. If no text is selected, the text will be
         inserted at the current caret insertion point.
         public java.lang.String getSelectedText( )
         Returns
             the text selected in the source view. May return an empty string or null.
         public boolean isSingleLineSelection( )
         public java.lang.String getWordAtCaret( )
```

```
public com.bea.ide.util.Range getWordRangeAround(
        int pos)
public com.bea.ide.util.Range getLineRangeAround(
        int pos)
public int getCaretPosition( )
Returns
        the zero-based character offset of the caret within the view.
public void setCaretPosition(
        int pos,
        int scrollMode)
Sets the caret position within the source view.
Parameters
        pos - the zero-based character offset of the desired caret position
        fAutoScroll - specifies whether the source view should scroll, if necessary, to ensure
that the caret is visible.
public void setSelectionStart(
        int offset,
        int scrollMode)
Sets the offset of the start of the source selection. The start and end are always normalized
(start <= end).
Parameters
        offset - the zero-based character offset of the desired selection start.
        fAutoScroll - specifies whether the source view should scroll, if necessary, to ensure
that the selection is visible.
public void setSelectionEnd(
        int offset,
        int scrollMode)
Sets the offset of the end of the source selection. The start and end are always normalized
(start <= end).
Parameters
        offset - the zero-based character offset of the desired selection end.
        fAutoScroll - specifies whether the source view should scroll, if necessary, to ensure
that the selection is visible.
public void setSelectionMark(
        int offset,
        int scrollMode)
Sets the offset of the anchor mark of the source selection.
Parameters
        offset - the zero-based character offset of the desired selection mark.
        fAutoScroll - specifies whether the source view should scroll, if necessary, to ensure
that the selection is visible.
public void setSelectionDot(
        int offset,
        int scrollMode)
Sets the offset of the movable dot of the source selection.
Parameters
        offset - the zero-based character offset of the desired selection dot.
        fAutoScroll - specifies whether the source view should scroll, if necessary, to ensure
that the selection is visible.
public int getSelectionStart( )
Returns
        the zero-based offset of the start of the text selection. This is equivalent to the value
returned from @link ISourceView#getSelectionEnd <code>getSelectionEnd</code> in the
case where there is no selected text.
public int getSelectionEnd( )
Returns
        the zero-based offset of the end of the text selection. This is equivalent to the value
returned from @link ISourceView#getSelectionStart <code>getSelectionStart</code> in the
case where there is no selected text.
public javax.swing.text.Caret getCaret( )
Returns
        the current caret.
public java.lang.String getEditableLineText(
        int sourceLine,
        Range range)
Returns that portion of a line's text which is not collapsed. This could be null if the entire line
is collapsed. It could be just the beginning, end, or middle of the line if it borders one or more
collapsed blocks. Or it could be the entire line text if the line is not collapsed.
Parameters
        sourceLine - is the 0-based line in the file.
        range - is an out-parameter that gets set to the position range that equates to the
string. It may be null if it is not requested.
public int getOffset(
        Point p)
Returns
        offset in the document for the element at the given point, -1 if there is no element at
that location
public void showPopupTip(
        IPopupTip tip)
```

-continued

Displays a popup tip in an active source editor. If the source view is not active, this method does nothing.
Parameters
tip - the tip to display
offset - the offset associated with the tip. This may or may not be the exact location where the popup appears, depending on several factors including viewport and caret position.
public void addHoverListener(
IHoverListener hoverListener)
Adds a hover listener to this source view. This listener will be notified whenever the mouse hovers over a particular point for a fixed period of time. Note that hover listeners are only useful while the source view is active.
public void removeHoverListener(
IHoverListener hoverListener)
Removes a hover listener from this source view.
Fields public static final RIGHT__CLICK__POINT__KEY
Key for a cookie on the Application that stores where the user last right clicked in the SourceView
public static final SCROLL__MINIMAL
If a new selection is off the screen, scroll it barely onto the screen.
public static final SCROLL__MIDDLE
If a new selection is off the screen, scroll it to the middle of the screen.
public static final SCROLL__MIDDLE__FORCE
If a new selection is not in the middle of the screen, scroll it to the middle of the screen. That is, selections in the top 2 or bottom 5 visible lines will scroll to the middle.

public interface com.bea.ide.sourceeditor.ISourceDocument implements com.bea.ide.document.IDocument ISourceDocument should be implemented by all document types with text data that wish to perform basic compiler-related functionality such as syntax coloring and parse tree support.

Methods public !Token getTokenFromOffset(
int offset)
Parameters
offset - a zero-indexed character offset within a document.
Returns
returns the !Token object at the specified offset. This method should never return null, though the token returned may simply indicate that the token information is currently unknown. Note that there is no guarantee that sequential calls to <code>getTokenFromOffset</code>will return the same object or value, as compiler structures are possibly being rebuilt at any time.
public com.bea.ide.element.lElement getElementFromOffset(
int offset)
Parameters
offset - a zero-based character index within the document.
Returns
the parse tree element found at the specified offset. May return null if the document is not parsed at the time that the method is called.
public boolean mergeMetadata(
ISourceElement sourceRootElement)
mergeMetaData is called by the IDE to indicate that a new parse tree is available due to a recompile. Implementors guarantee that after the merge all elements with unchanged properties remain unchanged, with the exception of range and compiler cookie information, and that appropriate change events are generated for all elements that are not equivalent.
public com.bea.ide.sourceeditor.modeliSourceModel getSourceModel( )
Returns
the source model associated with this source document. Once the file is initially loaded, this method should never return null.
Fields public static final PROP_MID_TWOWAY_EDIT
This property indicates that a document is currently performing a two-way edit. Because two-way edits require multiple interactions between the IDE and compiler threads, there is a short period of time after the edit request during which the document does not fully reflect the change. This property can be used to detect when two-way edits start and complete.
public static final PROP_LAST_COMPILATION_REQUEST
This property is the unique ID (a Long) of the last compilation request sent to the compiler. Listening on this property is useful if an extension requires finer-grained knowledge of compilation state than can be gained by listening to element change events alone. When used with property @link #PROP_LAST_COMPILATION PROP_LAST_COMPILATION, this property can be used to determine when the compiler responds to specific compilation requests.
public static final PROP_LAST_COMPILATION
This property is the unique ID (a Long) of the last compiler request for which the IDE had received a compiler compilation response for this file. Note that this ID may correspond to a -continued

| |
|---|
| compilation request for another file, if this file was recompiled due to a dependency, rather than a direct compilation request. Listening on this property is useful if an extension requires finer-grained knowledge of compilation state than can be gained by listening to element change events alone. When used with property @link #PROP_LAST_COMPILATION_REQUEST PROP_LAST_COMPILATION_REQUEST, this property can be used to determine when the compiler responds to specific compilation requests. |
| public static final PROP_HAS_ERRORS |
| This is a boolean property indicating whether the document contains any diagnostics classified as errors. |
| public static final PROP_HAS_WARNINGS |
| This is a boolean property indicating whether the document contains any diagnostics classified as warnings. |

public class com.bea.ide.sourceeditor.EditorSvc

| | |
|---|---|
| Constructors | public EditorSvc( ) |
| Methods | public static com.bea.ide.sourceeditor.EditorSvc.I get( ) |
| Fields | public static final ATTR_TAB_WIDTH |
| | public static final ATTR_INDENT_WIDTH |
| | public static final ATTR_FONT_NAME |
| | public static final ATTR_FONT_SIZE |
| | public static final ATTR_FORE_COLOR |
| | public static final ATTR_BACK_COLOR |
| | public static final ATTR_SELECTION_TEXT_COLOR |
| | public static final ATTR_SELECTION_BACK_COLOR |
| | public static final ATTR_BREAKPOINT_BACK_COLOR |
| | public static final ATTR_BREAKPOINT_FORE_COLOR |
| | public static final ATTR_INSTRPOINT_BACK_COLOR |
| | public static final ATTR_INSTRPOINT_FORE_COLOR |
| | public static final ATTR_LINE_NUMBER_COLOR |
| | public static final ATTR_SHOW_LINE_NUMBERS |
| | public static final ATTR_SHOW_MATCHING_CHARS |
| | public static final ATTR_SHOW_WHITESPACE |
| | public static final ATTR_SHOW_SEPARATORS |
| | public static final ATTR_ENABLE_COLLAPSING |
| | public static final ATTR_OVERWRITE |
| | Names the property that stores whether we are in overwrite mode. |
| | public static final ATTR_AUTO_INDENT |
| | Names the property that indicates whether we should auto indent. |
| | public static final ATTR_INSERT_STAR |
| | Names the property that indicates whether we should insert a star after newline within a comment indent. |
| | public static final ATTR_EDIT_READONLY |
| | Names the property that indicates whether we should allow editing of read-only files. |
| | public static final ATTR_SMART_BACKSPACE |
| | Names the property that indicates whether we backspace in indent-sized blocks when the caret is on an indention boundary. |
| | public static final ATTR_INDENT_AFTER_BRACE |
| | Names the property that indicates whether we should add an extra indent for each opening brace on the line before. |
| | public static final ATTR_ALIGN_CLOSING_BRACE |
| | Names the property that determines if we should auto-indent the brace. |
| | public static final ATTR_INSERT_TABS |
| | Names the property that stores whether tabs can be used for indenting. |
| | public static final ATTR_MOUSE_OVER_DELAY |
| | Names the property used for the delay before trying to put up window displaying information about the token (a.k.a. tooltip). |
| | public static final ATTR_PARAM_COMPLETION |
| | Names the property that stores whether parameter completion is enabled. |
| | public static final ATTR_METHOD_COMPLETION |
| | Names the property that stores whether method completion is enabled. |
| | public static final SCROLL_MINIMAL |
| | If a new selection is off the screen, scroll it barely onto the screen. |
| | public static final SCROLL_MIDDLE |
| | If a new selection is off the screen, scroll it to the middle of the screen. |
| | public static final SCROLL_MIDDLE_FORCE |
| | If a new selection is not in the middle of the screen, scroll it to the middle of the screen. That is, selections in the top 2 or bottom 5 visible lines will scroll to the middle. |
| | protected static instance |

public static interface com.bea.ide.sourceeditor.EditorSvc.I

| | |
|---|---|
| Methods | public com.bea.ide.sourceeditor.ISourceView getCurrentSourceView( )<br>public com.bea.ide.sourceeditor.ISourceView createSourceView(<br>ISourceDocument doc)<br>public com.bea.ide.sourceeditor.modeliSourceModel createSourceModel(<br>URI uri)<br>public boolean reloadSourceModel(<br>ISourceModel model,<br>URI uri)<br>public void switchToFile(<br>URI file,<br>int lineNumber,<br>int colNumber,<br>int colEnd)<br>public void switchToFile(<br>URI file,<br>int lineNumber,<br>int colNumber,<br>int colEnd,<br>int scrollMode) |

public class com.bea.ide.sourceeditor.DefaultSourceViewInfo extends com.bea.ide.document.DefaultDocumentViewInfo Utility class allowing for delayed loading of a document's source view. The only reason for this extension of DefaultDocumentViewInfo is to provide a means of checking to see whether the view has been created so that unneccesary view construction can be avoided.

| | |
|---|---|
| Constructors | public DefaultSourceViewlnfo(<br>ISourceDocument doc,<br>String strName,<br>Icon icon,<br>String strDescription) |
| Methods | public com.bea.ide.document.IDocumentView createView( )<br>public boolean isViewCreated( )<br>Returns<br>whether this document's ISourceView object has been instatiated. |

public abstract class com.bea.ide.sourceeditor.DefaultSourceDocument extends com.bea.ide.document.DefaultDocument implements com.bea.ide.sourceeditor.ISourceDocument A default implementation of ISourceDocument. This makes the assumptions that any ISourceElement parse tree is made up of element types deriving from DefaultSourceElement. Usage Subclasses of this one need only implement @link #createDrivers( )??

| | |
|---|---|
| Constructors | public DefaultSourceDocument(<br>Class handler,<br>URI fileURI)<br>Creates a new document with empty content using the appropriate editor kit for this file (as provided by the subclass). |
| Methods | protected javax.swing.undo.UndoManager createUndoManager( )<br>protected javax.swing.event.UndoableEditListener createUndoableEditListener( )<br>public synchronized void requestTwoWayEdit(<br>TwoWayEdit edit)<br>Initiates a two-way edit from a @link com.bea.ide.sourceeditor.compiler.TwoWayEdit TwoWayEdit object. While this method may be called directly, this is almost never done; generally, all requests for two-way edits should go through an @link com.bea.ide.sourceeditor.element.ISourceElement ISourceElement implementation. When called, this method will block the AWT thread until the requested edit completes.<br>Parameters<br>edit - The object defining this edit.<br>public boolean onOpen( )<br>public void onRemove( )<br>protected void uriChanged(<br>URI uriOld,<br>URI uriNew)<br>public java.lang.String getHandlerld( )<br>public com.bea.ide.document.IDocumentViewInfo[ ] getViewInfo( )<br>public IToken getTokenFromOffset(<br>int offset)<br>public boolean isMerging( )<br>Lets external users check to see if the document's parse tree is currently being merged. Tree merging always takes place on the AWT thread, and always blocks that thread from start until completion, so this method is only interesting when called from another thread.<br>public boolean mergeMetadata(<br>ISourceElement sourceRootElement)<br>public com.bea.ide.sourceeditor.model.ISourceModel getSourceModel( )<br>public com.bea.ide.sourceeditor.ISourceView getSourceView( )<br>Gets the ISourceView object associated with this document.<br>Important: This method will create the source view if it does not exist, and so should be used with extreme caution: creation of views is very expensive, and should only be done if absolutely necessary, generally only when the user specifically requests to see the source view for this document.<br>Returns<br>This document's source view.<br>protected void setRootElement(<br>IElement root)<br>public com.bea.ide.element.IElement getElementFromOffset(<br>int offset) |

-continued

| | |
|---|---|
| | public java.io.Reader getReader( )<br>public boolean reload( )<br>protected void createDrivers( )<br>Creates the strategies for this file, calling addStrategy on each. |
| Fields | public static final PROP_LineNumber<br>public static final PROP_ColumnNumber |

public class com.bea.ide.sourceeditor.DefaultFileStatus implements com.bea.ide.ui.statusbar.IFileStatus A simple object for setting line and column information displayed in the status bar.

| | |
|---|---|
| Constructors | public DefaultFileStatus(<br>IDocument doc)<br>Creates the IFileStatus object for the specified document.<br>Parameters<br>doc - The file with which this file status object will be associated. |
| Methods | public void setLineAndColumn(<br>int line,<br>int column)<br>Sets the line and column information displayed in the status bar. It is never necessary to call this method directly if the DefaultSourceDocument and built-in ISourceView implementations are used.<br>public int getLine( )<br>Returns the current line number as displayed in the status bar. It is almost always preferable to call @link com.bea.ide.sourceeditor.ISourceView#getCaretPosition ISourceView.getCaretPosition, and then convert that offset to line and column information via the @link com.bea.ide.sourceeditor.modeliSourceModel ISourceModel interface, since the status bar UI is not necessarily in sync with the actual caret position within the document.<br>Returns<br>The current line number as displayed in the status bar.<br>public int getColumn( )<br>Returns the current column number as displayed in the status bar. It is almost always preferable to call @link com.bea.ide.sourceeditor.ISourceView#getCaretPosition ISourceView.getCaretPosition, and then convert that offset to line and column information via the @link com.bea.ide.sourceeditor.model.ISourceModel ISourceModel interface, since the status bar UI is not necessarily in sync with the actual caret position within the document.<br>Returns<br>The current column number as displayed in the status bar. |

Package com.bea.ide.sourceeditor.compiler

This package defines ways custom editors or views can interact with and get language information from the compiler. Its classes and interfaces are described below.

public abstract class com.bea.ide.sourceeditor.compiler.TwoWayEdit

A utility class to handle the details of submitting a two-way edit request to the compiler. While this class may be used directly, two-way edits are almost always initiated with methods on the @link com.bea.ide.sourceeditor.elementiSourceElement ISourceElement interface, making direct use of this class unneccesary.

| | |
|---|---|
| Constructors | protected TwoWayEdit(<br>ISourceElement elemSource,<br>Object data) |

-continued

| | |
|---|---|
| Methods | public boolean fire( )<br>public abstract boolean doEdit(<br>IStructureFeature feature) |
| Fields | protected__elemSource<br>protected__data |

public static class com.bea.ide.sourceeditor.compiler.TwoWayEdit.AddChild extends com.bea.ide.sourceeditor.compiler.TwoWayEdit

| | |
|---|---|
| Constructors | public TwoWayEdit.AddChild(<br>ISourceElement elemParent,<br>ISourceElement elemChild)<br>public TwoWayEdit.AddChild(<br>ISourceElement elemParent,<br>ISourceElement elemChild,<br>int index) |
| Methods | public boolean doEdit(<br>IStructureFeature feature) |
| Fields | protected _index |

public static class com.bea.ide.sourceeditor.compiler.TwoWayEdit.ChangeProperty extends com.bea.ide.sourceeditor.compiler.TwoWayEdit

| | |
|---|---|
| Constructors | public TwoWayEdit.ChangeProperty(<br>ISourceElement elemParent,<br>String prop,<br>Object value) |
| Methods | public boolean doEdit(<br>IStructureFeature feature) |

public static class com.bea.ide.sourceeditor.compiler.TwoWayEdit.RemoveChild extends com.bea.ide.sourceeditor.compiler.TwoWayEdit

| | |
|---|---|
| Constructors | public TwoWayEdit.RemoveChild(<br>ISourceElement elemParent,<br>ISourceElement elemChild) |
| Methods | public boolean doEdit(<br>IStructureFeature feature) |

public class com.bea.ide.sourceeditor.compiler.JavaBuilder implements com.bea.ide.sourceeditor.compiler.ILanguageBuilder The builder class for java document types. This builder will handle construction of IDE-side parse trees for document types made up of java and java annotation languages.

The parse tree constructed is made up of @link com.bea.ide.sourceeditor.element.DefaultSourceElement DefaultSourceElement derivations, and contains most frequently needed parse information. Parse trees constructed by this class do not contain any parse information for Java method bodies. This is done intentionally, for performance reasons.

Construction of the parse tree takes place through calls into the builder methods from the compiler framework. See the @link com.bea.ide.sourceeditor.driver.ICompilerDriver ICompilerDriver for information on how to specify a builder for a different document type.

| | |
|---|---|
| Constructors | public JavaBuilder( ) |
| Methods | public IStructureFeature.IStructureNode createNode(<br>IStructureFeature.StructureCode typeCode,<br>Object structureCookie) |

-continued

| |
|---|
| public void setProperty(<br>IStructureFeatureiStructureNode node,<br>IStructureFeature.StructureCode typeCode,<br>Object o)<br>public void addChild(<br>IStructureFeature.IStructureNode node,<br>IStructureFeaturentructureNode nodel) |

public interface com.bea.ide.sourceeditor.compiler.IPackageCache

| | |
|---|---|
| Methods | public java.lang.Object getCacheStatus(<br>IProject proj)<br>Returns the status of the package cache. Attempts to access the cache before loading is complete will not cause failures, but they will produce empty or incomplete results.<br>public java.util.List getMatchingTypes(<br>IProject proj,<br>String shortName,<br>boolean sourceOnly,<br>boolean prefixMatch,<br>boolean matchCase)<br>Returns an list of ITypeDefinition objects corresponding to all types matching the specified type name within the specified IDE project. In the case of type name "List", at least two type definitions will be returned: "java.util.List", and "java.awt.List". Note that only public types will be returned; package private type definitions are ignored.<br>Parameters<br>proj - The IDE project in which to look for matching types.<br>shortName - The short name of the desired type<br>sourceOnly - Whether non-source classes should be considered. If true, only those classes defined in the specified project's source path will be serached. If false, the project's classpath will be searched as well.<br>prefixMatch - If true, all types with names beginning with the specified type name will be returned.<br>matchCase - Indicates whether a case-sensitive check should be used to determine matching types.<br>public boolean isAmbiguous(<br>IProject proj,<br>String typeName,<br>boolean sourceOnly)<br>Returns whether there are multiple types that match the non-qualified type name. This method is generally used to determine if a given type should be presented to the user in simple or fully-qualified format.<br>Parameters<br>proj - The project in which to look for the type.<br>typeName - The qualified or non-qualified name of the type in question.<br>sourceOnly - Whether non-source classes should be considered. If true, only those classes defined in the specified project's source path will be serached. If false, the project's classpath will be searched as well.<br>Returns<br>boolean indicating whether the simple name of the specified type is ambiguous within the project.<br>public java.util.List getMatchingQualifiedTypes(<br>IProject proj,<br>String qualifiedTypeName,<br>boolean sourceOnly)<br>Returns a list of all types with the specified fully-qualified name. Except in the case of type shadowing, this list should contain zero or one entry(s).<br>Parameters<br>proj - The project in which to look for the type.<br>qualifiedTypeName - The fully-qualified name of the type in question.<br>sourceOnly - Whether non-source classes should be considered. If true, only those classes defined in the specified project's source path will be serached. If false, the project's classpath will be searched as well.<br>Returns<br>List of all types matching the requested fully-qualified type name. |
| Fields | public static final CACHE_LOADING<br>The cache is actively loading. This process may take some time.<br>public static final CACHE_LOADED<br>The cache is loaded and ready to go. |

public static interface com.bea.ide.sourceeditor.compiler.IPackageCache.ITypeDefinition ITypeDefinition defines a cached package to be a set of two values, a type name and a package name. For example, type java.util.List is split into type name "List", and package "java.util".

| | |
|---|---|
| Methods | public java.lang.String getTypeName( )<br>Returns the type of this package definition. In the case of package java.util.List , this method will return the String "List".<br>public java.lang.String getPackage( )<br>Returns the package of this package definition. In the case of package java.util.List , this method will return the String "java.util".<br>public java.net.URI getSourceURl( )<br>Returns the URI of the source file that defines this type. Null will be returned if source is not available.<br>public java.net.URI getJarURI( )<br>Returns the URI of the classpath jar that contains this type. Null will be returned if the type did not come from a classpath jar. |

public interface com.bea.ide.sourceeditor.compiler. ILanguageBuilder this is basically a wrapper for a Javelin IStructureBuilder.

public interface com.bea.ide.sourceeditor.compiler. ILangObjectMapper

Interface used to map a class of compiler objects returned from <code> ISourceInfoFeature</code> to objects with the interfaces necessary for IDE related features. Use the extension.xml handler 'urn:com-bea-ide:sourceeditor:sourceinfo' to register an implementation of this interface. Entries have the following format: &It:object-mapper class="workshop.sourceeditor.lang.TypeInfoObjectMapper">&It; compiler-object type="com.bea.compiler.info.IMethod"> & It:compiler-object type="com.bea.compiler.info. IPackage">&It;/object-mapper>

| | |
|---|---|
| Methods | public com.bea.ide.sourceeditor.compiler.IIdentifierInfo mapIdentifierInfo(<br>Object info,<br>ISourceDocument doc,<br>int offset)<br>Maps compiler identifier info objects.<br>public com.bea.ide.sourceeditor.compiler.ICompletionSet<br>mapCompletions(List completions)<br>Maps a list of completions to an ICompletionSet implementation. All objects in the list are required to map to the same ILangObjectMapper. Only the first object in the list is used to determin which mapper gets the list. |

public interface com.bea.ide.sourceeditor.compiler.IIdentifierinfo

| | |
|---|---|
| Methods | public java.lang.String getShortName( )<br>public java.lang.String getFullName( )<br>public boolean supportsGoToDefinition( )<br>public boolean handleGoToDefinition( )<br>public java.lang.String getDebugExpression( )<br>Gets the expression the debugger should evaluate for its hovering value, null if it isn't a variable |

public interface com.bea.ide.sourceeditor.compiler.ICompletionSet

Interface representing a set of completions, used for statement completion support.

| | |
|---|---|
| Methods | public java.util.List getCompletions( )<br>Gets that actual set of completions. All objects in the list must implement ICompletionitem.<br>public boolean isPartialCompletion(<br>Strings)<br>True if the string can represent a partial completion match. |

public interface com.bea.ide.sourceeditor.compiler.ICompletionitem

| | |
|---|---|
| Methods | public java.lang.String getDisplayText( )<br>Returns a string containing the text this completion item should show in a drop-down menu. It may be identical to getCompletionText( ). But it may optionally include a data type, a parameter list, or anything else. The string may also optionally use tabs for formatting. Using tabs, the drop-down may define any number of virtual columns. The tab stops move as follows: - The first tab is right-aligned at the end of the first column. - The second tab defines a second column, and left-aligns text. - The third tab is right-aligned at the end of the second column. - etc. Text that is left-aligned on one line may overlap right-aligned text on another line. Thus, two completion items with the following display text: public int ( ) String ( ) would lay<br>out as follows in the drop-down menu: +L--------R-L-----------------+ \|public int getWidth( ) \|\| String doInitialization( ) \| +------------------------------+ where the L and R marks above show the tab stops.<br>public com.bea.ide.sourceeditor.compileriCompletionitem.IFormatRangea<br>getDisplayFormatRanges( )<br>Returns an array of IFormatRange objects, which divide the display text up into sub-strings that should be rendered with alternate fonts or colors, or possibly even with images. Return null to display the entire display text in the default font.<br>public java.lang.String getCompletionText( )<br>Get the text as we would insert it into the document. This should not include the trigger character (i.e. '.' in Java or '<' in XML). It may however include extra characters after the identifier, that would make the insertion complete (such as "( )" after a Java method).<br>public com.bea.ide.util.Range getCompletionTextInsertPosition( )<br>Assuming the entire completion text has been inserted, including any extra characters tacked on, where should the cursor be placed. Return null for the default behavior setting the cursor at the end. Return a range (may be a single position) if the cursor should be placed before or inside the completion text. For example, between the "( )" characters added after a method in Java. |

-continued

| |
|---|
| public boolean isChainingCompletion( )<br>Returns true if the source info feature should be queried for more completions immediately following this completion. |

public static interface com.bea.ide.sourceeditor.compiler.ICompletionitem.IFormatRange getRange( ) should return a 0-indexed range of text from getDisplayText that it wants to apply a format to. getTokenName( ) is used to look up that token name in the syntax coloring feature. As such, the token-names should be the same as what the compiler spits out (i.e. "java.identifier"). getImage( ) is only used if getTokenName( ) returns null. getImage( ) returns an image to display in place of the characters covered by the range.

| | |
|---|---|
| Methods | public com.bea.ide.util.Range getRange( )<br>public java.lang.String getStyleName( )<br>public javax.swing.Icon getIcon( ) |
| Fields | public static final BOLD |

public interface com.bea.ide.sourceeditor.compiler.ICompilerDiagnostic

| | |
|---|---|
| Methods | public java.lang.String getCode( )<br>Returns a code for the error.<br>public java.lang.String getDescription( )<br>Returns the description of the diagnostic.<br>public int getOffset( )<br>Returns the offset of the diagnostic<br>public int getLength( )<br>Returns the length of the diagnostic<br>public java.lang.String getPrescription( )<br>Returns the prescription for the diagnostic or null if none is exists.<br>public int getType( )<br>Returns the type of this diagnostic. |
| Fields | public static final TYPE_ERROR<br>public static final TYPE_WARNING<br>public static final TYPE_INFO |

public class com.bea.ide.sourceeditor.compiler.CompilerSvc

The Compiler Service is the general mechanism for communication between the IDE and Javelin, BEA's compiler framework. Since this type of communication is extremely structured, occurring primarily when the file system or document contents change, it is rarely necessary to call many of these methods explicity in an IDE extension. Some, like @link com.bea.ide.sourceeditorcompiler.CompilerSvc.I#getFeature getFeature are frequently called by external consumers.

| | |
|---|---|
| Constructors | public CompilerSvc( ) |
| Methods | public static com.bea.ide.sourceeditor.compiler.CompilerSvc.I get( ) |
| Fields | public static final SYNCHRONOUS_TWOWAY_EDITS<br>protected static instance |

public static interface com.bea.ide.sourceeditor.compiler.CompilerSvc.ITwoWayEditLock

| | |
|---|---|
| Methods | public boolean runMerger( )<br>call 'runMerger' to merge the new parse trees and update the IDE's error list.<br>This call shouldONLY be made on the AWT thread.<br>Returns<br>boolean indicating success or failure. This method should only fail in the<br>case ofcatastrophic application or compiler failure. |

public static interface com.bea.ide.sourceeditor.compiler.CompilerSvc.ICompilerLockManager

| | |
|---|---|
| Methods | public void acquireReadLock( )<br>Acquires a read lock for the compiler project. Note that this lock MUST be released when the client is done with the necessary compiler operations.<br>public void releaseReadLock( )<br>Releases the comiler read lock. |

public static interface com.bea.ide.sourceeditor.compiler.CompilerSvc.I

| | |
|---|---|
| Methods | public java.lang.Object getProperty(<br>String name,<br>Object defValue)<br>Parameters<br>name - a property key<br>Returns<br>a global compiler property<br>public java.lang.Object getProperty(<br>IProject proj,<br>String name,<br>Object defValue)<br>Parameters<br>proj - an IDE project in the current workspace<br>name - a property key<br>Returns<br>a project specific compiler property<br>public boolean hasCompiler(<br>IProject proj)<br>Determines whether a specific IDE project has an active compiler project.<br>Parameters |

-continued

```
   proj - and IDE project in the current workspace
Returns
   true if there is an associated compiler project
public com.bea.compiler.IProject getProject(
   IProject proj)
todo: remove this. we shouldn't be exposing the compiler IProject.
Parameters
   proj - an IDE project in the current workspace
Returns
   the compiler project associated with a specific IDE project
public java.util.Iterator getLanguages( )
Returns
   an iterator of com.bea.compiler.ILanguage objects currently loaded by the compiler.
public boolean hasLanguage(
   String ext)
Returns true if the given file extension has a default language registered with the compiler
Returns
   true if the compiler has a language registered for the given extension
public boolean isFilenameRestricted(
   String ext)
Returns true if files with this extension have a restricted namespace in the filesystem. It is
assumed that this namespace is shared with all other extensions that are also restricted. This
check is done by seeing if the language registered for this extension is a name restricted
language.
public boolean sameLanguage(
   String ext1,
   String ext2)
Determines whether or not two extensions have the same default language
Returns
   true if the extensions have the same default language
public boolean registerExtension(
   String extNew,
   String extExisting)
Registers the given new extension to have the same language as the existing extension. Note
that if the existing extension does not have a language associated with it or if the new
extension already has an existing language, this method will do nothing and return false.
Returns
   true if the new extension now has the same language as the existing extension,
false otherwise.
public boolean isFeatureAvailable(
   ISourceDocument doc,
   Class featureClass)
Determines if a compiler feature is available for a given document.
Parameters
   doc - the document associated with the desired feature instance
   featureClass - the class of the desired feature. For example,
<code>IStructureFeature.class</code>
Returns
   true if the feature is valid for the document.
See Also
   com.bea.ide.sourceeditor.driver.ICompilerDriver#getAvailableFeatures
public java.lang.Object getFeature(
   ISourceDocument doc,
   Class featureClass)
Allows access to compiler features associated with a specific document. Note that the only
allowable feature classes for a paticular document type are those explicitly returned from the
document's ICompilerDriver's @link
com.bea.ide.sourceeditor.driver.ICompilerDriver#getAvailableFeatures getAvailableFeatures
call.
Parameters
   doc - the document associated with the desired feature instance
   featureClass - the class of the desired feature. For example,
<code>IStructureFeature.class</code>
Returns
   the requested IFeature, if valid and available. May return null.
public java.lang.Object getFeature(
   IProject proj,
   Class featureClass)
Allows access to compiler features associated with a specific IDE project.
Parameters
   proj - the IDE project
   featureClass - the class of the desired feature. For example,
<code>ITokenInfoFeature.class</code>
Returns
   the requested IFeature, if valid and available. May return null.
public void registerDocument(
   ISourceDocument doc)
Associates the given source document with it's URI. The compiler service will rely on the
source document to notify it of important changes and will defer to the file system listener on
the file to keep it informed about things like whether or not the file has been deleted.
```

-continued

```
public void unregisterDocument(
   URI uri,
   ISourceDocument doc)
Remove the association between the given URI and the given document. If no such
association exists, this method does nothing. Document object should call this method in their
finalizers to insure that any compiler data structures associated with the document are
removed.
public void setFileModified(
   ISourceDocument doc,
   ISourceModelEvent e,
   ISourceModelEvent.EventType type)
Called by various document change listeners to notify the compiler of changes to document
content. Generally, only actual content changes (those that would require a recompile) need
to be passed to the compiler. Under normal circumstances, it should not be necessary to call
this method explicitly.
Parameters
   doc - the document that has been modified
   e - the event associated with the modification
   type - the type of modification
public void refreshFile(
   ISourceDocument doc)
Initiates a full recompile of the specified document. This will cause a refresh of all compiler
features, including the IStructureFeature (i.e., the IDE parse tree).
Parameters
   doc - the file to be recompiled
public void refreshFile(
   URI path)
Initiates a full recompile of the specified URI. This will cause a refresh of all compiler fea-
tures,
including the IStructureFeature (i.e., the IDE parse tree).
Parameters
   path - the file to be recompiled
public com.bea.ide.sourceeditor.compiler.CompilerSvc.ITwoWayEditLock
getEditLockObject( )
Used by the two-way edit mechanism to ensure that the AWT thread waits for two-way edits
to complete before continuing application execution.
public com.bea.ide.sourceeditor.compiler.CompilerSvc.ICompilerLockManager
getLockManager(
   URI uri)
Retrieves a lock manager for the compiler project associated with the specified URI. Compiler
locks are required when accessing compiler features at a time when compilation may take
place.
Parameters
   uri - The uri used to determine which project should be locked.
public com.bea.ide.sourceeditor.compiler.CompilerSvc.ICompilerLockManager
getLockManager(
   IProject proj)
Retrieves a lock manager for the compiler project associated with the specified project.
Compiler locks are required when accessing compiler features at a time when compilation
may take place.
Parameters
   proj - The IDE project used to determine which compiler project should be locked.
public boolean canCompileFile(
   URI uri)
Checks to see if the URI points to a valid, compilable file.
Parameters
   uri - the URI pointing to the file in question.
public java.net.URI getPathForType(
   ISourceDocument doc,
   String type)
Get the path to the definition of a type in the context of the given document. Note: this will
block until the compiler finishes it's current work.
Parameters
   doc - The source document in whose context the type will be resolved.
   type - The fully-qualified type whose methods you want to find.
Returns
   The URI to the definition of the type.
public java.util.List getMethodsForType(
   ISourceDocument doc,
   String type,
   boolean includeSupers)
Get the methods on a given class/interface. Note: this will block until the compiler finishes it's
current work.
Parameters
   doc - The source document in whose context the type will be resolved.
   type - The fully-qualified type whose methods you want to find.
   includeSupers - If false, only methods directly on the given type are returned,
otherwise all methods available on that type and it's supertypes are given.
Returns
   A List of JavaMethod objects corresponding to the methods. These are somewhat
```

raw JavaMethods, and do not support editing. If you need full information, you'll need to open the appropriate document and get it's parse tree. This list may be empty, but is never null.
public java.util.List getFieldsForType(
  ISourceDocument doc,
  String type,
  boolean includeSupers)
Get the fields on a given class/interface. Note: this will block until the compiler finishes it's current work.
Parameters
  doc - The source document in whose context the type will be resolved.
  type - The fully-qualified type whose fields you want to find.
  includeSupers - If false, only methods directly on the given type are returned, otherwise all methods available on that type and it's supertypes are given.
Returns
  A List of JavaVariables objects corresponding to the fields. These are somewhat raw JavaFields, and do not support editing. If you need full information, you'll need to open the appropriate document and get it's parse tree. This list may be empty, but is never null.
public java.util.List getSupersForType(
  ISourceDocument doc,
  String type)
Get the superclass and superinterfaces of a given class/interface. Note: this will block until the compiler finishes it's current work.
Parameters
  doc - The source document in whose context the type will be resolved.
  type - The fully-qualified type whose supers you want to find.
Returns
  A List of Strings corresponding to the superclass (unless it's java.lang.Object) and all declared interfaces.
public com.bea.ide.sourceeditor.compiler.IIdentifierInfo getIdentifierInfo(
  ISourceDocument doc,
  int offset)
Get identifier info for an offset in a source document.
Parameters
  doc - The source document for which to get the identifier info.
  offset - The offset at which the identifier is located.
public com.bea.ide.sourceeditor.compiler.IPackageCache getPackageCache( )
Gets the package cache: this object is used to get general package information, such as that used for generating auto-import suggestions and generating searchable package/class name lists.
public com.bea.ide.sourceeditor.driver.ILanguageDriver getDefaultLanguageDriver(
  ISourceDocument doc,
  String languageName)
Returns a default language driver implementation appropriate to the language at the specified offset within the specified document. This method should only be called by @link com.bea.ide.sourceeditor.driver.ISourceViewDriver#getLanguageDriver ISourceViewDriver.getLanguageDriver implementations that do not want to customize language behavior. All other callers should obtain an ILanguageDriver by calling through their document's @link com.bea.ide.sourceeditor.driver.ISourceViewDriver#getLanguageDriver ISourceViewDriver.getLanguageDriver method. Note that a valid return from this method does not guarantee that the specified langauge exists within the document: @link #getLanguageName getLanguageName and @link #getLanguageStack getLanguageStack should be used to determine which languages are present.
Parameters
  doc - The document upon which to get the language driver
  languageName - The language for which a driver is needed.
Returns
  an ILanguageDriver implementation. Null if the language does not exist.
public java.lang.String getLanguageName(
  ISourceDocument doc,
  int offset)
Returns the name of the active language at the specified offset in the specified document.
Parameters
  doc - The document. See also @link #getLanguageStack getLanguageStack.
  offset - The position within the document.
Returns
  The name of the language at the specified location. Null is the location is invalid.
public java.lang.String[ ] getLanguageStack(
  ISourceDocument doc,
  int offset)
Returns an array of language names corresponding to the stack of languages present in the specified document at the specified offset. See also @link #getLanguageName getLanguageName.
Parameters
  doc - The document
  offset - The position within the document -continued Returns
An array of strings corresponding to the language stack. Index zero corresponds to the top-level language of the document, index length − 1 corresponds to the langauge active at the offset. Null is the offset is invlaid.
public void loadCompleteSource(
IProject proj)
Loads all source files in the specified project as quickly as possible. Under normal circumstances, source files are loaded incrementally, so as to provide maximum responsiveness to the user. However, certain features, such as auto-correction, are not available until all source files have been loaded. Calling this method will load all source files, making these features available sooner, possibly at the expense of foreground task responsiveness.
Parameters
proj - The project for which to load all source files.
public com.bea.ide.filesystem.IFileFilter getCompileFilter( )
get a file filter that only accepts compilable files
Returns
IFileFilter implementation that filters out files that cannot be compiled by the compiler svc.
public com.bea.ide.ui.propertyeditor.IPropertyViewDriver getPropertyViewDriver(
IDocument document)
Gets an IPropertyViewDriver for the given document.
Parameters
document - the document for which the driver should be created.
Returns
the driver to get properties for the given document, or null if no driver is available for this document.
public boolean outputDiagnostics(
com.bea.compiler.IProject project,
List uris,
OutputSvc.IOutputWindow window)
Outputs the compiler diagnostics for the file into the specified OutputWindow.
Parameters
project - project that owns the files
uris - List of file URIs to show diagnostics for
window - IOutputWindow in which to display diagnostics
Returns
If messages were generated, this method returns true. False means no errors were present in the files.
public java.util.List getDiagnostics(
ISourceDocument doc,
Range range)
Returns a list of the @link ICompilerDiagnostic ICompilerDiagnostic objects found in the specified document in the specified range. Note that diagnostics overlapping the range will be returned as well as those that are completely contained.
Parameters
doc - the source document for which diagnostics are desired
range - the range in the document text that should be searched
Returns
A list of @link ICompilerDiagnostic ICompilerDiagnostic objects.
public boolean addFileStore(
Object o)
Add a com.bea.compiler.IFileStore to the running Javelin compiler instance.
Parameters
o - the IFileStore object to add
Returns
Success or failure. This method will fail if the object was not of the correct type.
public com.bea.ide.sourceeditor.compiler.ICompletionSet mapCompletions(
List completions)
Maps a list of completions of various types to an ICompletionSet that the source editor understands. This is necessary for completion types like IAttributeValue where on completion set will wrap another.
Parameters
completions - a list of compiler supplied competion objects.
Returns
a completion set.

Package com.bea.ide.sourceeditor.driver

This package defines how the editor can be extended with custom language drivers for implementing special language features in the editor. Its classes and interfaces are described below.

public class com.bea.ide.sourceeditor.driver.SourceInstructionPoint implements com.bea.ide.debug.IDebugInstructionPoint Implements the IDebug BreakPoint interface for text files.

| | |
|---|---|
| Constructors | public SourceInstructionPoint(<br>IDocument file,<br>int line,<br>int type) |
| Methods | public com.bea.ide.document.IDocument getFile( )<br>public int getLine( )<br>public int getType( ) |

public class com.bea.ide.sourceeditor.driver.Source Breakpoint extends com.bea.ide.debug.DefaultBreakpoint implements com.bea.ide.debug.ISourceBreakPoint This class implements a breakpoint that will work on a file that implements ISourceDocument.

| | |
|---|---|
| Constructors | protected SourceBreakpoint(<br>IDocument file)<br>public SourceBreakpoint(<br>IDocument file,<br>int line) |
| Methods | public void documentLoaded( )<br>In init, this breakpoint is about to be associated with an actual file. So we should open the file, and grab an element.<br>public void documentUnloaded( )<br>In the case that a file is going away, we need to make sure to persist the current offset info.<br>public void updateLine( )<br>public int getLine( )<br>public void reset(<br>Element elt)<br>public void syncBreakpoint(<br>DebugCommands dbgCmds)<br>public com.bea.ide.document.IDocument getFile( )<br>public java.net.URI getURI( )<br>public java.lang.String getExtension( )<br>public com.bea.ide.debug.IDebugInstructionPoint<br>breakpointHit( )<br>public java.lang.String toString( ) |

-continued

| | |
|---|---|
| Fields | protected _file<br>protected _lineNum<br>protected transient _line<br>protected transient _model |

public static class com.bea.ide.sourceeditor.driver.SourceBreakpoint.DefaultLine implements com.bea.ide.sourceeditor.model.ISourceModel.Line

| | |
|---|---|
| Constructors | public SourceBreakpoint.DefaultLine(<br>Element el) |
| Methods | public int getStartOffset( )<br>public int getEndOffset( )<br>public java.lang.String getText( ) |

public interface com.bea.ide.sourceeditor.driver.ISourceViewDriver implements com.bea.ide.core.IDriverSupport Implements customizable features of the source view. This driver extends IDriverSupport so that the source view can obtain customized drivers for structure view, property view, etc. . . . The SourceView will call ISource ViewDriver#getDriver(Object) for drivers not implemented by the source view itself. Drivers that the source view implements, include: IHelpDriver, IPrintDriver and ITransferDriver.

| | |
|---|---|
| Methods | public com.bea.ide.util.Range getSelectionRange(<br>ISourceElement element)<br>Allows a document type to specify what range of text should be selected when an element selection is translated to a text selection, generally during a call to @link com.bea.ide.sourceeditor.ISourceView#setSelection(ISourceElement) ISourceView.setSelection. For example, the text selection that results from double-clicking an element in the structure pane is determined by calling this method. The default selection places the cursor at the beginning of the element. Other implementations may want to select the entire element or a sub-element or property.<br>public boolean showCollapse( )<br>Specifies whether collapsible editor sections are displayed in the source editor line bar. If a particular document type does not specify any collapsible element types in @link ISourceViewDriver#isCollapsible isCollapsible then this method should return false, as extra processing is required when the feature is enabled.<br>Returns<br>a boolean indicating whether collapsible sections are enabled for the owning document type.<br>public boolean isCollapsible(<br>ISourceElement element)<br>Allows a document implementation to specify which ISourceElement types are collapsible. Note that this method is only relevant if @link ISourceViewDriver#showCollapse showCollapse returns true.<br>Parameters<br>element - The element in question. Generally only the element's type is considered.<br>public boolean isCollapsedByDefault(<br>ISourceElement element)<br>Allows a document implementation to specify which ISourceElements are collapsed by default. Note that this method is only relevant if @link ISourceViewDriver#showCollapse showCollapse returns true.<br>Parameters<br>element - The element in question. Generally only the element's type is considered.<br>public java.lang.String getCollapsedText(<br>ISourceElement element)<br>Allows a document implementation to specify the text that appears on the single line left visible when an editor section is collapsed. Note that this method is only relevant if @link ISourceViewDriver#showCollapse showCollapse returns true.<br>Parameters<br>element - The element in question.<br>public com.bea.ide.sourceeditor.element.ISourceElementGroup getElementGroup(<br>ISourceElement element)<br>Some elements are not themselves collapsible, but can be grouped with like elements into an imaginary container element that is collapsible.<br>Parameters<br>element - The element in question. |

-continued

```
public boolean isCollapsible(
    ISourceElementGroup group)
Allows a document implementation to specify which ISourceElement types are collapsible as
groups. Note that this method is only relevant if @link ISourceViewDriver#showCollapse
showCollapse returns true.
Parameters
    group - The group type in question.
public boolean isCollapsedByDefault(
    ISourceElementGroup group)
Allows a document implementation to specify which ISourceElement groups are collapsed by
default. Note that this method is only relevant if @link ISourceViewDriver#showCollapse
showCollapse returns true.
Parameters
    group - The element group type in question.
public java.lang.String getCollapsedText(
    ISourceElementGroup group)
Allows a document implementation to specify the text that appears on the single line left
visible when an editor section is collapsed. Note that this method is only relevant if @link
ISourceViewDriver#showCollapse showCollapse returns true.
Parameters
    group - The element group in question.
public com.bea.ide.sourceeditor.driver.ILanguageDriver getLanguageDriver(
    String language)
Returns an ILanguageDriver appropriate for the named language. Language names are
generally obtained by calling @link
com.bea.ide.sourceeditor.compiler.CompilerSvc.I#getLanguageName
CompilerSvc.get( ).getLanguageName.
Parameters
    language - a the name of the language for which a driver is needed
Returns
    an ILangaugeDriver specific to the specified language
```

public interface com.bea.ide.sourceeditor.driver.I-NavigationBarDriver

Contains file-specific code for implementing the navigation bar. Note that each file could potentially show up in the navigation bar either as the primary file or as a control being used.

```
Methods public boolean isType(
            IElement node)
        Determines whether the given node represents a type to be
        shown in the types list.
        public boolean isMember(
            IElement node)
        Determines whether the given node represents a member of
        the enclosing type to be shown in the members list.
        public boolean isControl(
            IElement node)
        Determines whether the given node represents a control that
        is being used by this type. (Note that controls should be symblic
        links.)
        public boolean isEvent(
            IElement node)
        Determines whether the given node represents an event that
        is exported by this type (for use as a control).
        public boolean isEventHandler(
            IElement node)
        Determines whether the given node represents an event handler
        for an event thrown by a control used by this type.
```

-continued

```
public javax.swing.Icon getIcon(
    IElement b)
Returns the icon to be used for the given node. It may be showing
up in either the types or members list, for the current file or as a
control being used.
public com.bea.ide.element.IElement getControlForHandler(
    IElement handler)
Returns the node for the control corresponding to the given
handler.
public com.bea.ide.element.IElement getEventForHandler(
    IElement handler)
Returns the node for the event that is caught by the given handler.
This may return null if it is a handler for an event that is not
thrown.
public com.bea.ide.element.IElement getHandlerForEvent(
    IElement type,
    IElement control,
    IElement event)
Returns the handler in the given type for the given event. This
should create the handler if it does not exist.
```

public interface com.bea.ide.sourceeditor.driver.ILanguageDriver

Implementations of this driver provide customization for working with the languages in the source view. The methods require understanding of the lexical structure of the language for correct implemention. Note that one document may make use of several language drivers, since a single document type may contain several nested languages.

```
Methods public void setDocument(
            IDocument doc)
        Sets the source document upon which this document will act. This method will be called
        immediately after instantiation.
        public boolean isOpenChar(
            char ch)
        Determines whether the given character might open a block.
        public boolean isCloseChar(
            char ch)
```

-continued

Determines whether the given character might close a block.
public int getOpenBlockCount(
ISourceModel.Line line,
ILanguageDriver.IBlockDelim delim,
int length)
Returns the number of non-matching open-blocks on the given line. The block end given will be the open-block of the pair. The length parameter is the number of character in the line's text that should be examined for open blocks.
Parameters
line - Line to examine for open blocks.
delim - Type of block to scan for.
length - Length of <code>line</code>to examine from start.
Returns
Number of non-matching open block delimiters on first <code>length</code> characters of <code>line</code>.
public com.bea.ide.sourceeditor.driver.ILanguageDriver.IBlockInfo
findMatchingOpenBlock(
int pos,
char ch)
Returns the block whose open delimiter matches that found at the position given. If neither delimiter is found null is returned. If a mismatch is found then a block is found with only the close delimiter. Use the faster short circuit isCloseChar method first.
Parameters
pos - Offset of character <code>ch</code>in document.
ch - Close character.
Returns
Corresponding block object, null if not found.
public com.bea.ide.sourceeditor.driver.ILanguageDriver.IBlockInfo
findMatchingCloseBlock(
int pos,
char ch)
Returns the block whose close delimiter matches that found at the position given. If neither delimiter is found null is returned. If a mismatch is found then a block is found with only the close delimiter. Use the faster short circuit isOpenChar method first.
Parameters
pos - Offset of character <code>ch</code>in document.
ch - Close character.
Returns
Corresponding block object, null if not found.
public boolean parameterHelpAvailable(
int offset,
char typed)
Called after a user types a character in the source editor to determine if the specified character may initiate parameter popup help.
Parameters
offset - the offset of the caret
typed - the potential parameter help initiation character
public com.bea.ide.sourceeditor.driver.ILanguageDriver.IParameterHelp[ ]
getParameterHelp(
int offset,
char typed)
Returns an object used to define the UI that will be used for the parameter help popup.
public boolean suppportsCtrlHover(
String tokenTypeName)
Allows this driver to define which types of tokens support ctrl-hover and ctrl-click definition information features. If this method returns true for a given token type, more expensive calls utilizing the object mappers defined in the IDE extension's "urn:com-bea-ide:sourceeditor:sourceinfo" XML extension will be used to determine if definition information
is actually available.
Parameters
tokenTypeName - the language specific name for a particular token type, such as "java.identifier".
Returns
boolean indicating whether tokens of this type ever support ctrl-hover behavior.
public boolean canAutoCorrect(
String diagnosticCode)
Allows this driver to specify the types of errors for which it can offer auto-corrections. Calls to this method should be very fast, as it may be called many times during each compilation notification. If an error is correctable, this driver may or may not ever receive a request for the actual IAutoCorrection object via @link #getAutoCorrection getAutoCorrection.
Parameters
diagnosticCode - The type of error found.
Returns
a boolean indicating whether this driver can correct the specified error.
public com.bea.ide.sourceeditor.driver.ILanguageDriver.IAutoCorrection
getAutoCorrection(
String diagnosticCode,
int offset,
int length, -continued ILanguageDriver.IAutoCorrection innerCorrection)
Allows this driver to returns auto-correction suggestions for various errors found in the source code. If this driver is not able to provide a correction, the inner language's correction (if present) should be returned, unless this driver wants to explicitly hide that correction.
Parameters
diagnosticCode - The type of error found.
offset - The location of the error within this driver's document.
length - The length of text to which the error applies.
innerCorrection - The auto-correction provided by inner language nodes, if any. This parameter is frequently null.
Returns
An IAutoCorrection object corresponding to corrections for the specified error.
public java.net.URI[ ] getHelpContextList(
Range range)
Returns the list of context help URIs for the given range.
public com.bea.ide.sourceeditor.driver.ILanguageDriver.IAutoFill getAutoFill(
int offset,
char typed)
Allows the driver to return an auto-fill text range replacement for keystrokes sent to the source view. If this driver doesn't wish to provide auto-fill it can return <code>null</code> in which case a default action will be taken for the character. A typical auto-fill example is for indenting new lines, e.g. " -> "indent". <p>This method is only called for printable characters, e.g. > 0x20, and for the new-line character ". CONSIDER:This doesn't allow access to modifier keystrokes, CTRL, ALT, etc. Should we have another method, say public InputMap getKeymap( )?
Parameters
offset - The location of the caret within this driver's document.
typed - The character typed.
Returns
An auto-fill replacement object, null for default action.

public static interface com.bea.ide.sourceeditor.driver.ILanguageDriver.IBlockInfo Summary of the information gathered by the findMatchingXxx methods.

| | |
|---|---|
| Methods | public int getType( )<br>public com.bea.ide.sourceeditor.driver.ILanguageDriver.IBlockDelim getOpenDelim( )<br>public com.bea.ide.sourceeditor.driver.ILanguageDriver.IBlockDelim getCloseDelim( )<br>public boolean isMismatched( ) |
| Fields | public static final TYPE_MISMATCHED<br>Indicates an undefined block.<br>public static final TYPE_SIMPLE<br>Simple block type, e.g. ( ) or [ ] in Java/C++/C.<br>public static final TYPE_STRUCTURE<br>Structural block type, e.g. in Java/C++, in HTML. |

public static interface com.bea.ide.sourceeditor.driver.ILanguageDriver.IBlockDelim Defines one end of a block. Note that block close positions are inclusive unlike ranges which have an exclusive end position.

| | |
|---|---|
| Methods | public int getOpenPos( )<br>public int getClosePos( )<br>public java.lang.String getToken( ) |

public static interface com.bea.ide.sourceeditor.driver.ILanguageDriver.IParameterHelp

| | |
|---|---|
| Methods | public java.lang.String getDisplayPrefix( )<br>public java.lang.String getDisplaySuffix( )<br>public java.lang.String[ ] getParameterDescriptions( )<br>public java.lang.String getParameterSeparator( )<br>public boolean isPrimary( ) |

public static interface com.bea.ide.sourceeditor.driver.ILanguageDriver.IAutoCorrection

| | |
|---|---|
| Methods | public java.lang.String[ ] getTipText( )<br>Returns the text to show in the correction pup-up.<br>public boolean doCorrection(<br>int item)<br>Execute the correction chosen by the user.<br>Parameters<br>item - an index into the original array of choices returned from getTipText( ). |

public static interface com.bea.ide.sourceeditor.driver.ILanguageDriver.IAutoFill Object describing an auto-fill. Each auto-fill has three components, the replacement text, a replacement range and the final caret position.

| | |
|---|---|
| Methods | public java.lang.String getText( )<br>Returns the auto-fill text.<br>Returns<br>Auto-fill text.<br>public com.bea.ide.util.Range getRange( )<br>Auto-fill replacement range.<br>Returns<br>Range to be replaced with auto-fill text.<br>public int getCaretPosition( )<br>Position the caret should be left at after the auto-fill range has been replaced.<br>Returns<br>Caret position. |

public interface com.bea.ide.sourceeditor.driver.ICompilerDriver

ICompilerDriver implementations allow different document types to customize their behavior with respect to the Javelin compiler framework. See individual methods for more information.

| | |
|---|---|
| Methods | public com.bea.ide.sourceeditor.compiler.ILanguageBuilder createBuilder( )<br>Allows an IDocument implementation to return an ILanguageBuilder that will be used for construction of its parse tree. For example, @link com.bea.ide.lang.java.driver.JavaCompilerDriver#createBuilder JavaCompilerDriver returns a @link com.bea.ide.sourceeditor.compiler.JavaBuilder JavaBuilder instance, which is used to build the standard java parse tree.<br>Returns<br>an object implementing the ILangaugeBuilder interface.<br>public java.lang.Class[ ] getAvailableFeatures( )<br>Allows an IDocument implementation to specify which compiler features should be supported for that document type. Features specified by this method may be accessed via @link com.bea.ide.sourceeditor.compiler.CompilerSvc.I#getFeature CompilerSvc.get( ).getFeature.<br>Returns<br>an array of classes that implement the @link com.bea.compiler.feature.IFeature IFeature interface.<br>public boolean isFeatureAvailable(<br>Class featureClass)<br>Determines whether the given feature is in the available features list for this driver.<br>Parameters<br>featureClass - The class object for the feature in question.<br>Returns<br>true if featureClass is an available feature. |

public class com.bea.ide.sourceeditor.driver.DefaultSourceViewDriver extends com.bea.ide.sourceeditor.driver.DefaultDocumentDriver implements com.bea.ide.sourceeditor.driver.ISourceViewDriver A default implementation of SourceViewStrategy.

| | |
|---|---|
| Constructors | public DefaultSourceViewDriver(<br>ISourceDocument moduleDoc) |
| Methods | protected void addDriver(<br>Class oClass,<br>Object driver)<br>Allows derived classes to add a driver to the driver map. These will be returned automatically in response to a call to getDriver( )<br>public java.lang.Object getDriver(<br>Class oClass)<br>public com.bea.ide.util.Range getSelectionRange(<br>ISourceElement element)<br>public boolean showCollapse( )<br>public boolean isCollapsible(<br>ISourceElement element)<br>public boolean isCollapsedByDefault(<br>ISourceElement element)<br>public java.lang.String getCollapsedText(<br>ISourceElement element)<br>public com.bea.ide.sourceeditor.driver.ILanguageDriver getLanguageDriver(<br>String language)<br>public com.bea.ide.sourceeditor.element.ISourceElementGroup getElementGroup(<br>ISourceElement element)<br>public boolean isCollapsible(<br>ISourceElementGroup group)<br>public boolean isCollapsedByDefault(<br>ISourceElementGroup group)<br>public java.lang.String getCollapsedText(<br>ISourceElementGroup group) |

public class com.bea.ide.sourceeditor.driver.DefaultLanguageDriver extends com.bea.ide.sourceeditor.driver.DefaultDocumentDriver implements com.bea.ide.sourceeditor.driver.ILanguageDriver

| | |
|---|---|
| Constructors | public DefaultLanguageDriver( ) |
| Methods | public com.bea.ide.sourceeditor.driver.ILanguageDriver.IParameterHelp[ ] getParameterHelp(<br>int offset,<br>char typed)<br>public boolean parameterHelpAvailable(<br>int offset,<br>char typed)<br>public boolean isOpenChar(<br>char ch)<br>public boolean isCloseChar(<br>char ch)<br>public int getOpenBlockCount(<br>ISourceModel.Line line,<br>ILanguageDriver.IBlockDelim delim,<br>int length)<br>public com.bea.ide.sourceeditor.driver.ILanguageDriver.IBlockInfo findMatchingOpenBlock(<br>int pos,<br>char ch)<br>public com.bea.ide.sourceeditor.driver.ILanguageDriver.IBlockInfo findMatchingCloseBlock(<br>int pos,<br>char ch)<br>public boolean suppportsCtrlHover(<br>String tokenTypeName)<br>public boolean canAutoCorrect(<br>String diagnosticCode)<br>public com.bea.ide.sourceeditor.driver.ILanguageDriver.IAutoCorrection getAutoCorrection(<br>String diagnosticCode,<br>int offset, |

-continued

```
        int length,
        ILanguageDriver.IAutoCorrection innerCorrection)
    public java.net.URI[ ] getHelpContextList(
        Range range)
    public com.bea.ide.sourceeditor.driver.ILanguageDriver.IAutoFill getAutoFill(
        int offset,
        char typed)
```

public static class com.bea.ide.sourceeditor.driver.DefaultLanguageDriver.BlockInfo implements com.bea.ide.sourceeditor.driver.ILanguageDriver. IBlock-Info

| | |
|---|---|
| Constructors | public DefaultLanguageDriver.BlockInfo( ) |
| Methods | public int getType( )<br>public com.bea.ide.sourceeditor.driver.ILanguageDriver.IBlockDelim getOpenDelim( )<br>public com.bea.ide.sourceeditor.driver.ILanguageDriver.IBlockDelim getCloseDelim( )<br>public void setType(<br>int type)<br>public void setOpenDelim(<br>ILanguageDriver.IBlockDelim openDelim)<br>public void setCloseDelim(<br>ILanguageDriver.IBlockDelim closeDelim)<br>public boolean isMismatched( ) |

public static class com.bea.ide.sourceeditor.driver.DefaultLanguageDriver.BlockDelim implements com.bea.ide.sourceeditor.driver. ILanguageDriver.IBlock-Delim

| | |
|---|---|
| Constructors | public DefaultLanguageDriver.BlockDelim( ) |
| Methods | public int getOpenPos( )<br>public int getClosePos( )<br>public java.lang.String getToken( )<br>public void setOpenPos(<br>int pos)<br>public void setClosePos(<br>int pos)<br>public void setToken(<br>String token)<br>public boolean equals(<br>DefaultLanguageDriver.BlockDelim delim) |

public class com.bea.ide.sourceeditor.driver.DefaultDocumentDriver

| | |
|---|---|
| Constructors | public DefaultDocumentDriver(<br>IDocument sourceDoc) |
| Methods | public void setDocument(<br>IDocument sourceDoc)<br>public com.bea.ide.document.IDocument getDocumen( ) |

public class com.bea.ide.sourceeditor.driver.DefaultDebugRunnable extends com.bea.ide.source-editor.driver.DefaultDocumentDriver implements com.bea.ide.workspace.IWebRunnable This is the debug class to take care of being runnable, etc. UNDONES(willpugh) All the funky JSX/Script environments stuff should be pulled out into a script DebugRunnable class for jsx.

| | |
|---|---|
| Constructors | public DefaultDebugRunnable(<br>ISourceDocument file,<br>boolean runnable,<br>boolean buildable) |
| Methods | public boolean isRunnable( )<br>public java.net.URL getRunnableUrl( )<br>public boolean isBuildable( ) |

public class com.bea.ide.sourceeditor.driver.DefaultDebugDriver extends com.bea.ide.sourceeditor.driver.DefaultDocumentDriver implements com.bea.ide.debug.IDebugDriver Implements the strategy for debugging text files.

| | |
|---|---|
| Constructors | public DefaultDebugDriver(<br>ISourceDocument file) |
| Methods | public com.bea.ide.debug.ISourceBreakPoint createBreakPoint(<br>(Document file,<br>int line)<br>This creates a breakpoint with the given URI + line number. This will not actually be associated with a line in a document, until addBreakPoint is called.<br>public com.bea.ide.debug.ISourceBreakPoint createMethodBreakPoint(<br>IDocument file,<br>String className,<br>String methodName,<br>String[ ] params)<br>public boolean addBreakPoint(<br>ISourceBreakPoint bp)<br>public void removeBreakPoint(<br>ISourceBreakPoint bp)<br>public boolean hasBreakPoint(<br>IDocument idfile,<br>int line)<br>public com.bea.ide.debug.IDebugInstructionPoint setInstructionPoint(<br>IDocument idfile,<br>int line,<br>int type)<br>public void unsetInstructionPoint(<br>IDebugInstructionPoint ip)<br>public boolean hasInstructionPoint(<br>IDocument idfile,<br>int line) |

public class com.bea.ide.sourceeditor.driver.DefaultCompilerDriver implements com.bea.ide.sourceeditordriverICompilerDriver The default compiler driver specifies default compiler interactions for compiler-recognized document types. This behavior generally consists of syntax coloring and error reporting within the source editor. This default behavior does NOT include the creation of an IDE-side parse/structure tree. For this functionality, a document type must supply a compiler driver implementation that returns a valid @link com.bea.ide.sourceeditor.compiler.ILanguageBuilder ILanguageBuilder interface from the @link com.bea.ide.sourceeditor.driver.ICompilerDriver#createBuilder create- Builder method. See @link com.bea.ide.lang.java.driver.JavaCompilerDriver JavaCompilerDriver for an example.

Note that a providing a compiler driver on a document type is only useful if that document type is recognized by the compiler framework. This functionality is generally achieved by writing a compiler language extension or by mapping a new document type to an existing language extension via the compiler's 'javelin-config.xml' configuation file.

| | |
|---|---|
| Constructors | public DefaultCompilerDriver(<br>ISourceDocument doc) |
| Methods | public com.bea.ide.sourceeditor.compiler.ILanguageBuilder createBuilder( )<br>Returns a builder object used by the compiler to generate IDE-side parse trees. By default, document types do not supply a builder.<br>Returns<br>null<br>public java.lang.Class[ ] getAvailableFeatures( )<br>Returns the set of compiler features that should be made available on this document. The default set includes the following:<br>Token Info Feature : allows access to tokenization information for this driver's document.<br>Node Info Feature : allows access to langauge transition information for this driver's document.<br>Source Info Feature : allows access to source editor features such as auto-completion.<br>Structure Info Feature : allows access to structure tree information for this driver's document. Note that while this feature is supported by default, it is only useful to a @link DefaultCompilerDriver. DefaultCompilerDriver derivation that returns a valid @link com.bea.ide.sourceeditor.compiler.LanguageBuilder. ILanguageBuilder interface from the @link com.bea.ide.sourceeditor.driver.ICompilerDriver#createBuilder createBuilder method. See @link com.bea.ide.lang.java.driver.JavaCompilerDriver JavaCompilerDriver for an example.<br>public boolean isFeatureAvailable(<br>Class featureClass)<br>Determines whether the given feature is in the available features list for this driver.<br>Parameters<br>featureClass - The class object for the feature in question.<br>Returns<br>true if featureClass is an available feature. |
| Fields | protected _doc |

Package com.bea.ide.sourceeditor.element

This package defines how the editor can be extended to support new or modified elements in the language. Elements are recognizable pieces of a document (e.g., a function name). Its classes and interfaces are described below.

public interface com.bea.ide.sourceeditor.element.ISourceElementGroup

Empty interface.

public interface com.bea.ide.sourceeditor.element.ISourceElement implements com.bea.ide.document.IDocumentElement An ISourceElement is a specific type of IElement corresponding to the contents of a document. All parse tree elements are of type ISourceElement.

| | |
|---|---|
| Methods | public com.bea.ide.util.Range getRange( )<br>Returns<br>the text range occupied by the source element.<br>public void mergeFrom(<br>ISourceElement sourceElement)<br>Merges the contents of one source element into the this source element, firing property change events as appropriate. The elements must be of compatible types. This method is used on an element-by-element basis when merging a new parse tree into an existing tree. After the merge, this.@link Object#equals equals(sourceElement) will return true while this = = sourceElement will return false. Note that this method has no effect on the children of the source or destination elements: it only applies to element properties.<br>Parameters<br>sourceElement - the element from which to copy data.<br>public java.lang.Object getCookie( )<br>Returns a cookie object provided by the compiler at creation time. This value has no meaning to code outside of the compiler. This method should never be called within IDE extension code.<br>public IStructureFeature.IAuthorNode createAuthorNode( )<br>Used by IDE two-way editing code to create a template node that will be passed to the compiler. Note that IAuthorNodes are intended to be created, possibly modified, passed to the compiler, and then discarded. There is no guarantee that the author node will remain in the same form after being passed to the compiler.<br>Returns<br>a snapshot of the current node in a form that can be used for the purposes of two-way editing.<br>public IStructureFeature.StructureCode getPropertyCode(<br>String propertyName)<br>This method allows the IDE elements to maintain a property set with different names than those provided by the compiler by providing a mechanism by which IDE names can be mapped back to compiler type codes.<br>Parameters<br>propertyName - an IDE element property name<br>Returns<br>a compiler type code. The return value must be the same as that passed to the @link com.bea.ide.sourceeditor.compiler.ILanguageBuilder#setProperty setProperty call that creates properties of this type.<br>public com.bea.ide.sourceeditor.element.ISourceElement<br>requestAddChild( ISourceElement newChild)<br>Two way editing method allowing for the direct addition of children to an element in an ISourceElement parse tree. Once an element is part of a compiled document, modifications to the element structure must be made via 'request' methods. These methods send the modification request to the compiler, which will cause a modification of the document source code, followed by a reparse and subsequent element change events on the document. Note that this method initiates an asynchronous call; completion of the edit is indicated by an element change event, not by the return from the call.<br>Parameters<br>newChild - a template for the child element to be added. <code>newChild</code> itself will NOT be added to the parse tree, though an element equivalent to it will appear after the edit completes. Source code corresponding to this element will be inserted into the source document.<br>Returns<br>The new child added, if found. This method will return null in the case of addition failure, or in the case where the addition of a child may have caused the removal of the parent element.<br>public com.bea.ide.sourceeditor.elementiSourceElement<br>requestAddChild( ISourceElement newChild,<br>int index)<br>Two way editing method allowing for the direct addition of children to an element in an ISourceElement parse tree. Once an element is part of a compiled document, modifications to the element structure must be made via 'request' methods. These methods send the modification request to the compiler, which will cause a modification of the document source code, followed by a reparse and subsequent element change events on the document. Note that this method initiates an asynchronous call; completion of the edit is indicated by an element change event, not by the return from the call.<br>Parameters<br>newChild - a template for the child element to be added. <code>newChild</code> itself will NOT be added to the parse tree, though an element equivalent to it will appear after the edit completes. Source code corresponding to this element will be inserted into the source document.<br>index - The index, relative to the new child's siblings, where the element should be inserted |

-continued

Returns

The new child added, if found. This method will return null in the case of addition failure, or in the case where the addition of a child may have caused the removal of the parent element.

public void requestRemoveChild(
    ISourceElement child)

Two way editing method allowing for the direct removal of children from an ISourceElement parse tree. Once an element is part of a compiled document, modifications to the element structure must be made via ‘request’methods. These methods send the modification request to the compiler, which will cause a modification of the document source code, followed by a reparse and subsequent element change events on the document. Note that this method initiates an asynchronous call; completion of the edit is indicated by an element change event, not by the return from the call.

Parameters child - the element to be removed from the parse tree. All corresponding source code will be deleted from the document.

public void requestSetProperty(
    String strProp,
    Object value)

Two way editing method allowing for the direct manipulation of property values of an element in an ISourceElement parse tree. Once an element is part of a compiled document, modifications to the element must be made via ‘request’methods. These methods send the modification request to the compiler, which will cause a modification of the document source code, followed by a reparse and subsequent element change events on the document. Note that this method initiates an asynchronous call; completion of the edit is indicated by an element change event, not by the return from the call.

Parameters strProp - the IDE property name to be modified value - the new value for the property. It is the callers responsibility to ensure that the object type is compatible with property values accepted by the compiler.

public java.util.List getDiagnostics( )

Returns a list of the @link com.bea.ide.sourceeditor.compiler.ICompilerDiagnostic ICompilerDiagnostic objects found in the text corresponding to this source element. Note that diagnostics overlapping the range will be returned as well as those that are completely contained.

Returns

A list of @link com.bea.ide.sourceeditor.compiler.ICompilerDiagnostic ICompilerDiagnostic objects.

public abstract class com.bea.ide.sourceeditor.element.DefaultSourceElement extends com.bea.ide.document.DefaultDocumentElement implements com.bea.ide.sourceeditor.element.ISourceElement A default implementation of ISourceElement.

| | |
|---|---|
| Constructors | public DefaultSourceElement(<br>    Object structureNodeCookie) |
| Methods | public abstract IStructureFeature.StructureCode getTypeCode( )<br>public final java.lang.Object getCookie( )<br>public final java.beans.PropertyDescriptor[ ] getPropertyDescriptors( )<br>protected abstract<br>com.bea.ide.sourceeditor.element.DefaultSourceElement.CompilerPropertyDescriptor[<br>]getDefaultPropertyDescriptors( )<br>public IStructureFeature.IAuthorNode createAuthorNode( )<br>public com.bea.ide.sourceeditor.elementiSourceElement requestAddChild(<br>    ISourceElement newChild)<br>public com.bea.ide.sourceeditor.elementiSourceElement requestAddChild(<br>    ISourceElement newChild,<br>    int index)<br>public void requestRemoveChild(<br>    ISourceElement child)<br>public void requestSetProperty(<br>    String strProp,<br>    Object value)<br>public IStructureFeature.StructureCode getPropertyCode(<br>    String propertyName)<br>public java.util.List getChildrenByClass(<br>    Class type)<br>public void addChild(<br>    ITreeElement child)<br>public com.bea.ide.sourceeditor.element.ISourceElement replaceChild(<br>    int index,<br>    ISourceElement replacement)<br>public com.bea.ide.sourceeditor.element.ISourceElement removeChild(<br>    int index)<br>public void removeChild(<br>    ITreeElement child)<br>public void insertChild(<br>    int index,<br>    ISourceElement newChild)<br>protected void initializeRange(<br>    IStructureFeature feature,<br>    ISourceModel model)<br>Initializes the range of this element and all its children. This method assumes that it is being called within a compiler read lock.<br>public com.bea.ide.util.Range getRange( )<br>public void mergeFrom(<br>    ISourceElement sourceElement)<br>public boolean equals(<br>    Object o)<br>public java.lang.ClassLoader getClassLoader( )<br>public void setProperty(<br>    String sProp, |

-continued

|  |  |
|---|---|
|  | Object value) |
|  | public java.lang.Object getProperty( |
|  | String sProp) |
|  | public void propertyModified( |
|  | String sProperty, |
|  | Object oldValue, |
|  | Object newValue) |
|  | public boolean mergeElements( |
|  | ISourceElement sourceElement) |
|  | public java.lang.String getInstanceName( ) |
|  | protected boolean isAuthorProperty( |
|  | DefaultSourceElement.CompilerPropertyDescriptor pd) |
|  | Allows a DefaultSourceElement derivation to specify that certain properties should not be passed to the compiler when performing a two way edit. |
|  | Parameters |
|  | pd - The property descriptor that could be passed to the compiler |
|  | Returns |
|  | boolean indicating whether the specified property should be passed. |
|  | protected java.lang.String getPropertySourceText( |
|  | IStructureFeature.StructureCode prop) |
|  | protected IStructureFeature.Range getPropertySourceRange( |
|  | IStructureFeature.StructureCode prop) |
|  | protected IStructureFeature.Range[ ] getPropertySourceRanges( |
|  | IStructureFeature.StructureCode prop) |
|  | public com.bea.ide.sourceeditor.element.ISourceElementGroup getGroup( ) |
|  | By default, elements are not grouped together (other than by parentage). To be groupable, a class must override this method. |
|  | public java.util.List getDiagnostics( ) |
| Fields | public static final PROP_NAME |
|  | public static final PROP_VALUE |
|  | protected startPos |
|  | protected endPos |

protected class com.bea.ide.sourceeditor.element.DefaultSourceElement.DefaultAuthorElement

|  |  |
|---|---|
| Constructors | public DefaultSourceElement.DefaultAuthorElement( ) |
| Methods | public IStructureFeature.StructureCode getTypeCode( ) |
|  | public java.util.HashMap getProperties( ) |
|  | public java.util.List getChildren( ) |

protected class com.beaide.sourceeditor.element. DefaultSourceElernent.CompilerPropertyDescriptor extends java.beans.PropertyDescriptor

|  |  |
|---|---|
| Constructors | public DefaultSourceElement.CompilerPropertyDescriptor( |
|  | String propertyName, |
|  | Class beanClass, |
|  | Object defaultValue, |
|  | IStructureFeature.StructureCode compilerTypeCode, |
|  | boolean displayProperty) |
|  | public DefaultSourceElement.CompilerPropertyDescriptor( |
|  | DefaultSourceElement.Static-CompilerPropertyDescriptor |
|  | pdOther) |
|  | Constructor which avoids the cost of doing reflection to find the getter and setter methods. |
| Methods | public java.lang.Object getDefaultValue( ) |
|  | public IStructureFeature.StructureCode getTypeCode( ) |
|  | public java.lang.String getFriendlyName( ) |
|  | public boolean isDisplayedProperty( ) |
|  | public java.lang.String getLabel( ) |
|  | public java.lang.Object getValue( ) |
|  | public java.Iang.String getDescription( ) |
|  | public java.util.List getChildren( ) |
|  | public void setValue( |
|  | Object value) |

protected static class com.bea.ide.sourceeditor.element.DefaultSourceElement.StaticCompilerProperty Descriptor extends java.beans.PropertyDescriptor For performance, a class that can be passed to CompilerPropertyDescriptor's constructor to save the overhead of finding the getter and setter methods.

|  |  |
|---|---|
| Constructors | public DefaultSourceElement.StaticCompilerPropertyDescriptor( |
|  | String strProperty, |
|  | Class clazz, |
|  | Object defaultValue, |
|  | IStructureFeature.StructureCode compilerTypeCode, |
|  | boolean displayProperty) |

Package com.bea.ide.sourceeditor.model

This package defines ways custom editors or views can interact with the document model. The document model is a data structure that contains the text of a document. Its classes and interfaces are described below.

public interface com.bea.ide.sourceeditor.model.I-SourceModelIListener

A source model listener is notified of all changes to a source model. This includes changes to the text data as well as line attributes.

|  |  |
|---|---|
| Methods | public void insertUpdate( |
|  | ISourceModelEvent e) |
|  | Called when data is inserted into the source model. |
|  | public void removeUpdate( |
|  | ISourceModelEvent e) |
|  | Called when data is removed from the source model. |
|  | public void changedUpdate( |
|  | ISourceModelEvent e) |
|  | Called when the source. model changes. Line attribute modificationnotifications are made through this method. |

public interface com.bea.ide.sourceeditor.model.I-SourceModelEvent

A source model event indicates that the text of the source model has changed in some way. Changes include text changes and line attribute changes. See ISourceModelListener and ISourceModel.addSourceModelListener for more information.

| | |
|---|---|
| Methods | public int getOffset( )<br>Returns<br>the character offset of the event<br>public int getLength( )<br>Returns<br>the length of change indicated by the event<br>public com.bea.ide.sourceeditor.model.ISourceModelEvent.EventType getType( )<br>Returns<br>the type of change indicated by the event<br>public boolean isComplierSignificant( )<br>Returns<br>boolean indicating if the change that will be passed to the compiler. Text-based changes are always compiler-significant. Changes to line attributes are not. |

public static final class com.bea.ide.sourceeditor.model.ISourceModelEvent.EventType The type of change indicated by the event. There are three types, each static objects that can be compared directly via references.

| | |
|---|---|
| Methods | public java.lang.String toString() |
| Fields | public static final INSERT<br>public static final REMOVE<br>public static final CHANGE |

public interface com.bea.ide.sourceeditor.model.ISourceModel

A source model is a data structure that contains the actual text data of a given document. Generally implemented as a linked list of lines, some implementations may extend the swing AbstractDocument class, though this is not required and should not be relied upon.

Methods
```
public int getLineCount( )
    Returns
        the number of lines in this source model.
    public int getLineIndexByOffset(
        int offset)
    Parameters
        offset - a zero-based character offset within the file
    Returns
        the zero-based index of the line containing the offset. May
    return null if the offset is invalid.
    public com.bea.ide.sourceeditor.modeliSourceModel.Line
        getLineByIndex( int index)
    Parameters
        index - a zero-based line index
    Returns
        the Line object at the specified index. May be null if the
    line index is invalid.
    public com.bea.ide.sourceeditor.modeLlSourceModel.Line
        getLineByOffset( int offset)
    Parameters
        offset - a zero-based character offset within the file
    Returns
        the Line object at the specified index. May be null if the
    offset is invalid.
    public void remove(
        int offset,
        int len)
```

-continued

```
Deletes text from the source model. Note that all document
modifications will initiate a recompilation, which may
generate element change events.
Parameters
    offset - a zero-based character offset within the file
    len - the length of the segment to be removed
public void insertString(
    int offset,
    String str,
    AttributeSet a)
Inserts text into the source model. Note that all document
modifications will initiate a recompilation, which may
generate element change events.
Parameters
    offset - a zero-based character offset within the file
    str - the string to be inserted
    a - a collection of attributes to place on newly created lines.
public java.lang.String getText(
    int offset,
    int length)
Retrieves a subset of the source model in String form.
Parameters
    offset - a zero-based starting character offset within the file
    length - the length of text to be returned
public void getText(
    int offset,
    int length,
    Segment text)
Retrieves a subset of the source model in a text Segment.
Parameters
    offset - a zero-based starting character offset within the file
    length - the length of text to be returned
    text - the Segment in which the requested text will be stored.
public java.lang.String getDenormalizedText(
    int offset,
    int length)
Retrieves a subset of the source model in String form. The string
is converted to contain the newline characters that were found in
the document text when the file was loaded. Added lines will be
terminated using the first newline in the original file, or the
system default value for empty files. Note that the offset and
length passed in are in terms of the normalized text. The resulting
string may have a different length than the length passed in.
Parameters
    offset - a zero-based starting character offset within the file
    length - the length of text to be extracted
public java.io.Reader getDenormalizedTextReader( )
Returns a reader for the document text that denormalizes above.
This method should generally only be called when writing
document contents to disk.
public int getLength( )
Returns
    the length, in characters, of the source model.
public void addUndoableEditListener(
    UndoableEditListener I)
Adds a listener to the source model that will be notified of all
undoable edits that occur.
Parameters
    I - the listener to be added
public void removeUndoableEditListener(
    UndoableEditListener I)
Removes an UndoableEditListener from the source model.
Parameters
    I - the listener to be removed.
public void addSourceModelListener(
    ISourceModelListener I)
Adds a source model listener to the source model. A source
model listener is notified of all source model changes, whether
they are undoable or not.
Parameters
    I - the listener to be added
public void removeSourceModelListener(
    ISourceModelListener I)
Removes a source model listener from the source model.
Parameters
    I - the listener to remove
public void setLineAttribute(
    int line,
    Object key,
    Object value)
```

-continued

Sets an attribute on the specified line. Note that modifying a line attribute value will cause the selected line to repaint, if visible in the source view. As a result, line attributes are a common means of storing the location of line specific UI information, such as breakpoint and instruction point locations.
Parameters
line - the zero-based index of the line upon which to set the attribute
key - an arbitrary key used for retrieval of the line attribute
value - line attribute value
public java.lang.Object getLineAttribute(
int line,
Object key)
Retrives the attribute with the specified key from the specified line.
Parameters
line - the zero based index of the desired line
key - an arbitrary key value, as set via a <code>@link ISourceModel#setLineAttribute setLineAttribute</code>call.
Returns
the line attribute with the specified key on the specified line. May return null is there is no such attribute on that line.
public void touchLineAttribute(
int line,
Object key)
Does not actually change a line's attributes, but does trigger a change event to be sent to listeners, as if setLineAttribute had been called. Useful when the key's value has been changed within the same object.
Parameters
line - the zero based index of the desired line
key - an arbitrary key value, as set via a <code>@link ISourceModel#setLineAttribute setLineAttribute</code>call. May be null to indicate multiple keys have been touched.
public javax.swing.text.Position createPosition(
int offs)
Creates a Position object to track a location in a document through user changes. Insertions on top of this position will move it to the end of the inserted text. Ideally, the class that implements this interface will also extend AbstractDocument, in which case you get this for free.
Parameters
offs - is the character position in the document
Returns
a right-biased Position mark.
public javax.swing.text.Position createHoldPosition(
int offs)
A variation on createPosition( ) which creates a Position that does not move to accomodate insertions directly on top of it. This variation is not implemented by AbstractDocument, nor supported by Swing's GapContent class. The SourceEditor's DefaultSourceModel class does implement its own GapContent to support this.
Parameters
offs - is the character position in the document
Returns
a left-biased Position mark.
public void setReadLock(
boolean on)
Acquires/releases a read lock on the model.
public void setWriteLock(
boolean on)
Acquires/releases a write lock on the model.
Fields public static final ATTRIB_LINE_DIRTY public static interface com.bea.ide.sourceeditor.model.I-SourceModel.Line A line in the source model. It is assumed that it is safe to hold a reference to a line through document edits; Line objects must remain valid by tracking document changes and adjusting their range appropriately.

Methods public int getStartOffset( )
Returns
the inclusive start offset of this line. Note that this may change over document edits.

-continued public int getEndOffset( )
Returns
the exclusive end offset of this line. Note that this may change over document edits.
public java.lang.String getText( )
Returns
the actual text of this line. Note that this may change over document edits.

Package com.bea.ide.sourceeditor.ul

This package defines mechanisms developers can use to implement custom UI features. Its classes and interfaces are described below.

public interface com.bea.ide.sourceeditor.ui.IPopupTip

| | |
|---|---|
| Methods | public java.awt.Component getComponent( )<br>public int getOffset( )<br>public int getHorizontalAlignment( )<br>public int getVerticalAlignment( )<br>public int getTabPosition( )<br>public boolean disposeOnMouseAction( )<br>public boolean disposeOnKeyAction( )<br>public void onDisplay(<br>IPopupTip.Container container)<br>public void onDispose( ) |
| Fields | public static final HORIZONTAL_LEFT_MARGIN<br>public static final HORIZONTAL_AT_TOKEN<br>public static final HORIZONTAL_TAB_AT_OFFSET<br>public static final HORIZONTAL_RIGHT_MARGIN<br>public static final VERTICAL_BELOW_TOKEN<br>public static final VERTICAL_AT_TOKEN<br>public static final VERTICAL_ABOVE_TOKEN |

public static interface com.bea.ide.sourceeditor.ui.IPopu-pTip.Container

| | |
|---|---|
| Methods | public void relayout( )<br>public boolean dismiss( ) |

public interface com.bea.ide.sourceeditor.ui.IHoverListener

| | |
|---|---|
| Methods | public void hoverOccurred(<br>HoverEvent hoverEvent)<br>Called when the mouse has hovered over a particular offset within a source view. |

public class com.bea.ide.sourceeditor.ui.HoverEvent extends javax.swing.event.ChangeEvent

| | |
|---|---|
| Constructors | public HoverEvent(<br>ISourceView sourceView,<br>int offset) |
| Methods | public int getOffset( )<br>The offset of the hover. |

public abstract class com.bea.ide.sourceeditor.ui.De-faultPopupTip implements com.bea.ide.sourceeditor.ui.I-PopupTip

| | |
|---|---|
| Constructors | public DefaultPopupTip(<br>ISourceView sourceView,<br>int offset) |
| Methods | public boolean disposeOnKeyAction( )<br>public boolean disposeOnMouseAction( )<br>public int getVerticalAlignment( )<br>public int getHorizontalAlignment( )<br>public int getTabPosition( )<br>public int getOffset( )<br>public void onDispose( )<br>public void onDisplay(<br>IPopupTip.Container container) |
| Fields | protected_sourceView<br>protected_offset<br>protected_container |

Compiler Framework Client API

A compiler framework client API can define how clients, such as the editor and runtime, communicate with the compiler framework. Clients can use this API to access and modify a wide range of information about the project, its source files and object files. This API can be the mechanism by which the full compiler is integrated into the editor to provide the features described above. This section contains a complete description of all the packages that are part of the client API.

| Packages | |
|---|---|
| com.bea.compiler | Defines how the editor and runtime use the compiler to get language information and produce running code. |
| com.bea.compiler.classfile | Defines how the client gets and sets information about the classfile |
| com.bea.compiler.command | Defines how the client sends commands to the compiler and receives the results. |
| com.bea.compiler.enterprise | Defines how the client gets additional information pertaining to enterprise applications, such as web applications. |
| com.bea.compiler.feature | Defines how the client gets and sets information about certain features of the source code. |
| com.bea.compiler.fileinfo | Defines how the client gets and sets information about the project's files and directories. |
| com.bea.compiler.info | Defines how the client gets and sets information about the structure of a source file. |
| com.bea.compiler.info.beaninfo | Defines how the client gets and sets additional information available for JavaBeans |
| com.bea.compiler.java | Defines the information produced by the Java programming language support in the compiler. |
| com.bea.compiler.java.annotation | Defines the information produced by the Java programming language support sin the compiler about the annotations found in Java source code. |
| com.bea.compiler.typeinfo | Defines how the client gets and sets information about types. |

This API defines how the editor and runtime use the compiler. The package COm.bea.compiler contains the main interfaces. Some subpackages of this provide additional interfaces that are specific to a particular language. For example, the APIs in com.bea.compiler.java provide the Java-specific information for the editor and runtime.

The compiler framework is designed for integration into an editor. Like any Java compiler, the compiler framework can translate source files into Java bytecodes. But in addition, the compiler framework is designed to provide the language information that is the backbone of advanced editor features. The compiler framework makes it easy to translate the language knowledge in the compiler into editor features.

Package com.bea.compiler

This package defines how the editor and runtime use the compiler to get language information and produce running code. Its classes and interfaces are described below.

public interface com.bea.compiler.IToken

Contains information about a token found by a scanner.

| | |
|---|---|
| Methods | public boolean isOutOfDate( )<br>Returns whether this token is known to have been changed since the last compile.<br>public int getType( )<br>Returns the type code of this token.<br>public int getStart( )<br>Returns the inclusive start of the range of this token.<br>public int getEnd( )<br>Returns the exclusive end of the range of this token.<br>public int getSize( )<br>Returns the size of the range of this token. |
| Fields | public static final UNKNOWN<br>The token type for an 'unknown' token. |

public interface com.bea.compiler.ITextChange

Represents a change that occurred in the text of a source file.

| | |
|---|---|
| Methods | public int getType( )<br>Returns the type of change that occurred.<br>public int getOffset( )<br>Returns the offset at which the change occurred.<br>public int getLength( )<br>Returns the length of the change. |
| Fields | public static final INSERTED<br>Indicates that text was inserted.<br>public static final REMOVED<br>Indicates that text was removed.<br>public static final REPLACED<br>Indicates that text was replaced. |

public interface com.bea.compiler.IProjectChangeListener

Defines the shape of project change notifcations to the client.

| | |
|---|---|
| Methods | public void changesFound(<br>IProjectChangeEvent event)<br>Provides the metadata that was found to have been changed from changes previously delivered by applyChanges. |

public interface com.bea.compiler.IProjectChangeEvent

Encapsulates all of the changes found during a compilation.

| | |
|---|---|
| Methods | public java.util.Collection getChanges( )<br>Returns the IFileChange s that were applied in this compile or null if this change did not correspond to any changes.<br>public java.util.Collection getCompiledFiles( )<br>Returns the IFile s that were recompiled.<br>public java.util.Collection getChangedFiles( )<br>Returns the IFile s whose changes were picked up during this compile. |

-continued

```
public java.util.Collection getOutOfDateFiles( )
Returns the IFile s that were not change but were found to
be out of date during compilation.
public java.util.Collection getDiscoveredFiles( )
Returns the source IFile s that were found on the classpath
during compilation.
public java.util.Collection getInfoChanges(
    int type,
    String namespace)
Returns all of the changes of the given type(s) in the given
namespace (or all namespaces if null) that were found
duringn compilation.
```

public interface com.bea.compiler.IProject

Maintains compiler information about all of the source files in a project. This information is automatically updated when notified of changes to the source files. When requested, it will produce a .class files.

Note that the project does not take a source path argument. Instead, the source path is managed by applying changes to the project. Thus, to add files to a new project, the client must apply a change list containing an add for each of the files.

```
Methods  public void setBinaryPaths(
             URI[ ] paths)
         Sets the paths containing .class files.
         public java.net.URI[ ] getBinaryPaths( )
         Returns the paths containing .class files.
         public com.bea.compiler.IFileStore.IRoot[ ] getBinaryRoots( )
         Returns the roots for the binary path.
         public void setSourcePaths(
             URI[ ] paths)
         Sets the paths containing source files. These will only be
         used if a class is referenced that cannot be found in files
         given directly.
         public java.net.URI[ ] getSourcePaths( )
         Returns the paths containing source files.
         public com.bea.compiler.IFileStore.IRoot[ ] getSourceRoots( )
         Returns the roots for the source path.
         public void setOutputDir(
             URI dir)
         Sets the directory into which classes are placed. The URI
         given is assumed to be a heirarchical, so that appending class
         files can be placed into sub-directories of the one given.
         public java.net.URI getOutputDir( )
         Returns the directory into which classes are placed.
         public void setOutputDirector(
             IProject.IOutputDirector dir)
         Sets a director for this project. This overrides the output dir.
         public void setinUseFile(
             IProject.IInUseFile iinuse)
         Sets the IInUseFile interface that will be used by the project
         when a file is added. By default, all files start out by
         not being in use
         public void ignoreDependencies(
             URI[ ] roots)
         Sets the roots on which dependencies are ignored. By default,
         all binary roots are ignored.
         public com.bea.compiler.IFile getSourceFile(
             URI path)
         Returns source file information for the given file.
         public java.util.Collection getSourceFiles( )
         Returns a Collection of URIs of all source files known to the
         project. getSourceFile( ) can be called on each URI
         in the collection.
         public com.bea.compiler.INamespace getNamespace(
             String name)
         Returns the namespace with the given name.
         public com.bea.compiler.info.IPackage getPackageRoot( )
         Returns the root package object.
         public com.bea.compiler.info.IName getName(
             String name)
         Returns a name object for the given qualified name.
         public com.bea.compiler.info.IPackageMember getEntity(
```

-continued

```
             IName name)
         Returns the package or type with the given name.
         public com.bea.compiler.info.IPackage getPackage(
             IName name)
         Returns the package with the given name.
         public com.bea.compiler.info.IReferenceType getUserType(
             IName name)
         Returns the class or interface with the given name.
         public com.bea.compiler.fileinfo.IFileInfo getFileInfoRoot( )
         Returns the node for the given file.
         public void addChangeListener(
             IProjectChangeListener listener)
         Adds the given change listener to this project.
         public void removeChangeListener(
             IProjectChangeListener listener)
         Removes the given change listener from this project.
         public void applyChanges(
             Collection changes,
             boolean toBuild)
         Notifies the compiler that the files with the given URIs
         have changed. The compiler will shortly update the source
         information and notify all listeners of the change.
         Note that, although every apply will be followed by a change
         notification, the number of applies may be greater than the
         number of notifications because the compiler can choose to
         batch multiple applies together.
         Parameters
             changes - A collection of <code>IFileChange</code>
         objects.
             toBuild - Optimize for a subsequent build
         public void build(
             Collection files,
             boolean force)
         Attempts to generate .class files for all of the given source
         files plus their dependencies. This will omit any files
         whose dependencies (including itself) contain errors.
         Parameters
             files - Provides the <code>URI</code> paths of each of
         the files to be code-generated. If this is null, then all known
         source files will be generated.
             force - Indicates that all of the given files should be
         generated. Otherwise, this will not generate files (1) if
         they have not changed (including dependencies)
         since their last generation or (2) if this would overwrite
         class files that are newer than any of the changes
         (including dependencies).
         public void acquireReadLock( )
         Takes a read lock on the project. No compilation will
         occur until this lock is released.
         public void releaseReadLock( )
         Releases the read lock on the project.
         public com.bea.compiler.IDiagnosticSet getDiagnostics(
             Collection files)
         Returns the set of diagnostics in the given files. Each entry
         in the collection should be the URI path of the file.
         public com.bea.compiler.IDiagnosticSet getDiagnostics(
             URI file,
             boolean includeDeps)
         Returns the set of diagnostics in the given file and,
         if requested, all of it's dependencies.
         public java.lang.Object getProperty(
             String name,
             Object defValue)
         Returns the value of the given property on this project or the
         given default value if it has not been set.
         public void setProperty(
             String name,
             Object value)
         Sets the given property on this project.
         public com.bea.compiler.feature.IFeature createFeature(
             Class key)
         Returns the feature with the specified key. Project features
         have no state and hence do not need to be destroyed.
         public void close( )
         Drops any outstanding resources held by this project.
Fields   public static final PROP_KEEP_BUFFERS
         If set to Boolean.TRUE, this property will stop the
         compiler from releasing the buffers in each file compiled.
         public static final PROP_NO_FEATURES
         If set to Boolean.TRUE, features will not be supported,
```

-continued

| | |
|---|---|
| | but the project can then drop many data structures after a file is compiled. |
| | public static final PROP_CLASSLOADER |
| | If the compiler is not running with the project jars in the default ClassLoader , as it does on the server, then the client should set this property with a ClassLoader for project jars to allow languages to run code from the user's project. (e.g control proprety validation) |

public static interface com.bea.compiler.IProject.IOutputDirector

Provides a mapping from source file to a root under which all the generated classes for the file will be placed.

| | |
|---|---|
| Methods | public com.bea.compiler.IFileStore.IRoot[ ] getRoots( ) |
| | Returns all of the possible roots to which classes could be sent. |
| | public com.bea.compiler.IFileStore.IRoot getRoot( IFile file) |
| | Returns the root for classes generated from the given file. |

public static interface com.bea.compiler.IProject.IInUseFile

| | |
|---|---|
| Methods | public boolean isInUse( URI path) |
| | Returns true if the file represented by this URI should start out as in use |

public interface com.bea.compiler.INode

Represents a node in the tree of nested languages in a source file.

| | |
|---|---|
| Methods | public com.bea.compiler.ILanguage getLanguage( ) |
| | Returns the language in this node. |
| | public int getStart( ) |
| | Returns the inclusive start of the range of text for this node. |
| | public int getEnd( ) |
| | Returns the exclusive end of the range of text for this node. |
| | public java.util.Iterator getChildren( ) |
| | Returns the children of this node. |

public interface com.bea.compiler.INamespace

Maintains information about some sort of objects that can be defined by source files in a project.

| | |
|---|---|
| Methods | public java.lang.String getName( ) |
| | Returns the name of this namespace. To avoid collisions, domain-qualified names should be used. |

public static interface com.bea.compiler.INamespace.IInfoChange

Represents a change that was found during compilation regarding an object in this namespace.

| | |
|---|---|
| Methods | public java.lang.String getNamespace( ) |
| | Returns the name of the namespace that generated this change. This will typically imply a subclass of IInfoChange to which this can be cast. |
| | public int getType( ) |
| | Returns the type of change that occurred. |

-continued

| | |
|---|---|
| Fields | public static final TYPE_ADDED |
| | Indicates that an object was added. |
| | public static final TYPE_REMOVED |
| | Indicates that an object was removed. |
| | public static final TYPE_MODIFIED |
| | Indicates that an object was modified. |

public interface com.bea.compiler.ILanguage

Represents a particular language supported by the compiler.

| | |
|---|---|
| Methods | public java.lang.String getName( ) |
| | Returns a unique short name for this language. This should be the first part of codes used in diagnostics. |

public interface com.bea.compiler.IFileStore

Encapsulates knowledge about how to navigate a particular type of store for source files. New file stores can be registered with the compiler.

| | |
|---|---|
| Methods | public java.lang.String getScheme( ) |
| | Returns the name that is used to identify this file store in the scheme part of the URI. |
| | public com.bea.compiler.IFileStore.IRoot getRoot( URI root) |
| | Returns an object for looking up files under this root. |
| | public com.bea.compiler.IFileStore.IEntry getEntry( URI file) |
| | Returns an entry with an anonymous root if the given file exists. This will not have much useful information to provide about the relative path inside the root. |
| | public java.lang.String getExtension( URI file) |
| | Returns the extension of the source file. This is used to determine which language is contained in the file. |

public static interface com.bea.compiler.IFileStore.IRoot

Represents the root of a tree of files. This allows lookup for specific files under that root.

| | |
|---|---|
| Methods | public com.bea.compiler.IFileStore.IEntry getEntry( String name) |
| | Returns an entry for the file with the given ('/' separated) name under this root or null if none exists. Note that this path should not include any URI-encoded characters. |
| | public com.bea.compiler.IFileStore.IEntry getEntry( String rootName, String[ ] extensions) |
| | Returns an entry for a root name, with a list of possible extensions. Will also return a directory/package entry if none of the extensions exist, but a directory does. |
| | public com.bea.compiler.IFileStore.IEntry createEntry( String name) |
| | Returns an entry that may not exist but can be written to. |
| | public java.util.Iterator getEntries( ) |
| | Returns an iterator over all of the entries under this root. |
| | public java.util.Iterator getEntries( String dir, String[ ] extensions) |
| | Returns an iterator over all of the entries under this root in the given directory and with one of the given extensions or with no extension, if it is a directory. |
| | public boolean contains( URI file) |
| | Determines whether the given file is in this root. |
| | public java.lang.String getRelativePath( URI file) |

-continued

| | |
|---|---|
| | Returns the relative path to the given file in this root, without any URI-encoded characters. |
| | public java.net.URI getPath( ) |
| | Returns the path to this root. |
| | public java.lang.String getSystemPath( ) |
| | Returns the system path to this root. |
| | public void close( ) |
| | Drops any outstanding resources held by this root. |
| | public boolean canContainSource( ) |
| | Determines whether this root can contain source files. |

public static interface com.bea.compiler.IFileStore.IEntry

Represents an entry (file or directory) under a particular root.

| | |
|---|---|
| Methods | public java.net.URI getPath( ) |
| | Returns the absolute URI for this entry. |
| | public java.lang.String getRelativePath( ) |
| | Returns the relative path for this entry inside the root. |
| | public java.lang.String getName( ) |
| | Returns the name of this entry. |
| | public java.lang.String getExtension( ) |
| | Returns the extension of this entry. |
| | public java.lang.String getSimpleName( ) |
| | Returns the name without any extension. |
| | public java.lang.String getSimplePath( ) |
| | Returns the relative path without any extension. |
| | public boolean isDirectory( ) |
| | Determines whether this entry represents a directory or a file. |
| | public boolean exists( ) |
| | Determines whether this entry really exists. This is only useful \for entries returned by createEntry . |
| | public com.bea.compiler.IFileStore.IRoot getRoot( ) |
| | Returns the root that created this entry. |
| | public java.io.InputStream getInputStream( long offset) |
| | Returns an input stream for this file at the given offset. Note that during the compilation of source files with nested languages (almost every file), multiple input streams will be requested on the same file. Implemenations may wish to optimize for this, possibly by reading into a buffer on the first request. |
| | public java.io.OutputStream getOutputStream( ) |
| | Returns an output stream for this file. |
| | public java.lang.String getSystemPath( ) |
| | Returns a path to this file on the system (i.e. an argument that could be passed to the constructor of java.io.File ). If the * store does not support this operation, it may throw an exception. |
| | public java.lang.String getDisplayPath( ) |
| | Returns a path which can be used for printing diagnostics. |
| | public long getLastModified( ) |
| | Returns the last modified time of the file on disk. |

public interface com.bea.compiler.IFileChange

Represents a change that was found in a source file of the project. These objects will be used to notify the compiler of the changes.

| | |
|---|---|
| Methods | public java.net.URI getPath( ) |
| | Returns the path of the file that changed. |
| | public int getType( ) |
| | Returns the type of change that occured. |
| | public java.util.Collection getTextChanges( ) |
| | Returns a list of the ITextChange s for this modification or null if this was not a modification. If there are multiple changes in the collection, they must be ordered as they occurred in the time. Furthermore, the offsets in each change will refer to the state of the world after the previous changes are applied. |

-continued

| | |
|---|---|
| | public long getBufferVersion( ) |
| | If this is a modification, then this records the version of the buffer for this file to which these change apply (in order to get to the next version). If a pending compilation has just retrieved a buffer for this file and its version is greater than this, then it will ignore this change. |
| | public boolean isInMemory( ) |
| | Determines whether this represents a change to the file in-memory or on disk. This affects how the last-modified stamp on the file is updated. |
| Fields | public static final ADDED |
| | Indicates that the file was added. |
| | public static final REMOVED |
| | Indicates that the file was removed. |
| | public static final MODIFIED |
| | Indicates that the file was modified. |

public interface com.bea.compiler.IFile

Encapsulates information about a file. The file may contain source text or it may be a file/jar of compiled class(es).

| | |
|---|---|
| Methods | public com.bea.compiler.IProject getProject( ) |
| | Returns the project containing this file. |
| | public com.bea.compiler.IFileStore.IEntry getEntry( ) |
| | Returns the entry for this file. |
| | public java.net.URI getPath( ) |
| | Returns the path of this source file. |
| | public boolean isSource( ) |
| | Determines whether this is a source rather than a binary file. |
| | public boolean isBinary( ) |
| | Determines whether this is a binary rather than a source file. |
| | public boolean foundOnPath( ) |
| | Determines whether this file was found on the source or binary path. If this is not the case, then the file was added to the project directly. If this is the case, then the file was discovered during compilation, and was not added directly. |
| | public boolean isRemoved( ) |
| | Determines whether this file has been removed from the project. |
| | public java.util.Iterator getTypes( ) |
| | Returns the top-level types declared in this file. |
| | public com.bea.compiler.fileinfo.IFileInfo getFileInfo( ) |
| | Returns the record for this file in the file namespace. |
| | public com.bea.compiler.feature.IFeature createFeature( Class key) |
| | Returns the feature with the specified key. The file cannot be minimized until all features have been destroyed. |
| | public void destroyFeature( IFeature feature) |
| | Cleans up a feature. Every feature created with createFeature should be cleaned up with a call to this function. |
| | public void setInUse( boolean inUse) |
| | Marks a file as not being in use, which means no features will be requested on it |
| | public java.util.Iterator getDependencies( ) |
| | Returns an iterator over all files that this file is dependant on, including itself. This file will always be the first in the list, so it can be skipped with one call to next( ) . Each entry in the list will be an IFile . |

public interface com.bea.compiler.IDiagnosticSet

Encapsulates a set of diagnostics found in the source. The encapsulated set of diagnostics is grouped into entries, where each entry corresponds to a file that contains some diagnostics.

| | |
|---|---|
| Methods | public int size( )<br>Returns the total number of diagnostics found.<br>public int getErrorCount( )<br>Returns the number of error diagnostics found.<br>public int getWarningCount( )<br>Returns the number of warning diagnostics found.<br>public int getInfoCount( )<br>Returns the number of informational diagnostics found.<br>public java.util.Iterator entries( )<br>Returns an iterator over the entries for each file that contains diagnostics. The order of these entries will match the order in which the files were given when this set was created.<br>public java.util.Iterator iterator( )<br>Returns an iterator over all of the diagnostics found. These will be ordered by file and then location in the file.<br>public void print(<br>PrintWriter output)<br>Outputs a description of the diagnostics to the given writer.<br>public void print(<br>PrintStream output)<br>Outputs a description of the diagnostics to the given stream. |

public static interface com.bea.compiler.DiagnosticSet.IEntry

Encapsulates a file all of its diagnostics.

| | |
|---|---|
| Methods | public com.bea.compiler.IFile getFile( )<br>Returns the file that contains diagnostics.<br>public java.util.Iterator getDiagnostics( )<br>Returns the diagnostics in this file sorted by the position at which they apply. |

public interface com.bea.compiler.IDiagnostic

Contains information about an error detected in the source code. Note that the range returned is inclusive on both ends.

Note that a 'column' in this context is a count of the number of characters. Specifically, a tab increases the column count by one.

| | |
|---|---|
| Methods | public com.bea.compiler.IFile getFile( )<br>Returns the file in which this diagnostic was reported.<br>public int getType( )<br>Returns the type of this diagnostic.<br>public java.lang.String getDescription( )<br>Returns the description of the diagnostic.<br>public java.lang.String getPrescription( )<br>Returns the prescription for the diagnostic or null if none is exists.<br>public int getFirstLine( )<br>Returns the line on which this diagnostic starts.<br>public int getFirstColumn( )<br>Returns the column at which this diagnostic starts.<br>public int getLastLine( )<br>Returns the line on which this diagnostic ends.<br>public int getLastColumn( )<br>Returns the column at which this diagnostic ends.<br>public java.lang.String getCode( )<br>Returns a code for the error. This should never be shown to a user. It is provided for testing and debugging purposes only. |
| Fields | public static final TYPE_ERROR<br>Indicates a problem that prevents generating code.<br>public static final TYPE_WARNING<br>Indicates a problem that does not prevent generating code.<br>public static final TYPE_INFO<br>Indicates information that is not necessarily a problem.<br>public static final TYPE_IGNORED<br>Indictes that this diagnostic will never be returned to the client. |

public interface com.bea.compiler.ICompiler

Maintains global information about the configuration of the compiler. Multiple projects may be outstanding at the same time, all of which share this configuration.

| | |
|---|---|
| Methods | public void configure( )<br>Applies the default configuration to the compiler.<br>public void configure(<br>InputStream input)<br>Reads configuration information from the XML in the given stream.<br>public void configure(<br>Element elem)<br>Reads configuration information from an XML fragment.<br>public com.bea.compiler.IProject createProject( )<br>Returns an empty project to which source files can be added. It is the responsibility of the caller to manage this object. It will not be collected until all references to it are removed and all outstanding updates are complete.<br>public void addFileStore(<br>IFileStore store)<br>Registers the given file store with the compiler. This store will be queried for any URIs that begin with its scheme.<br>public com.bea.compiler.IFileStore getFileStore(<br>String scheme)<br>Returns the registered store with the given scheme.<br>public void addBufferCache(<br>IBufferCache cache)<br>Registers the given buffer cache with the compiler. This cache will be queuried when a new buffer is needed.<br>public void removeBufferCache(<br>IBufferCache cache)<br>Unregisters the given buffer cache with the compiler.<br>public void addNamespace(<br>INamespace ns)<br>Registers the given namespace with the compiler. This namespace will then be instantiated for every project that is created thereafter.<br>This language must implement the namespace interfaces defined in the the compiler framework Language API .<br>public com.bea.compiler.INamespace getNamespace(<br>String name)<br>Returns the prototype instance of the namespace with the given name.<br>public java.util.Iterator getNamespaces( )<br>Returns the prototypes of all registered namespaces.<br>public void addLanguage(<br>Class type,<br>ILanguage language)<br>Registers the given language with the compiler. This should be called once for each language before any calls are made to addExtension .<br>The first parameter is a class that can be used as a unique key for this language. Typically, this will be language.getClass .<br>This language must implement the language interfaces defined in the the compiler framework Language API .<br>public com.bea.compiler.ILanguage getLanguage(<br>Class type)<br>Returns the instance of the the given language type.<br>public java.util.Iterator getLanguages( )<br>Returns all of the languages registered with the compiler.<br>public void addExtension(<br>String extension,<br>ILanguage language,<br>int priority)<br>Registers the language that will be used for compiling files with the given extension. This language should have been registered previously with a call to addLanguage .<br>The priority is used (if this language supports discovery) to choose between multiple files that would define the same type when discovered on the source path.<br>public com.bea.compiler.ILanguage getExtension(<br>String extension)<br>Returns the language registered for this extension or null if no language has been registered.<br>public void setDefaultLanguage(<br>ILanguage language)<br>Sets the language to use when no registered extension |

-continued matches.
public com.bea.compiler.ILanguage getDefaultLanguage( )
Returns the language used when no registered extension matches.
public void addProjectFeature(
    Class clazz,
    Object feature)
Registers a new project feature with the compiler. The first parameter must be the class object for the feature interface. The second parameter must implement the interface defined in the the compiler framework Language API .
public void addFileFeature(
    Class clazz,
    Object feature)
Registers a new file feature with the compiler. The first parameter must be the class object for the feature interface. The second parameter must implement the interface defined in the the compiler framework Language API .
public void addBackEnd(
    Class clazz,
    IBackEnd backEnd)
Sets the default back-end for all languages. This back-end must implement the compiler interfaces defined in the the compiler framework Language API .
public java.lang.Object getProperty(
    String name,
    Object defValue)
Returns a global property of the compiler or the given default value if the property has not been set.
public void setProperty(
    String name,
    Object value)
Sets a global property of the compiler.
public void setProperty(
    String name,
    String value,
    String type)
Sets a global property of the compiler. The given value is turned into the appropriate object for its type (boolean, integer, or string).
public void addDescriptions(
    ResourceBundle bundle)
Reads diagnostic descriptions from the given resource bundle. The keys in the bundle should be the codes for diagnostics and the values are their descriptions.
public void addPrescriptions(
    ResourceBundle bundle)
Reads diagnostic prescriptions from the given resource bundle. The keys in the bundle should be the codes for diagnostics and the values are their descriptions.
public void addSeverities(
    ResourceBundle bundle)
Reads diagnostic severities from the given resource bundle. The keys in the bundle should be the codes for the diagnostics and the values are either ‘fatal-error’, ‘error’, ‘warning’, ‘info’, and ‘ignored’. The ‘fatal-error’ value means the same as ‘error’ except that it denotes the diagnostic cannot be reassigned any other severity.
public void addExceptionListener(
    ICompiler.IExceptionListener listener)
Adds a listener for uncaught exceptions that occur in the compiler.
public void removeExceptionListener(
    ICompiler.IExceptionListener listener)
Removes a listener for uncaught exceptions that occur in the compiler.
public void error(
    int type,
    String code,
    Object[ ] args)
Outputs the given error to the compiler’s error stream.
public void error(
    PrintStream out,
    PrintStream err,
    int type,
    String code,
    Object[ ] args)
Outputs the given error to the given output or error stream.
public void output(
    String code, -continued Object[ ] args)
Outputs the given error to the compiler’s output stream. This is similar to an information message, but this guarantees that no prefix or suffix will be added to the message.
public void output(
    PrintStream out,
    String code,
    Object[ ] args)
Outputs the given error to the given output stream.
public java.lang.String getMessage(
    String code,
    Object[ ] args)
Returns the message without writing it.

Fields
public static final PROP_DEFAULT_BACKEND
Names the property that defines the default backend. Its value should be an Object .
public static final PROP_ENCODING
Names the property that defines the default encoding for source files given to the compiler. Its value should be a String .
public static final PROP_DELAY
Names the property that defines the amount of time to wait after a change occurs before recompiling. Its value should be an Integer .
public static final PROP_VERBOSE
Names the property that determines which calls to error should be output to stdout and stderr. Its value is an Integer . All severities less than or equal to this number will be output.
public static final PROP_DEBUG
Names the property that determines whether to emit debugging information into .class files. Its value should be a Boolean .
public static final PROP_PRODUCTION
Names the property that determines whether to emit code for production mode (rather than development mode). Its value should be a Boolean .
public static final PROP_PATH_CACHE_SIZE
Names the property that determines the maximum number of entries allowed in the compiler projects’ path cache. Its value should be an Integer . Default value is 4096.
public static final FATAL
Indicates an error for which we cannot continue. This will cause a System.exit.
public static final ERROR
Indicates an error for which we can continue.
public static final WARNING
Indicates a warning message.
public static final INFO
Indicates an informational message.

public static interface com.bea.compiler.ICompiler.IExceptionListener

Defines the events provided to listeners for uncaught exceptions.

Methods
public void uncaughtException(
    Thread t,
    Throwable e)
Indicates that an uncaught exception occurred on the given thread.

public interface com.bea.compiler.IBufferCache

Provides instances of IBuffer to the compiler if they exist in the cache.

Methods
public com.bea.compiler.IBuffer getBuffer(
    URI path,
    long changeID)
Returns the cached buffer for the given path or null if none exists. The buffer will contain a of the contents of the file -continued

| | |
|---|---|
| | as of the given changeID if the ID is nonnegative. Otherwise, it will be one of the constants defined below. It is safe to assume that the compiler will never use more than two buffers for the same file at a time, and if two are used, one of those will be the "online" buffer. |
| Fields | public static final CURRENT_ONLINE<br>Indicates to return a buffer that contains the current state. But this will only used to make updates to the token set in an online fashion, i.e., in the call to applyChanges . For that reason, it is safe to return the buffer in the editor.<br>public static final CURRENT_OFFLINE<br>Indicates to return a buffer that contains the current state. This will be used when updates are being made in an offline fashion, i.e., on a background compiler thread. |

public interface com.bea.compiler.IBuffer

Encapsulates access to the contents of a source file. The file in question can be in memory or on disk.

Note that the contents of the buffer should never change asynchronously to the compiler. In other words, a buffer should represent a of the source code, and unless the compiler requests a change to the text by calling replaceText, the contents should not change.

| | |
|---|---|
| Methods | public long getVersion( )<br>Returns the version number for this snapshot of the source. The only requirements on this number are that it only increase over time.<br>public int getLength( )<br>Returns the current length of the buffer.<br>public java.io.Reader getReader(<br>int start,<br>int end)<br>Returns a reader that will return the characters in the given range<br>Parameters<br>start - The inclusive start of the range to read.<br>end - The exclusive end of the range to read or -1 for the end of the file.<br>public java.lang.String getText(<br>int start,<br>int end)<br>Returns the text in the given range. This can only be called after call to getReader . Futhermore, it should only be used for small text ranges.<br>public void replaceText(<br>String text,<br>int start,<br>int end)<br>Replaces the text in the specified range with the specified text.<br>Parameters<br>text - the text to insert<br>start - the start offset of the text to replace<br>end - the end offset of the text to remove<br>public int[ ] getLineOffsets( )<br>Returns an array containing start offset of each line in the source. |

public interface com.bea.compiler.IBackEnd

Represents a particular back-end supported by the compiler.

| | |
|---|---|
| Methods | public java.lang.String getName( )<br>Returns a unique name for this back-end. |

public class com.bea.compiler.Compiler

Stores a reference to the single instance of the class that implements ICompiler.

| | |
|---|---|
| Constructors | public Compiler( ) |
| Methods | public static com.bea.compiler.ICompiler get( )<br>Returns a reference to the implemention of ICompiler .<br>public static void set(<br>ICompiler compiler)<br>Sets the reference to the implementation of ICompiler . This will be called once when the implementation class is loaded. |

Package com.bea.compiler.classfile

This package defines how the editor and runtime use the compiler to get language information and produce running code. Its classes and interfaces are described below.

public class com.bea.compiler.classfile.ClassFileAnnotation implements java.io.Serializable This class defines the shape of annotation entries put into the .class files generated by the compiler. The value of each attribute is a serialized version of an array of these ClassFile-Annotation.

| | |
|---|---|
| Constructors | public ClassFileAnnotation( )<br>public ClassFileAnnotation(<br>String tagName) |
| Methods | public java.lang.String getName( )<br>Returns the name of this annotation.<br>public void setName(<br>String name)<br>Stores the name of this annotation.<br>public java.lang.String[ ] getAttributeNames( )<br>Returns the names of the attributes on this annotation.<br>public java.lang.String getAttributeNames(<br>int index)<br>Returns the name of the attribute with the given index.<br>public void setAttributeNames(<br>String[ ] attrNames)<br>Stores the names of the attributes on this annotation.<br>public void setAttributeNames(<br>int index,<br>String attrName)<br>Stores the name of the attribute with the given index.<br>public java.lang.Object[ ] getAttributeValues( )<br>Returns the values of the attributes on this annotation.<br>public java.lang.Object getAttributeValues(<br>int index)<br>Returns the value of the attribute with the given index.<br>public void setAttributeValues(<br>Object[ ] attrValues)<br>Stores the values of the attributes on this annotation.<br>public void setAttributeValues(<br>int index,<br>Object attrValue)<br>Stores the value of the attribute with the given index.<br>public void addAttribute(<br>String name,<br>Object value)<br>public java.lang.String toString( )<br>public static byte[ ] toByteArray(<br>ClassFileAnnotation[ ] annotations)<br>Converts the given annotation array into a byte stream as would be stored into the .class file.<br>public static com.bea.compiler.classfile.ClassFileAnnotation[ ] fromByteArray(<br>byte[ ] bytes)<br>Converts a byte stream as would be found in a .class file into an ClassFileAnnotation array. |
| Fields | public static final ATTRIBUTE_NAME<br>Defines the name of the VM attribute containing the annotations. |

Package com.bea.compiler.command

This package defines how the client sends commands to the compiler and receives the results. Its classes and interfaces are described below public interface com.bea.compiler.command.ICmdCompiler

| | |
|---|---|
| Methods | public com.bea.compiler.command.ICmdCompiler.IResult exec(<br>String[ ] args)<br>Performs the compilation described by the given command-line args.<br>public com.bea.compiler.command.ICmdCompiler.IResult exec(<br>String[ ] args,<br>PrintStream out,<br>PrintStream err)<br>Performs the compilation described by the given command-line args, with output sent to the given streams.<br>public java.lang.Object clone( )<br>Returns a new instance of the command-line compiler. |

public static interface com.bea.compiler.command.ICmdCompiler.IResult

Records information about the result of compilation.

| | |
|---|---|
| Methods | public boolean isSuccess( )<br>Determines whether no errors were found (and code was produced).<br>public com.bea.compiler.IDiagnosticSet getDiagnostics( )<br>Returns the set of errors and warnings found in the source. This may be null if no errors were found. |

public class com.bea.compiler.command.CmdCompiler

Provides the ability to instantiate command-line compilers.

| | |
|---|---|
| Constructors | public CmdCompiler( ) |
| Methods | public static com.bea.compiler.command.ICmdCompiler.IResult exec(<br>String[ ] args)<br>Runs the command-line compiler with the given arguments.<br>public static com.bea.compiler.command.ICmdCompiler.IResult exec(<br>String[ ] args,<br>PrintStream out,<br>PrintStream err)<br>Runs the command-line compiler with the given arguments and streams.<br>public static void set(<br>ICmdCompiler prototype)<br>Sets the prototype instance of the command-line compiler. |

Package com.bea.compiler.enterprise

This package defines how the client gets additional information pertaining to enterprise applications, such as web applications. Its classes and interfaces are described below public interface com.bea.compiler.enterprise.IEntProject Defines additional information needed for an enterprise project. By "enterprise", we mean both J2EE and the WebLogic Workshop framework. For example, this information may be provided in web.xml.

-continued

| | |
|---|---|
| Methods | public com.bea.compiler.enterprise.IEntProject.IWebAppProject getWebAppProject( )<br>Returns a web app project, or null, if this project is not a web app.<br>public com.bea.compiler.enterprise.IEntProject.IWebAppProject[ ]<br>getWebAppProjects( )<br>Returns all web app projects that are part of the current application. |
| Fields | public static final PROP<br>The key for storing this on an IProject. |

public static interface com.bea.compiler.enterprise.IEntProjectiWebAppProject

Exposes the information available on a enterprise project that is a web application project.

| | |
|---|---|
| Methods | public java.net.URI getWebRootPath( )<br>Returns the web root path for use in dealing with URL references.<br>public java.lang.String getWebContextPath( )<br>Returns the context path for this project. A URL to a resource in this project is composed of:<br>http://<server>:<;port>/<;context-path>/<;source-path><br>Thus it is necessary that the compiler know the context path in order to make any sense of a 'root-relative' URL:<br><a href="/samples/jsp/HelloWorld.jsp">Hello<;a><br>In the above case the context path is '/samples'. |

Package com.bea.compiler.feature

This package defines how the client accesses information about certain features of the souce code. Its classes and interfaces are described below.

public interface com.bea.compiler.feature.ITokenInfoFeature implements com.bea.compiler.feature.IFeature

| | |
|---|---|
| Methods | public com.bea.compiler.IToken getToken(<br>INode node,<br>int offset)<br>Returns the token at the given offset.<br>public java.util.Iterator getTokens(<br>INode node,<br>int offset)<br>Returns an iterator starting with the token at the given offset and ending at the end of the language node.<br>public java.util.Iterator getTokens(<br>INode node,<br>int offset,<br>boolean forward)<br>Returns an iterator starting with the token at the given offset, ending at the end of the the language node, and moving in the given direction.<br>public java.util.Iterator getTokens(<br>INode node,<br>int offset,<br>int length,<br>boolean forward)<br>Returns an iterator starting with the token at the given offset, moving in the given direction, and ending after the given length or the end of the language node, whichever comes first.<br>public java.lang.String getTokenName(<br>INode node,<br>IToken token)<br>Returns a displayable name for the specified token.<br>public java.lang.String[ ] getTokenNames(<br>INode node)<br>Returns all the token names for the language in the given node.<br>public java.lang.String[ ] getTokenNames(<br>ILanguage lang)<br>Returns all the token names for the given language. |

public interface com.bea.compilenfeature.IStructureFeature implements com.bea.compilerfeature.IFeature Used to build structure trees, which are client accessible representations of the parse tree. Structure trees are medium used for two-way editing.

| | |
|---|---|
| Methods | public com.bea.compiler.feature.IStructureFeature.IStructureNode createStructure(<br>IStructureFeature.IStructureBuilder builder)<br>Creates a new structure tree using the specified builder.<br>public com.bea.compiler.feature.IStructureFeature.Range getRangeInSource(<br>IStructureFeature.IStructureNode node)<br>Returns the range of the specified node in the source code.<br>public com.bea.compiler.feature.IStructureFeature.Range getRangeInSource(<br>IStructureFeature.IStructureNode node,<br>IStructureFeature.StructureCode propCode)<br>Returns the range of the specified property in the source code.<br>public java.lang.Object getSourceValue(<br>IStructureFeature.IStructureNode node,<br>IStructureFeature.StructureCode propCode)<br>Returns the syntactic value of the specified property.<br>public void addChild(<br>IStructureFeature.IStructureNode parent,<br>IStructureFeature.IAuthorNode child)<br>Adds the specified child to the specified parent. This method is used to two-way edit a particular node.<br>public void removeChild(<br>IStructureFeature.IStructureNode child)<br>Removes the specified child from the specified parent. This is used to two-way edit a particular node.<br>public void replaceNode(<br>IStructureFeature.IStructureNode oldNode,<br>IStructureFeature.IAuthorNode newNode)<br>Replaces a particular structure node with a new node. This is used to two-way edit a particular node. |

public static class com.bea.compiler.feature.IStructureFeature.Range

Stores a range in the source code.

| | |
|---|---|
| Constructors | public IStructureFeature.Range(<br>int start,<br>int end) |
| Fields | public start<br>The start of the range.<br>public end<br>The end of the range. |

public static interface com.bea.compiler.feature.IStructureFeature.IStructureBuilder An interface used to build structure trees. An IStructureBuilder must be implemented by the user of this feature and passed to createStructure. The builder will be called in order to build the structure tree.

| | |
|---|---|
| Methods | public com.bea.compiler.feature.IStructureFeature.IStructureNode createNode(<br>IStructureFeature.StructureCode typeCode,<br>Object cookie)<br>Provides the builder with a chance to create a node.<br>public void setProperty(<br>IStructureFeature.IStructureNode node,<br>IStructureFeature.StructureCode propCode,<br>Object value)<br>Tells the builder to set a particular property on the node.<br>public void addChild(<br>IStructureFeature.IStructureNode node,<br>IStructureFeature.IStructureNode child)<br>Tells the builder to add a child to a node. |

public static interface com.bea.compiler.feature.IStructureFeature.IStructureNode An interface that must be implemented by the nodes in a structure tree.

| | |
|---|---|
| Methods | public com.bea.compiler.feature.IStructureFeature.StructureCode getTypeCode( )<br>Returns the type code for this node.<br>public java.lang.Object getCookie( )<br>Returns the cookie for this node. |

public static interface com.bea.compiler.feature.IStructureFeature.IAuthorNode

An interface that must be implemented by nodes that are used to author code.

| | |
|---|---|
| Methods | public com.bea.compiler.feature.IStructureFeature.StructureCode getTypeCode( )<br>Returns the type code for this node.<br>public java.util.HashMap getProperties( )<br>Returns the properties for this node. The keys should all be instances of StructureCode.<br>public java.util.List getChildren( )<br>Returns the children for this node. |
| Fields | public static final INDEX<br>Indicates where the new node should be placed inside the parent. |

public static class com.bea.compiler.feature.IStructureFeature.StructureCode implements java.lang.Comparable Represents a "code" used is used to identify a type of nodes or a property on a node. Each code can be thought of as a pair of the form (class, code). This allows each language to define its own space of codes, which cannot conflict with another language's codes.

| | |
|---|---|
| Constructors | protected IStructureFeature.StructureCode(<br>int code) |
| Methods | public int getCode( )<br>Returns the class-specific type code.<br>public boolean equals(<br>Object o)<br>public int hashCode( )<br>public java.lang.String toString( )<br>public int compareTo(<br>Object o) |

public interface com.bea.compilenfeature.ISourceinfoFeature implements com.bea.compiler.feature.IFeature This is similar to the ITokenInfoFeature but provides more general information about the source. For that reason, it can be used only on files that have completed the front-end of compilation.

| | |
|---|---|
| Methods | public com.bea.compiler.feature.ISourceInfoFeature.Range getRange(<br>int offset,<br>Object obj)<br>Returns the start offset of the given object, which was returned from querying about the given offset, or null if it is not known.<br>public java.lang.Object getIdentifierInfo(<br>int offset)<br>Returns the object referenced by the identifier at the given offset or null if the information could not be produced.<br>public boolean isCompletionChar(<br>int offset,<br>char ch)<br>Determines whether the given character, just typed, should |

-continued

| | |
|---|---|
| | initiate an attempt at completion (after a pause). |
| | public com.bea.compiler.feature.ISourceInfoFeature.Range getCompletionRange( int offset) |
| | Returns the range in the text that holds the current value of the completion that has been chosen. This is what will be replaced when a new completion is chosen. |
| | public java.util.List getCompletions( int offset, char ch) |
| | Returns all of the possible objects whose names could be used in place of the identifier at the given offset (or that would be at the given offset). The return value will be null if the information could not be produced. |
| | public java.util.List getEnclosingContext( int offset) |
| | Returns information about the enclosing contexts of the given offset. The closest context will be first in the list. |

public static class com.bea.compilenfeature.ISourceInfoFeature.Range

Records a range of offsets in the source of the form [start, end).

| | |
|---|---|
| Constructors | public ISourceInfoFeature.Range( ) |
| Fields | public start |
| | public end |

public static class com.bea.compiler.feature.ISourceInfoFeature.MethodCallContext Provides enclosing context for a method call.

| | |
|---|---|
| Constructors | public ISourceInfoFeature.MethodCallContext( ) |
| Fields | public location |
| | The type in which the method would need to be located. |
| | public name |
| | The name of the method being called. |
| | public position |
| | Returns the position of the identifier part of the method call. |
| | public method |
| | The method currently being called (if a match exists). |

public interface com.bea.compilenfeature.IPropertyInfoFeature implements com.bea.compiler.feature.IFeature Provides information about the properties of a certain strucutre node, including the valid tags and their attributes.

| | |
|---|---|
| Methods | public com.bea.compiler.feature.IPropertyInfoFeature.IDescription getDescription( IStructureFeature.IStructureNode node) |
| | Returns the description associated with the given node |
| | public java.util.Iterator getAllTags( IStructureFeature.IStructureNode node) |
| | Returns the list of possible annotation tags on the given node. The iterator elements must be of type ITag |

public static interface com.bea.compiler.feature.IPropertyInfoFeature.IDescription This interface provides information about a node.

| | |
|---|---|
| Methods | public java.lang.Object getProperty( String name) |
| | Returns the property identified by name |
| | public java.lang.String getDescription( ) |
| | Returns the human-readable description |

public static interface com.bea.compilenfeature.IPropertyInfoFeature.ITag

This interface provides information about a tag

| | |
|---|---|
| Methods | public java.lang.String getNamespace( ) |
| | Returns the namespace of the tag |
| | public java.lang.String getName( ) |
| | Returns the name of the tag |
| | public int getMinOccurs( ) |
| | Returns the minimum number of times this tag can appear |
| | public int getMaxOccurs( ) |
| | Returns the maximum number of time this tag can appear, with −1 indicating 'unbounded'. |
| | public java.lang.String getDescription( ) |
| | Returns the human-readable description |
| | public java.lang.Object getProperty( String name) |
| | Returns additional properties identified by name |
| | public java.util.Iterator getAttributes( ) |
| | Returns the list of attributes associated with this tag |
| | The iterator elements must be of type IAttribute |

public static interface com.bea.compiler.feature.IPropertyInfoFeature.IAttribute This interface provides information about an attribute.

| | |
|---|---|
| Methods | public java.lang.String getName( ) |
| | Returns the name of this attribute |
| | public java.lang.Object getDefaultValue( ) |
| | Returns the default value of this attribute |
| | public boolean isRequired( ) |
| | Returns true if this attribute is required |
| | public java.lang.String getDescription( ) |
| | Returns the human-readable description |
| | public java.lang.Object getProperty( String name) |
| | Returns additional properties identified by name |
| | public com.bea.compiler.feature.IPropertyInfoFeature.IType getType( ) |
| | Returns the type of that attribute |

public static interface com.bea.compiler.feature.IPropertyInfoFeature.IType

This interface provides information about a type.

| | |
|---|---|
| Methods | public int getTypeCode( ) |
| | Returns the type code |
| | public int getMaxLength( ) |
| | Returns the maximum allowable length. Must be implemented if this type is a TYPE_TEXT or a TYPE_TEXTLONG . |
| | public java.lang.Comparable getMax( ) |
| | Returns the maximum value as defined by the specific ordering rules for the type. Must be implemented if this type is a TYPE_DECIMAL , TYPE_INTEGER or TYPE_DATE . |
| | public java.lang.Comparable getMin( ) |
| | Returns the minimum value as defined by the specific oredering rules for the type. Must be implemented if this type is a TYPE_DECIMAL , TYPE_INTEGER or TYPE_DATE . |
| | public java.util.Iterator getEnumerationElements( ) |

-continued

| | |
|---|---|
| | Returns the elements of an enumeration. Must be implemented if this type is a TYPE_ENUMERATION . |
| | public int getDecimalPlaces( ) |
| | Returns the number of decimal places. Must be implemented if this type is a TYPE_DECIMAL |
| | public com.bea.compiler.feature.IPropertyInfoFeature.I-CustomType getcustomType( ) |
| | Returns the custom type description. Must be implemented if this type is a TYPE_CUSTOM . |
| Fields | public static final TYPE_UNKNOWN |
| | public static final TYPE_TEXT |
| | public static final TYPE_TEXTLONG |
| | public static final TYPE_ENUMERATION |
| | public static final TYPE_BOOLEAN |
| | public static final TYPE_DECIMAL |
| | public static final TYPE_INTEGER |
| | public static final TYPE_DATE |
| | public static final TYPE_CUSTOM |

public static interface com.bea.com piler.feature.IPropertyInfoFeature.ICustomType This interface provides info about a custom type

| | |
|---|---|
| Methods | public java.lang.String getName( )<br>Returns the name of the custom type.<br>public java.lang.Object getTypeValidator( )<br>Returns the custom validator.<br>public java.lang.Object getTypeBuilder( )<br>Returns the custom builder.<br>public java.lang.Object getTypeRenderer( )<br>Returns the custom renderer. |

public static interface com.bea.compiler.feature.IPropertyInfoFeature.ITypeFactory Factory interface that supports creating different types

| | |
|---|---|
| Methods | public com.bea.compiler.feature.IPropertyInfoFeature.IType createUnknownType( )<br>Creates a TYPE_UNKNOWN type.<br>public com.bea.compiler.feature.IPropertyInfoFeature.IType createTextType(int maxLength)<br>Creates a TYPE_TEXT type.<br>public com.bea.compiler.feature.IPropertyInfoFeature.IType createTextLongType(int maxLength)<br>Creates a TYPE_TEXTLONG type.<br>public com.bea.compiler.feature.IPropertyInfoFeature.IType createEnumerationType(Collection values)<br>Creates a TYPE_ENUMERATION type. This methods holds onto the array provided.public com.bea.compiler.feature.I-PropertyInfoFeature.IType createBooleanType( )<br>Creates a TYPE_BOOLEAN type.<br>public com.bea.compiler.feature.IPropertyInfoFeature.IType createIntegerType(Comparable min, Comparable max)<br>Creates a TYPE_INTEGER type.<br>public com.bea.compiler.feature.IPropertyInfoFeature.IType createDecimalType(Comparable min, Comparable max, int decimalPlaces)<br>Creates a TYPE_DECIMAL type.<br>public com.bea.compiler.feature.IPropertyInfoFeature.IType createDateType(Comparable min, Comparable max)<br>Creates a TYPE_DATE type.<br>public com.bea.compiler.feature.IPropertyInfoFeature.IType createCustomType(String name, Object typeValidator, Object typeBuilder, Object typeRenderer)<br>Creates a TYPE_CUSTOM type. |

public static class com.bea.compiler.feature.IPropertyInfoFeature.TypeFactory

Contains reference to an ITypeFactory singleton object.

| | |
|---|---|
| Constructors | public IPropertyInfoFeature.TypeFactory( ) |
| Methods | public static com.bea.compiler.feature.IPropertyInfo Feature.ITypeFactory get( )<br>Returns the instance of an ITypeFactory<br>public static void set( IPropertyInfoFeature.ITypeFactory factory)<br>Sets the instance of the ITypeFactory . This should be called only by implementors of the interface. |

public interface com.bea.compiler.feature.INodeInfoFeature implements com.bea.compiler.feature.IFeature Provides information about the language structure of a file.

| | |
|---|---|
| Methods | public com.bea.compiler.INode getRootNode( )<br>Returns the root node in the language tree.<br>public java.util.List getNodes( int offset)<br>Returns the language stack at the given offset. |

public interface com.bea.compiler.feature.IFeature

The interface all features provide to the compiler clients.

Package com.bea.compiler.fileinfo

This package defines how the client accesses information about the project's files and directories. Its classes and interfaces are described below.

public interface com.bea.compiler.fileinfo.IFileNamespace

Maintains the namespace of files for a project. This namespace allows compilers to query for files with given names and to look at any exposed content. In both cases, dependencies are added on that information.

| | |
|---|---|
| Methods | public com.bea.compiler.fileinfo.IFileInfo getRootDirectory( )<br>Returns the root directory.<br>public com.bea.compiler.fileinfo.IFileinfo findFile( String path)<br>Returns the node for the file with the given path. If the path begins with a '/', then this path is relative to the project. Otherwise, it is relative to the current file.<br>PHASE: any<br>public com.bea.compiler.fileinfo.IFileInfo findFile( IFileInfo baseFile, String path)<br>Like findFile above, but if a relative path is used, the file will be interpretted relative to the given base file rather than the current file.<br>PHASE: any<br>public com.bea.compiler.fileinfoiFileInfo findFile( String path, IFileStore.IRoot root)<br>Returns the node for the file with the given path inside the given root. If the path begins with a '/', then this path is relative to the project. Otherwise, it is relative to the current file.<br>PHASE: any<br>public com.bea.compiler.fileinfo.IFileInfo findFile( IFileInfo baseFile, String path, IFileStore.IRoot root)<br>Like findFile above, but if a relative path is used, the file will be interpretted relative to the given base file rather than the current file.<br>PHASE: any<br>public com.bea.compiler.fileinfo.IFileInfo getFileInfo( IFile file)<br>Returns the node for the given file. |

-continued

| | |
|---|---|
| Fields | public static final NAME<br>Records the name of this namespace. |

public static interface com.bea.compiler.fileinfo.IFileNamespace.IInfoChange implements com.bea.compiler.INamespace.IInfoChange Describes a change that occurred in the type namespace. This includes both the outer type and the entity because a new member can show up in types that inherit it as well as its outer type.

| | |
|---|---|
| Methods | public com.bea.compiler.fileinfo.IFileInfo getNode( )<br>Returns the node in the tree that changed. |

public interface com.bea.compiler.fileinfo.IFileInfo implements java.lang.Comparable Represents a node in the file namespace, which can be either a file or a directory. Each file can provide access to its content in various forms. Each content type is encoded using a MIME-like name.

| | |
|---|---|
| Methods | public java.lang.String getName( )<br>Returns the name of this file or directory. The root directory will have an empty name.<br>public java.lang.String getPath( )<br>Returns the path to this file or directory, with '/' as separator.<br>public com.bea.compiler.fileinfo.IFileInfo getParent( )<br>Returns the parent of this file in the tree (or null if this is the root directory).<br>public boolean isFile( )<br>Determines whether this is a file.<br>public boolean isDirectory( )<br>Determines whether this is a directory.<br>public long getLastModified( )<br>Returns the last modified time of a file or -1 for a directory.<br>public java.util.Iterator getChildren( )<br>Returns the children of this directory.<br>public java.util.Iterator getChildren(<br>String name)<br>Returns the children with the given name. There may be more than one in the various source and and binary paths. However, they will always be returned in their order on the paths (with source before binary).<br>public com.bea.compiler.fileinfo.IFileInfo getChild(<br>String name)<br>Returns the child with the given name or null if none exists. If more than one exists, this will return first one in the list.<br>public com.bea.compiler.IFile getFile( )<br>Returns the file that this node represents.<br>public boolean hasContentOfType(<br>String type)<br>Determines whether this file has content of the given type.<br>public java.lang.String[ ] getContentTypes( )<br>Returns a list of the supported content types for this file.<br>public java.lang.Object getContent(<br>String type)<br>Returns the content of this file in the given type or null if the type is not supported. |

Package com.bea.compiler.info

This package defines how the client accesses information about the structure of a source file. Its classes and interfaces are described below.

public class com.bea.compiler.info.Type

Contains references to the static types defined. These statics are filled in at run-time by the framework.

| | |
|---|---|
| Constructors | public Type( ) |
| Fields | public static ERROR<br>public static VOID<br>public static NULL<br>public static BOOLEAN<br>public static BYTE<br>public static SHORT<br>public static INT<br>public static LONG<br>public static CHAR<br>public static FLOAT<br>public static DOUBLE<br>public static EMPTY_TUPLE |

public class com.bea.compiler.info.Name

Contains references to the static names defined. These statics are filled in at run-time the framework.

| | |
|---|---|
| Constructors | public Name( ) |
| Fields | public static LANG<br>public static OBJECT<br>public static CLASS<br>public static THROWABLE<br>public static EXCEPTION<br>public static RUNTIME_EXCEPTION<br>public static ERROR<br>public static CLONEABLE<br>public static STRING<br>public static SERIALIZABLE<br>public static XSCRIPT_VARIANT<br>public static XSCRIPT_ARRAY<br>public static XSCRIPT_BOOLEAN<br>public static XSCRIPT_DATE<br>public static XSCRIPT_FUNCTION<br>public static XSCRIPT_MATH<br>public static XSCRIPT_NUMBER<br>public static XSCRIPT_OBJECT<br>public static XSCRIPT_REGEXP<br>public static XSCRIPT_STRING<br>public static XSCRIPT_XML<br>public static XSCRIPT_XMLLIST |

public interface com.bea.compiler.info.IVariable

Encapsulates information about a variable defined in the source. This variable can be a local variable, a method parameter, a field of a user type, and so on.

| | |
|---|---|
| Methods | public java.lang.String getID( )<br>Returns the name of this variable.<br>public com.bea.compiler.info.IType getType( )<br>Returns the type of this variable.<br>public boolean isField( )<br>Determines whether this variable is a field of a class. If so, this can be safely cast into an IField to get more information.<br>public boolean isFinal( )<br>Determines whether this variable can be reassigned. |

public interface com.bea.compiler.info.IType

Represents a Type available in the Java runtime or the error type, which is used at compile time to denote something of an unknown type.

| | |
|---|---|
| Methods | public boolean isErrorType( )<br>Determines whether this denotes the error type.<br>public boolean isVoidType( )<br>Determines whether this denotes the void type. |

-continued

| | |
|---|---|
| | public boolean isNullType( )<br>Determines whether this is the null type.<br>public boolean isPrimitiveType( )<br>Determines whether this is a primitive type.<br>public boolean isPrimitiveNumericType( )<br>Determines whether this is a numeric primitive type.<br>public boolean isPrimitiveIntegralType( )<br>Determines whether this is an integral primitive type.<br>public int getTypeCode( )<br>Returns the code for a primitive type.<br>public boolean isReferenceType( )<br>Determines whether this is a reference type.<br>public boolean isUserType(<br>IName name)<br>Determines whether this is the user type with the given name.<br>public boolean isTupleType( )<br>Determines whether this is a tuple of types.<br>public int getComponentCount( )<br>Returns the number of components of a tuple type.<br>public com.bea.compiler.info.IType[ ] getComponentTypes( )<br>Returns the components of a tuple type.<br>public boolean isMethodType( )<br>Determines whether this is a method type.<br>public com.bea.compiler.info.IType getArgumentTypes( )<br>Returns the tuple of argument types of a method type.<br>public com.bea.compiler.info.IType getReturnType( )<br>Returns the return type of a method type.<br>public java.lang.String getSignature( )<br>Returns the encoded signature of this type.<br>public java.lang.String getDisplayName( )<br>Returns the name of this type as it might appear in the source code.<br>public boolean equals(<br>Object o)<br>Determines whether this type is equivalent to the given one.<br>public int hashCode( )<br>Returns a hash code that is compatible with equals. |
| Fields | public static final BOOLEAN<br>Constant for the boolean type.<br>public static final BYTE<br>Constant for the byte type.<br>public static final SHORT<br>Constant for the short type.<br>public static final INT<br>Constant for the int type.<br>public static final LONG<br>Constant for the long type.<br>public static final CHAR<br>Constant for the char type.<br>public static final FLOAT<br>Constant for the float type.<br>public static final DOUBLE<br>Constant for the double type. |

public interface com.bea.compiler.info.IReferenceTypeMember implements com.bea.compiler.info.IDeclaredEntity Represents a member of a type, which can be a field, method, or a type.

| | |
|---|---|
| Methods | public java.lang.String getID( )<br>Returns the ID of this member.<br>public boolean isAmbiguous( )<br>Determines whether multiple members with this ID or signature exist.<br>public int getModifiers( )<br>Returns all of the modifiers in an bitfield (bits defined below). |
| Fields | public static final STATIC<br>public static final ABSTRACT<br>public static final FINAL<br>public static final NATIVE<br>public static final SYNCHRONIZED<br>public static final TRANSIENT<br>public static final VOLATILE<br>public static final STRICTFP |

public interface com.bea.compiler.info.IReferenceType implements com.bea.compiler.info.IPackageMember, com.bea.compilerinfo.IReferenceTypeMember, com.bea.compiler.info.IType Represents a reference type, which can be either user-defined type (i.e., a class or interface) or an arrayp type.

| | |
|---|---|
| Methods | public com.bea.compiler.IFile getFile( )<br>Returns the file containing the declaration of this type.<br>public com.bea.compiler.info.IPackage getPackage( )<br>Returns the containing package.<br>public com.bea.compiler.info.IReferenceType getTopType( )<br>Returns the containing top-level type or null if none exists.<br>public boolean isClass( )<br>Determines whether this type is a class.<br>public boolean isInterface( )<br>Determines whether this type is an interface.<br>public boolean isArray( )<br>Determines whether this type is an array.<br>public boolean hasCanonicalName( )<br>Determines whether this class has a canonial name. Without one, this type cannot be referenced from outside of its original scope.<br>public java.lang.String getName(<br>char packageSeparator,<br>char typeSeparator)<br>Returns the name of this class a single string with the given characters placed after package and type IDs, respectively, when separating them from further parts of the name.<br>public boolean isNested( )<br>Determines whether this type is nested in an outer type.<br>public boolean isInnerClass( )<br>Determines whether this class has an enclosing instance at runtime.<br>public com.bea.compiler.info.IReferenceType getSuperclass( )<br>Returns the direct superclass of this type. For an interface, this is always java.lang.Object .<br>public java.util.Iterator getInterfaces( )<br>Returns the direct super-interfaces of this type.<br>public boolean isSubclassOf(<br>IName name)<br>Determines whether this type is a class of the given class.<br>public boolean isImplementorOf(<br>IName name)<br>Determines whether this type is implements the given interface.<br>public java.util.Iterator getFields( )<br>Returns the field members of this type, including inheritted ones.<br>public com.bea.compiler.info.IField getField(<br>String name)<br>Returns the field with the given name or null if none exists.<br>public java.util.Iterator getMethods( )<br>Returns the method members of this type, including inheritted ones.<br>public java.util.Iterator getMethods(<br>String name)<br>Returns the methods of this type with the given name, including inheritted ones.<br>public java.util.Iterator getMethods(<br>String name,<br>int argCount)<br>Returns the methods of this type with the given name and number of arguments, including inheritted ones.<br>public com.bea.compiler.info.IMethod getMethod(<br>String name,<br>IType argTypes)<br>Returns the method with the given name and argument |

-continued

| | |
|---|---|
| | types or null if none exists.<br>public com.bea.compiler.info.IMethod getMethod(<br>String name)<br>Returns a method with the given name or null if none exist.<br>public java.util.Iterator getTypes( )<br>Returns the type members of this type, including inheritted ones.<br>public com.bea.compiler.info.IReferenceType getType(<br>String name)<br>Returns the member type with the given name or null if none exists.<br>public java.util.Iterator getConstructors( )<br>Returns the constructors of this type.<br>public java.util.Iterator getConstructors(<br>int argCount)<br>Returns the constructors of this type with the given number of arguments.<br>public com.bea.compiler.info.IConstructor getConstructor(<br>IType argTypes)<br>Returns the constructor with the given signature or null if none exists.<br>public boolean isAbstract( )<br>Determines whether this method is not implemented.<br>public boolean isStatic( )<br>Determines whether this type has an outer type at run-time.<br>public boolean isFinal( )<br>Determines whether this type can be subclassed.<br>public boolean isStrictFP( )<br>Determines whether this classes uses strict floating point operations.<br>public boolean isSynthetic( )<br>Determines whether this class is not visible to other classes at compile-time. Such classes do not show up in the package tree but can appear in the type list of a file. |

public interface contbea.compiler.info.IPackageMember implements java.lang.Comparable Represents a member of a package, which can be either a package or a top-level type.

| | |
|---|---|
| Methods | public com.bea.compiler.info.IName getName( )<br>Returns the name of this member.<br>public boolean isPackage( )<br>Determines whether this is a package.<br>public boolean isUserType( )<br>Determines whether this is a user-defined type. |

public interface com.bea.compiler.info.IPackage implements com.bea.compiler.info.IPackageMember Represents a package that exists in the source code.

| | |
|---|---|
| Methods | public com.bea.compiler.info.IPackage getParentPackage( )<br>Returns the containing package or null if none exists.<br>public java.util.Iterator getMembers( )<br>Returns the members of this package.<br>public java.util.Iterator getCurrentMembers( )<br>Returns the members of this package that have been found so far.<br>public com.bea.compiler.info.IPackageMember getMember(<br>String name)<br>Returns the member with the given name. |

public interface com.bea.compiler.info.IName implements java.lang.Comparable

Refers to a declared entity in the source code. A name is composed of sequence of identifiers. The last identifier, which is most specific to this named entity, is referred to simply as its ID.

| | |
|---|---|
| Methods | public java.lang.String getID( )<br>Returns the most-specific identifier in this name.<br>public com.bea.compiler.info.IName getQualifier( )<br>Returns the qualifier on this name or null if none exists.<br>public java.lang.String[ ] getParts( )<br>Returns all of the identifiers in this name.<br>public java.lang.String toString( )<br>Returns all of the identifiers with periods concatenating them.<br>public boolean equals(<br>Object o)<br>Determines whether this name is the same as the one given.<br>public int hashCode( )<br>Returns a hash code compatible with the equals method. |

public interface com.bea.compiler.info.IMethod implements com.bea.compiler.info.IReferenceTypeMember, com.bea.compiler.info.ICallable Represents a method of a user-defined type.

| | |
|---|---|
| Methods | public com.bea.compiler.info.IType getReturnType( )<br>Returns the return type of this method.<br>public java.util.Iterator getExceptionTypes( )<br>Returns an iterator over the exception types.<br>public boolean isAbstract( )<br>Determines whether this method is not implemented.<br>public boolean isStatic( )<br>Determines whether this is a class method.<br>public boolean isFinal( )<br>Determines whether this method can be overriden.<br>public boolean isSynchronized( )<br>Determines whether this method is automatically synchronized.<br>public boolean isNative( )<br>Determines whether this method is implemented in native code.<br>public boolean isStrictFP( )<br>Determines whether this method uses strict floating point operations. |

public interface com.bea.compiler.info.IField implements com.bea.compiler.info.IReferenceTypeMember, com.bea.compiler.info.IVariable, java.lang.Comparable Represents a field of a user-defined type.

| | |
|---|---|
| Methods | public com.bea.compiler.info.IType getType( )<br>Returns the type of this field.<br>public boolean isStatic( )<br>Determines whether this is a class field.<br>public boolean isFinal( )<br>Determines whether this field can be modified.<br>public boolean isTransient( )<br>Determines whether this field is serialized.<br>public boolean isVolatile( )<br>Determines whether this field can change value unexpectedly. |

public interface com.bea.compiler.info.IDeclaredEntity

Represents any entity declared in the source file. This can be a user-defined type, a field, a method, or a constructor. Note that only the first three of those are members of the outer type.

| | |
|---|---|
| Methods | public com.bea.compiler.info.IReferenceType getOuterType( )<br>Returns the type of which this entity is a member.<br>public com.bea.compiler.info.IAccess getAccess( )<br>Returns the accessability of this entity.<br>public boolean isAccessibleFrom(<br>IPackageMember location)<br>Determines whether this entity is accessible from the given location. |

-continued

```
public boolean isAccessibleFrom(
   IPackageMember location,
   IAccess access)
Determines whether this entity would be accessible from the
given location if it's access were as given.
public boolean isUserType( )
Determines whether this entity is a type.
public boolean isField( )
Determines whether this entity is a field.
public boolean isMethod( )
Determines whether this entity is a method.
public boolean isConstructor( )
Determines whether this entity is a constructor.
public com.bea.compiler.info.IAnnotationSet getAnnotations( )
Returns the annotations on this entity.
```

public interface com.bea.compiler.info.IConstructor implements com.bea.compilerinfo.ICallable Represents a constructor of a user-defined class.

public interface com.bea.compiler.info.ICallable implements com.bea.compiler.info.IDeclaredEntity, java.lang.Comparable Represents a callable object in a class, namely a constructor of method.

```
Methods   public com.bea.compiler.info.IType getArgumentTypes( )
          Returns the types of the arguments of this method.
          public java.util.Iterator getExceptionTypes( )
          Returns the types that can be thrown by this method.
          public java.util.Iterator getArguments( )
          Returns the arguments of this method.
          public int getArgumentCount( )
          Returns the number of arguments this method has.
```

public interface com.bea.compiler.info.IArrayType implements com.bea.compiler.info.IReferenceType Represents an array reference type.

```
Methods   public com.bea.compiler.info.IType getElementType( )
          Returns the element type of the array.
```

public interface com.bea.compiler.info.IArgument implements java.lang.Comparable Represents an argument to a callable in the source.

```
Methods   public java.lang.String getName( )
          Returns the name of this argument.
          public com.bea.compiler.info.IType getType( )
          Returns the type of this argument.
```

public interface com.bea.compiler.info.IAnnotationSet Represents the set of annotations and javadoc information on a declared entity, including "synthetic" annotations that were added but not present in the source text proper.

```
Methods   public java.lang.String getShortDescription( )
          Returns a short (one sentence) description of this entity.
          public java.lang.String getDescription( )
          Returns a full description of this entity.
          public java.util.Iterator iterator( )
          Returns all of the annotations on this entity.
          public com.bea.compiler.info.IAnnotation get(
```

-continued

```
             String[ ] path)
          Returns the annotation with the given path or null if none exists.
          If more than one exists, an assertion will fire. (The grammar
          for the annotations will ensure that only one is produced.)
          public java.util.Iterator getAll(
             String[ ] path)
          Returns all of the annotations with the given path.
```

public interface com.bea.compiler.info.IAnnotation

Contains additional information provided in the language about a particular reference type or member.

Annotations have values that are arbitrary objects. A grammar for a set of annotations will define more precisely what these values will be so that consumers of those annotations can deal with them appropriately.

```
Methods   public com.bea.compiler.info.IAccess getAccess( )
          Returns the accessability range of this annotation.
          public java.lang.String getID( )
          Returns the ID of the annotation.
          public java.lang.String[ ] getPath( )
          Returns the path of names to this annotation from the root.
          public java.lang.Object getValue( )
          Returns the value of the annotation.
Fields    public static final ROOT_NAME
          Defines the name of the root node in the annotation tree. This
          contains the 'and' characters which are illegal in normal
          tag names.
```

public interface com.bea.compiler.info.IAccess

Represents a type of accessibility available in the Java runtime on a class, interface, or member.

```
Methods   public boolean isPublic( )
          Determines whether this denotes public access.
          public boolean isProtected( )
          Determines whether this denotes protected access.
          public boolean isPackage( )
          Determines whether this denotes package (default) access.
          public boolean isPrivate( )
          Determines whether this denotes private access.
          public boolean isAccessibleFrom(
             IPackageMember entityLoc,
             IPackageMember queryLoc)
          Determines whether a member with this access in the given
          package or class is accessible from the given location.
          public boolean isMoreRestrictive(
             IAccess access]
          Determines whether this access is more restrictive than
          the given one.
          public boolean isLessRestrictive(
             IAccess access]
          Determines whether this access is less restrictive than the
          given one.
          public java.lang.String toString( )
          Returns the name of this access.
          public int getID( )
          Returns the ID of this type of access. This is handy for switches.
Fields    public static final ID_PUBLIC
          public static final ID_PROTECTED
          public static final ID_PACKAGE
          public static final ID_PRIVATE
```

public class com.bea.compiler.info.Access

Contains references to the four types of access defined. These statics are filled in at run-time the framework.

| | |
|---|---|
| Constructors | public Access( ) |
| Fields | public static PUBLIC |
| | public static PROTECTED |
| | public static PACKAGE |
| | public static PRIVATE |

Package com.bea.compiler.info.beaninfo

This package defines how the client accesses additional information available for JavaBeans. Its classes and interfaces are described below.

public interface com.bea.compiler.info.beaninfo.IPropertyDescriptor

Represents a JavaBean-style property.

| | |
|---|---|
| Methods | public java.lang.String getName( )<br>Returns the name of this property<br>public com.bea.compiler.info.IType getPropertyType( )<br>Returns the type of this property<br>public com.bea.compiler.info.IMethod getReadMethod( )<br>Returns the read method for this property,<br>null if the property is write-only<br>public com.bea.compiler.info.IMethod getWriteMethod( )<br>Returns the write method for this property, null is the property is read-only |

public class com.bea.compiler.info.beaninfo.Introspector

| | |
|---|---|
| Constructors | public Introspector( ) |
| Methods | public static void set(<br>IIntrospector i)<br>Sets the driver for the IBeanInfo class;<br>this is to be called only by the framework<br>public static com.bea.compiler.info.beaninfo.IBeanInfo getBeanInfo(<br>IReferenceType type)<br>Returns the IBeanInfo for this type |

public interface com.bea.compiler.info.beaninfo.IIntrospector

| | |
|---|---|
| Methods | public com.bea.compiler.info.beaninfo.IBeanInfo getBeanInfo(<br>IReferenceType type)<br>Returns the BeanInfo associated to the given type. This can be then interrogated for properties etc. |

public interface com.bea.compiler.info.beaninfo.IIndexedPropertyDescriptor implements com.bea.compiler.info.beaninfo.IPropertyDescriptor Represents a JavaBean-style indexed property.

| | |
|---|---|
| Methods | public com.bea.compiler.infoIType getIndexedPropertyType( )<br>Returns the type of the indexed property<br>public com.bea.compiler.info.IMethod getIndexedReadMethod( )<br>Returns the read method of the indexed property<br>public com.bea.compiler.info.IMethod getIndexedWriteMethod( )<br>Returns the write method of the indexed property |

public interface com.bea.compiler.info.bean.info.IEventDescriptor

Represents a JavaBean-style event descriptor

| | |
|---|---|
| Methods | public com.bea.compiler.infoIReferenceType getListenerType( )<br>Returns the target interface that will get invoked when the event is fired<br>public com.bea.compiler.infoIMethod getAddListenerMethod( )<br>Returns the method used to register a listener at the event source<br>public com.bea.compiler.info.IMethod getRemoveListenerMethod( )<br>Returns the method used to unregister a listener from the event source<br>public boolean isUnicast( )<br>Returns true if the event source is unicast, false if it's multicast |

public interface com.bea.compiler.info.beaninfo.IBeanInfo

Represents the JavaBean information associated with a specific reference type

| | |
|---|---|
| Methods | public com.bea.compiler.info.beaninfo.IPropertyDescriptor[ ] getPropertyDescriptors( )<br>Returns descriptors for the JavaBean properties exposed by this BeanInfo<br>public com.bea.compiler.info.beaninfo.IEventDescriptor[ ] getEventDescriptors( )<br>Returns descriptor for the JavaBean-style events fired by this bean |

Package com.bea.compiler.java

This package defines the information produced by the Java programming language support in the compiler. Its classes and interfaces are described below.

public class com.bea.compiler.java.JavaStructure extends com.bea.compiler.feature.IStructureFeature.StructureCode

| | |
|---|---|
| Methods | public static com.bea.compiler.feature.IStructureFeature.StructureCode getCode(int code) |
| Fields | public static final UNIT_CODE<br>public static final PACKAGE_CODE<br>public static final IMPORT_CODE<br>public static final CLASS_CODE<br>public static final FIELD_CODE<br>public static final METHOD_CODE<br>public static final CONSTRUCTOR_CODE<br>public static final PARAM_CODE<br>public static final NAME_CODE<br>public static final TYPE_CODE<br>public static final ACCESS_CODE<br>public static final STATIC_CODE<br>public static final ABSTRACT_CODE<br>public static final FINAL_CODE<br>public static final NATIVE_CODE<br>public static final SYNCHRONIZED_CODE<br>public static final TRANSIENT_CODE<br>public static final VOLATILE_CODE<br>public static final STRICTFP_CODE<br>public static final ONDEMAND_CODE<br>public static final ISINTERFACE_CODE<br>public static final SUPERTYPE_CODE<br>public static final INTERTYPES_CODE<br>public static final THROWS_CODE<br>public static final BODY_CODE<br>public static final UNIT<br>Represents a compilation unit.<br>Children: PACKAGE, IMPORT, CLASS<br>Properties: NONE<br>public static final PACKAGE<br>Represents a package node.<br>Children: NONE<br>Properties: NAME<br>public static final IMPORT<br>Represents an import node.<br>Children: NONE |

-continued

Properties: NAME, ONDEMAND
public static final CLASS
Represents a class node (top-level or inner).
Children: FIELD, METHOD, CLASS
Properties: NAME, all modifiers, ACCESS
public static final FIELD
Represents a field node.
Children: NONE
Properties: NAME, TYPE, all modifiers, ACCESS
public static final METHOD
Represents a method node.
Children: PARAM
Properties: NAME, TYPE, all modifiers, ACCESS
public static final CONSTRUCTOR
Represents a constructor node.
Children: PARAM
Properties: THROWS, ACCESS
public static final PARAM
Represents a formal parameter node.
Children: NONE
Properties: NAME, TYPE, all modifiers
public static final NAME
The name property (String).
public static final TYPE
The type property (String).
public static final ACCESS
The acessibility property (String).
public static final STATIC
The static modifier property (Boolean).
public static final ABSTRACT
The abstract modifier property (Boolean).
public static final FINAL
The final modifier property (Boolean).
public static final NATIVE
The native modifier property (Boolean).
public static final SYNCHRONIZED
The synchronized modifier property (Boolean).
public static final TRANSIENT
The transient modifier property (Boolean).
public static final VOLATILE
The volatile modifier property (Boolean).
public static final STRICTFP
The stricffp modifier property (Boolean).
public static final ONDEMAND
The import-on-demand property (Boolean).
public static final ISINTERFACE
The isInterface property for a class (Boolean).
public static final SUPERTYPE
The super class property for a class. (String).
public static final INTERTYPES
The super interfaces property for a class. (String[ ])
public static final THROWS
The exceptions property for a method. (String[ ])
public static final BODY
The body property for a method. (String)

Package com.bea.compiler.java.annotation

This package defines the information produced by the Java programming language support in the compiler about the annotations found in Java source code. Its classes and interfaces are described below.

public class com.bea.compiler.java.annotation.AnnotationStructure extends com.bea.compiler.feature.IStructureFeature.StructureCode

| | |
|---|---|
| Methods | public static com.bea.compiler.feature.IStructureFeature.StructureCode getCode(int code) |
| Fields | public static final COMMENT_CODE<br>public static final TAG_CODE<br>public static final ATTRIBUTE_CODE<br>public static final NAME_CODE<br>public static final VALUE_CODE<br>public static final COMMENT<br>public static final TAG |

-continued public static final ATTRIBUTE
public static final NAME
public static final VALUE Package com.bea.compiler.typeinfo This package defines how the client accesses information about types. Its classes and interfaces are described below.

public interface com.bea.compiler.typeinfo.ITypeNamespace implements com.bea.compiler.INamespace Represents the namespace of types that were defined in the project.

| | |
|---|---|
| Methods | public com.bea.compiler.info.IPackage getPackageRoot( )<br>Returns the root package object.<br>public com.bea.compiler.infoIName getName(<br>String name)<br>Returns a name object for the given qualified name.<br>public com.bea.compiler.info.IPackageMember getEntity(<br>IName name)<br>Returns the package or type with the given name.<br>public com.bea.compiler.info.IPackage getPackage(<br>IName name)<br>Returns the package with the given name. This will return null if the name is that of a type.<br>public com.bea.compiler.info.IReferenceType getUserType(<br>IName name)<br>Returns the class or interface with the given name. This will return null if the name is that of a package.<br>public java.util.Iterator getTypes(<br>IFile file)<br>Returns the types of the given file. |
| Fields | public static final NAME<br>Records the name of this namespace. |

public static interface com.bea.compiler.typeinfo.ITypeNamespace.IInfoChange implements com.bea.compiler.INamespace.IInfoChange Describes a change that occurred in the type namespace. This includes both the outer type and the entity because a new member can show up in types that inherit it as well as its outer type.

| | |
|---|---|
| Methods | public com.bea.compiler.info.IReferenceType getOuterType( )<br>Returns the outer type containing the entity (possibly null).<br>public com.bea.compiler.info.IDeclaredEntity getEntity( )<br>Returns the entity that changed. |

Compiler Framework Language API

This API defines how to extend the compiler with new languages.

| Packages | |
|---|---|
| com.bea.language | Defines how support for compiling a particular language is provided to the compiler framework. |
| com.bea.language.codegen | Contains the interfaces for the intermediate representation. |
| com.bea.language.enterprise | Provides information about the enterprise context of the project |
| com.bea.language.feature | Defines how a language extension accesses information about certain features of the source code |

-continued

| Packages | |
|---|---|
| com.bea.language.fileinfo | Interfaces implemented by compilers that wish to access or manipulate file information |
| com.bea.language.info | Defines mutable versions of the compiler info interfaces of com.bea.compiler.info. |
| com.bea.language.java | Defines how the Java language implementation can be extended to create support for other languages based on Java and its annotations. |
| com.bea.language.schema | Provides interfaces for building parsers and validity checkers for tree shaped data. |
| com.bea.language.transform | Provides interfaces for building transforming compilers that transform a source language to a target language |
| com.bea.language.typeinfo | Provides interface for languages that need to access or manipulate type information. |
| com.bea.language.xscript | Provides interfaces for accessing and manipulating XScript code (JavaScript with native XML support) |

This API defines how to extend the compiler with new languages. The package com.bea.language contains the main interfaces. Some subpackages of this provide additional interfaces that are specific to a particular language. For example, the APIs in com.bea.compiler.java define how to extend Java with further language information.

Package com.bea.language

This exemplary package defines how the compiler framework interacts with specific language modules. It defines how support for compiling a particular language is provided to the compiler framework. Its classes and interfaces are described below.

public interface com.bea.language.IParseNode

Implemented by all parse tree nodes in the compiler framework.

| | |
|---|---|
| Methods | public IToken getFirstToken( )<br>Returns the first token for this node.<br>public IToken getLastToken( )<br>Returns the last token for this node. |

public interface com.bea.language.ILineColumn

Records the line and column of a particular offset in the source.

| | |
|---|---|
| Methods | public int getLine( )<br>Returns the one-indexed line number of the offset.<br>public int getColumn( )<br>Returns the one-indexed column number of the offset. |

public interface com.bea.language.ILangToken

Extends IToken with the ability to retrieve the text value of the token. This is in the language API because this method is only available during compilation.

The purpose of having this type is to allow for tokens that retrieve their text values in different ways. Thus, this method should be always be used to retrieve the text of a token, rather than asking the ILangContext for the text at this range.

| | |
|---|---|
| Methods | public java.lang.String getText( )<br>Returns the text of this token. |

public interface com.bea.language.ILangResolver

Encapsulates the ability to translate from the parse tree into a set of Java class files.

| | |
|---|---|
| Methods | public com.bea.language.ILangResolverIFileResolver getFileResolver( )<br>Returns a resolver for the entire file.<br>public com.bea.languageILangResolver.IUpdateResolver getUpdateResolver( )<br>Returns an update resolver for this file. |

public static interface com.bea.language.ILangResolver.IFileResolver

Performs resolving of the file as a whole.

| | |
|---|---|
| Methods | public com.bea.language.ILangResolver.ITypeResolver getTypeResolver(<br>IReferenceType topType)<br>Returns a resolver for a top-level type. |

public static interface com.bea.language.ILangResolver.ITypeResolver

Performs resolving of a type in the file.

| | |
|---|---|
| Methods | public com.bea.language.ILangResolver.ITypeResolver getTypeResolver(IReferenceType innerType)<br>Returns a resolver for a nested type.<br>public com.bea.language.info.ILangUserType getType( )<br>Returns the type being resolved.<br>public void resolveBegin( )<br>Called before resolving commences on this type.<br>public void resolveModifiers( )<br>Fills in modifiers of the type.<br>public<br>com.bea.language.ILangResolver.ITypeResolver.SuperTypes<br>resolveSuperTypes( )<br>Returns the names of the super types of the given type.<br>public com.bea.language.info.ILangAnnotationSet<br>resolveAnnotations( )<br>Resolves the annotations on this type. This is done after resolving super types so that they may be used in resolving annotations.<br>public java.util.Map resolveMemberTypes( )<br>Returns the types declared in the given type indexed by name.<br>public java.util.Map resolveMemberFields( )<br>Returns the fields declared in the given type indexed by name.<br>public java.util.Map resolveMemberMethods( )<br>Returns the methods declared in the given type indexed by signature.<br>public java.util.Map resolveConstructors( )<br>Returns the constructors declared in the given type indexed by argument types.<br>public com.bea.language.info.IConstant resolveConstant(<br>ILangField field)<br>Returns the constant value for the given field or null if it does not have a constant value.<br>public void resolveEnd( )<br>Called when resolving finishes on this type. |

public static class com.bea.language.ILangResolver.ITypeResolver.SuperTypes

Records the superclass and interfaces of some type.

| | |
|---|---|
| Constructors | public ILangResolver.ITypeResolver.SuperTypes(<br>IReferenceType superclass,<br>List interfaces) |
| Fields | public superclass<br>public interfaces |

public static interface com.bea.language.ILangResolver.IUpdateResolver

Used to update links between entities and their source in the parse tree when copying resolve shapes.

| | |
|---|---|
| Methods | public void updateType(<br>ILangUserType type)<br>Updates any links to this type from it's source.<br>public void updateField(<br>ILangField field)<br>Updates any links to this field from it's source.<br>public void updateMethod(<br>ILangMethod method)<br>Updates any links to this method from it's source.<br>public void updateConstructor(<br>ILangConstructor constructor)<br>Updates any links to this constructor from it's source. |

public static interface com.bea.language.ILangResolver.IOuterContext

Contains information passed by the outer language during parsing.

| | |
|---|---|
| Methods | public com.bea.language.Info.IScope getScope( )<br>Returns the scope enclosing the nested language. |

public static class com.bea.language.ILangResolver. DefaultOuterContext implements com.bea.language.ILangResolver.IOuterContext Provides a default implementation of IOuterContext

| | |
|---|---|
| Constructors | public ILangResolver.DefaultOuterContext(<br>(Scope scope) |
| Methods | public com.bea.language.Info.IScope getScope( ) |

public static class com.bea.language.ILangResolver. OuterContext

Provides a static reference to the current outer resolved.

| | |
|---|---|
| Constructors | public ILangResolver.OuterContext( ) |
| Methods | public static<br>com.bea.language.ILangResolver.IOuterContext get( )<br>Returns the outer context for the language being resolved.<br>public static void set(<br>ILangResolver.IOuterContext c)<br>Stores the outer context for the language being resolved. |

public abstract class com.bea.language.ILangReader extends java.io.Reader

Extends the Reader class to allow a transducer to be used as input to a scanner. The transducer may hide multiple characters in the real stream with a single character (or vice versa), so this interface provides a way for the transducer to communicate the actual size in the underlying stream of the characters returned.

-continued

| | |
|---|---|
| Constructors | public ILangReader( ) |
| Methods | public int read(<br>char[ ] cbuf,<br>int offset,<br>int len)<br>With the added information of this class, this method is no longer adequate if more than one character is requested because there is no way to return intermediate size changes. This implementation is provided to allow single-character reads via this interface. However, new code should be written to call the new read method below.<br>public int getSize( )<br>Returns the real size in the underlying stream of character just returned via one of the normal read methods of Reader .<br>public abstract int read(<br>char[ ] cbuf,<br>int[ ] sbuf,<br>int offset,<br>int len)<br>Extends the main read method of Reader with information about the size of the characters returned in the underlying stream. |

public interface com.bea.language.ILangParser

Encapsulates the parsing algorithm for a language.

| | |
|---|---|
| Methods | public void parse( )<br>Performs a parse of the file. |

public static interface com.bea.language.ILangParser.IOuterContext

Contains information passed by the outer language during parsing.

public static class com.bea.language.ILangParser.OuterContext

Provides a static reference to the current outer context.

| | |
|---|---|
| Constructors | public ILangParser.OuterContext( ) |
| Methods | public static<br>com.bea.language.ILangParser.IOuterContext get( )<br>Returns the outer context for the language being parsed.<br>public static void set(<br>ILangParser.IOuterContext c)<br>Stores the outer context for the language being parsed. |

public interface com.bea.language.ILangNode

Represents a node in the tree of nested languages. Each language owns some range of the file.

| | |
|---|---|
| Methods | public java.util.Iterator getTokens( )<br>Returns the tokens for this language in forward order.<br>public java.lang.Object getParseTree( )<br>Returns the parse tree for this language.<br>public void parse(<br>ILangParser.IOuterContext context)<br>Performs parsing in the nested languagge.<br>public void check(<br>ILangChecker.IOuterContext context)<br>Performs checking in the nested language. |

public interface com.bea.language.ILangNamespace

Defines the required implementation for a namespace of some sort that will be managed as part of a project. Namespaces are fundamental to compilation: the information they record is used by languages in order to ensure correct cooperation between files and is used by the client in order to understand what sort of objects are defined in a source file. As a result, namespaces must interact with the compiler in more detailed ways than even languages.

Each registered namespace will be instantiated using the default constructor in order to create an instance for a new project.

A bit of background about compilation is relevant here. When compilation begins, a list of changed files is known. During compilation, a namespace may discover that a dependency of another file has been broken. This will add an out-of-date file into the compilation. Also during compilation, a namespace may decide to add a file into the project. This normally occurs because a reference was made to a name that does not exist in the project but for which a file is found that probably contains the object with that name. This will add a "discovered" file into the compilation. Thus, at the end of compilation, there may be more files compiled than at the beginning.

Namespaces are responsible for updating themselves to the results of compilation of individual files and for notifying the compiler of out-of-date and discovered files.

File Status

Each time a compilation is performed, there is a target file status that is needed for each file. A "one-hot" encoding is used to indicate the status of a file. However, the status variable passed this instance will actually encode a range of statuses, meaning that compilation will stop when the file reaches any one of them.

| | |
|---|---|
| Methods | public void setContext(<br>ILangNamespace.IContext context)<br>Gives the namespace the context through which it can access namespace-related APIs from the project.<br>public java.lang.Object getInitialRecord(<br>IFile file)<br>Returns an initial record for the given file about to be added. Note that the namespace must not update itself to this file until it is actually compiled.<br>public void startCompile(<br>Collection files,<br>int status)<br>Allows the namespace to prepare for compilation of the given files. Additional files may be added or discovered to be out of date during the compile.<br>public void endCompile(<br>Collection files,<br>int status)<br>Allows the namespace to clean up from compilation of the given files. This list will match the list passed to beginCompile . The complete list of compiled files can be retrieved from the context.<br>public void startCompile(<br>IFile file)<br>Allows the namespace to prepare for compilation of the given file, which is just about begin compilation. This may be a changed, discovered, or out-of-date file.<br>public void endCompile(<br>IFile file)<br>Allows the namespace to clean up from compilation of the given file.<br>public void cleanRecord(<br>IFile file,<br>Object record)<br>Allows the namespace to clean out compile-time-only information from a record on the given file.<br>Parameters<br>file - The file whose record is being cleaned.<br>record - The record on the file that is being cleaned.<br>public void updateFromParse(<br>IFile file)<br>Called just after a file is parsed. The namespace will typically update to the list of objects found to be defined in the file.<br>public void resolve(<br>IFile file)<br>Perform all necessary resolution for this namespace and this file. Note that this will be called for removed files as well because |

-continued

| | |
|---|---|
| | the namespace needs to look for broken dependencies in that case also. |
| Fields | public static final STATUS_INITIAL<br>Indicates that nothing is known about the contents of the file.<br>public static final STATUS_PARSED<br>Indicates that the names of the objects defined in the file are known.<br>public static final STATUS_RESOLVED<br>Indicates that all information about the file's namespace objects are known.<br>public static final STATUS_CHECKED<br>Indicates that all errors have been found in the file.<br>public static final STATUS_GENERATED<br>Indicates that a .class file has been produced for the file. |

public static interface com.bea.language.ILangNamespace.IInfoChange

Represents a change that was found in the namespace during the current compile. Changes are recorded in order to determine whether dependencies have been broken as well as to inform the client. Not all recorded changes need to be reported to the client.

| | |
|---|---|
| Methods | public IFile getFile( )<br>Returns the file in which this change occurred.<br>public boolean isReported( )<br>Determines whether this change should be reported to the client. |

public static interface com.bea.language.ILangNamespace.IContext

Defines the additional APIs available to namespaces.

Because namespaces can be used both during compilation and outside of it (i.e., from a feature), some of these methods must be available at both times. Methods not saying otherwise are available at all times.

| | |
|---|---|
| Methods | public IProject getProject( )<br>Returns the project that owns this namespace.<br>public long getLastCompiled( )<br>Returns the internal "timestamp" of the most recently started compile of this project.<br>public long getLastCompiled(<br>IFile file)<br>Returns the timestamp for the given file.<br>public void addChange(<br>ILangNamespace.IInfoChange change)<br>Adds the given change in this namespace into the change list. This must only be called during a compilation.<br>public void parse(<br>IFile file)<br>Ensures that the given file has been parsed.<br>public void resolve(<br>IFile file,<br>ILangNamespace.IInfoResolver resolver)<br>Ensures that the given resolution has been performed. This may be called during compilation or not.<br>public (File addDiscoveredFile(<br>IFileStore.IEntry entry)<br>Adds the given file into the project. If this is called during compilation, this file will automatically be added to the list of files to be updated. The return value will be null if this file is already in the project.<br>public void addOutOfDateFile(<br>IFile file)<br>Records that the given file has been discovered to be out-of-date and schedules it to be updated in the current compile. This must only be called during a compilation.<br>public java.util.Collection getCompiledFiles( )<br>Returns all files updated during this compilation. This includes |

-continued changed, discovered, and out-of-date files.
public java.lang.Object getRecord(
IFile file)
Returns the namespace-specific information recorded for this file in the most recent compile.
public java.lang.Object getPreviousRecord(
IFile file)
Returns the namespace-specific information recorded for this file in the previous compile.
public void setRecord(
IFile file,
Object val)
Sets the namespace-specific information for this file.
public java.util.Iterator getDependencies(
IFile file)
Returns all dependencies of this namespace on the given file.
public void addDependency(
IFile source,
IDependency dep)
Adds the given dependency whose source is the given file.
public void addDiagnostic(
IFile file,
String code,
IToken first,
IToken last,
Object[ ] args)
Adds a diagnostic to the given file.
public boolean isBroken(
IDependency dep)
Determines whether the given dependency has been broken by changes found so far.
public boolean isBrokenBy(
IDependency dep,
IFile file)
Determines whether the given dependency has been broken by changes found in the given file.
public IFileStore.IEntry findEntry(
String path)
Searches for an entry on the source or binary path with the given name, ignoring extension. If multiple such files exist, the rules for choosing one are the following:
Source files trump binary files.
Files trump directories.
Extensions are tried in priority order.
public java.util.Collection findEntries(
String dir)
Returns all entries under the given directory.
public IFileStore.IEntry getSourceEntry(
String name,
boolean isDir)
Returns the entry for the source file with the given name.
public IFileStore.IEntry getBinaryEntry(
String name,
boolean isDir)
Returns the entry for the binary file with the given name.
public java.lang.String getRelativePath(
IFile file)
Returns the relative path to the given file or null if this file is not in any of the roots of the project.
public com.bea.language.ILangLanguage getRootLanguage(
IFile file)
Returns the root language for the given file.
public com.bea.language.ILangCompiler getRootCompiler(
IFile file)
Returns the root compiler for the given file.
public com.bea.language.ILangNode getRootNode(
IFile file)
Returns the root node of the given file.
public java.lang.Object enterRootContext(
IFile file)
Set the context to the root language of the given file.
public void leaveRootContext(
Object oldContext)
Restores the context to its value at entry.
public int getCompilationPhase( )
Returns the current phase of compilation, i.e., the status that this file will reach next.

-continued public com.bea.language.ILangNamespace.IInfoResolver
getCurrentResolver( )
Returns the resolver that is currently running on this thread.

public static interface com.bea.language.ILangNamespace.IInfoResolver

Used to perform some type of resolution on some object in the namespace. Every resolve can be described by a pair (object, phase) where object can be any object in the namespace and phase is an integer describing the type of information needed. It is assumed that two resolve requests are equal iff the objects and phases are equal.

| | |
|---|---|
| Methods | public java.lang.Object getTarget( )<br>Returns the object to be resolved.<br>public int getPhase( )<br>Returns the type of resolution to occur.<br>public boolean isComplete( )<br>Determines whether this resolution is already complete. This must be implemented even if all callers verify that the resolution is not complete before requesting it, as race conditions would otherwise exist.<br>public void run( )<br>Performs the given resolution on this object. |

public abstract class com.bea.language.ILangMultiReader extends com.bea.language.ILangReader Extends ILangReader with the ability to insert the contents of another file into the stream at the current position.

| | |
|---|---|
| Constructors | public ILangMultiReader( ) |
| Methods | public abstract void pushFile(<br>IFileStore.IEntry file)<br>Inserts the contents of the given file at the current position.<br>public abstract java.util.Collection getFiles( )<br>Returns the paths of all the files whose contents are being read.<br>public abstract com.bea.language.ILangToken addNextToken(<br>int type,<br>int size)<br>Returns a token object with the given dimensions. This token will be in the token set of this node only if the current set of files being read contains only the original file. |

public interface com.bea.language.ILangLocator

Provides the ability to retrieve a text range for a declared entity produced from a declaration in the file. This range is used for various things such as locating errors produced by the framework. The ranges returned from the methods below should just be the range of the name of this identifier, rather than the range of the entire declaration in the source.

| | |
|---|---|
| Methods | public IToken getFirst(<br>ILangDeclaredEntity entity)<br>Returns the first token for the range of the given entity.<br>public IToken getLast(<br>ILangDeclaredEntity entity)<br>Returns the last token for the range of the given entity.<br>public IToken getFirst(<br>ILangAnnotation annotation)<br>Returns the first token for the range of the given annotation.<br>public IToken getLast( |

| | |
|---|---|
| | ILangAnnotation annotation)<br>Returns the last token for the range of the given annotation.<br>public IToken getFirst(<br>ILangVariable var)<br>Returns the first token for the range of the given variable.<br>public IToken getLast(<br>ILangVariable var)<br>Returns the last token for the range of the given variable. |

public interface com.bea.language.ILangLanguage

Extends the ILanguage interface with information needed by the framework.

| | |
|---|---|
| Methods | public boolean isNameRestricted( )<br>Determines whether this language requires that each file define only one top-level type and that its name must match the relative path to file within the project. If this is true, then the framework will enforce that each file define one public class that matches the relative path. If it is false, then discovery of these files on the source path will not be supported.<br>public com.bea.language.ILangCompiler getCompiler( )<br>Returns a compiler for this language. A single instance will be used for each file (or more accurately, language node) of this language.<br>public com.bea.language.feature.ILangFeature getFeature(<br>Class key)<br>Returns the feature identified by the given key. |

public interface com.bea.language.ILangGenerator

Encapsulates the algorithm for generating code in this language. This is accomplished by implenting a transformation from the parse tree of this file into the intermediate language for each class defined.

| | |
|---|---|
| Methods | public void generateCode( )<br>Performs code generation for this file by calling the back-end to emit the bytecodes for each class defined (in intermediate form). |

public static interface com.bea.language.ILangGenerator.IOuterContext

Contains information passed by the outer language during codegen.

public static class com.bea.language.ILangGenerator.OuterContext

Provides a static reference to the current outer context.

| | |
|---|---|
| Constructors | public ILangGenerator.OuterContext( ) |
| Methods | public static<br>com.bea.language.ILangGenerator.IOuterContext get( )<br>Returns the outer context for the language being codegenned.<br>public static void set(<br>ILangGenerator.IOuterContext c)<br>Stores the outer context for the language being codegenned. |

public interface com.bea.language.ILangContext

Provides the context in which the stages of compilation are performed. For convenience, all methods are defined here, although some are not applicable in all phases. This is done to allow phases to share code, which would then not know what phase it was running in. If a method is called in an inappropriate phase, an assertion will fire.

Each method below is marked with which phases can use it.

| | |
|---|---|
| Methods | public IFile getFile( )<br>Returns the file being compiled.<br>PHASE: any<br>public IProject getProject( )<br>Returns the project being compiled.<br>PHASE: any<br>public java.net.URI getPath( )<br>Returns the path to the file being compiled.<br>PHASE: any<br>public IFileStore.IEntry getEntry( )<br>Returns the entry of the file being compiled.<br>PHASE: any<br>public INamespace getNamespace(<br>String name)<br>Returns the namespace with the given unique name.<br>PHASE: any<br>public IPackage getPackageRoot( )<br>Returns the root package object.<br>PHASE: any<br>public IPackage getPackage(<br>IName name)<br>Returns the package with the given name.<br>PHASE: any<br>public IName getClassName( )<br>Returns the expected class name of the current file or null if this class does not have an expected name.<br>PHASE: any<br>public IFileInfo findFile(<br>String path)<br>Returns the node for the file with the given path. If the path begins with a '/', then this path is relative to the project. Otherwise, it is relative to the current file.<br>PHASE: any<br>public IFileInfo findFile(<br>IFileInfo baseFile,<br>String path)<br>Like findFile above, but if a relative path is used, the file will be interpretted relative to the given base file rather than the current file.<br>PHASE: any<br>public IFileInfo findFile(<br>IFileInfo baseFile,<br>String path,<br>IFileStore.IRoot root)<br>Like findFile above, but if a relative path is used, the file will be interpretted relative to the given base file rather than the current file.<br>PHASE: any<br>public void addDiagnostic(<br>String code,<br>IToken first,<br>IToken last,<br>Object[] args)<br>Adds a new error to this file.<br>PHASE: parse, resolve, check<br>Parameters<br>code - Provides unique key for this error type.<br>first - Provides the first token of the range of this diagnostic.<br>last - Provides the last token of this range of this diagnostic.<br>args - Provides additional information necessary in formatting user messages for this error. In general, this should include only that which is not clear from the text at which the error was found. This can also be null to indicate no arguments.<br>public java.lang.Object getProperty(<br>String name,<br>Object defValue)<br>Returns the value of the given property or the given default value if it has not been set. Properties set on the project will override the global values for the compiler.<br>PHASE: any<br>public com.bea.language.ILineColumn toLineColumn(<br>int offset)<br>Returns the line and column of the given offset.<br>PHASE: any<br>public java.io.InputStream getInputStream( )<br>Returns an input stream containing the bits of this file. |

-continued

PHASE: parse
public com.bea.language.ILangReader getReader( )
Returns a reader containing the characters of this file.
PHASE: parse
public com.bea.language.ILangMultiReader getMultiReader( )
Returns a reader containing the characters of this file but with the added ability to insert the contents of other files into the stream when necessary.
PHASE: parse
public com.bea.language.ILangNode createNestedLanguage(
  ILangLanguage lang,
  int start,
  int end)
Creates and returns a new node in the nested language tree.
PHASE: parse
public ILanguage getLanguage( )
Returns the language for the current language node.
PHASE: any
public void resetTokens( )
Remove the token set of the current file.
PHASE: parse
public com.bea.language.ILangToken addNextToken(
  int type,
  int size)
Records the next token found by the scanner. This token may or may not be from the token set of the current file.
PHASE: parse
public java.lang.String getText(
  int start,
  int end)
Returns the text of the given token in the source. This should almost never be called by a language implementation.
PHASE: any
public void setParseTree(
  Object obj)
Stores the root node of the parse tree for this file.
PHASE: parse
public void setTypes(
  List types)
Stores the top-level types declared in this file.
PHASE: parse
public com.bea.language.info.ILangInfoFactory getFactory( )
Returns the factory for info structures.
PHASE: parse, resolve, check
public IType getType(
  String signature)
Returns a type (created if necessary) for the given signature.
PHASE: parse, resolve, check
public java.lang.Object getParseTree( )
Returns the root node of the parse tree for this file.
PHASE: resolve, check, codegen
public java.util.Iterator getTypes( )
Returns the top-level types declared in this file.
PHASE: resolve, check, codegen
public IReferenceType getUserType(
  IName name)
Returns the class or interface with the given name.
PHASE: resolve, check, codegen
public boolean setExternalFile(
  ILangUserType type,
  String name)
For a type that is defined in another file (inner .class files only), this is used to correct the path to that file. This is only allowed for binary files. This returns true iff the file can actually be found.
PHASE: resolve (binary)
public void generateCodes(
  IRClassDeclaration decl)
Causes code to be generated for the given class (including nested classes).
PHASE: codegen
public void generateCodes(
  IParseNode imports,
  IRStatement statements)
Produces binary or source codes for a given set of functions and statements at level 0 used by XScript.
PHASE: codegen
public java.io.Writer getWriterForSourceCodes(
  IRClassDeclaration clazz)
Returns a writer to the file where generated source codes for a user type with the given definition will be placed. The framework will record that this file was generated during this compilation.
NOTE: this is for use by back-ends , not language implementations.
PHASE: codegen
public java.io.OutputStream getStreamForBinaryCodes(
  IRClassDeclaration clazz)
Returns an output stream to the file where generated binary codes for a user type with the given definition will be placed or null if this class should not be generated. The framework will record that this file was generated during this compilation.
NOTE: this is for use by back-ends , not language implementations.
PHASE: codegen public interface com.bea.language.ILangCompiler Encapsulates the ability to compile from a source language into Java class files.

| | |
|---|---|
| Methods | public com.bea.language.ILangLocator getLocator( )<br>Returns a locator that can provide text ranges for type information produced by compilers of this language.<br>public com.bea.language.ILangParser getParser( )<br>Returns a parser to use for the first phase of compilation.<br>public com.bea.language.ILangResolver getResolver( )<br>Returns a resolver to use for the second phase of compilation.<br>public com.bea.language.ILangChecker getChecker( )<br>Returns a checker for the third phase of compilation.<br>public com.bea.language.ILangGenerator getGenerator( )<br>Returns a code generator for the fourth phase of compilation. |

public interface com.bea.language.ILangChecker

Encapsulates a semantic checking algorithm to perform as part of compilation for a language.

| | |
|---|---|
| Methods | public void check( )<br>Performs semantic checking on this language. |

public static interface com.bea.language.ILangChecker.IOuterContext

Contains information passed by the outer language during parsing.

| | |
|---|---|
| Methods | public com.bea.language.info.IScope getScope( )<br>Returns the scope enclosing the nested language. |

public static class com.bea.language.ILangChecker.OuterContext

Provides a static reference to the current outer resolved.

| | |
|---|---|
| Constructors | public ILangChecker.OuterContext( ) |
| Methods | public static<br>com.bea.language.ILangChecker.IOuterContext get( )<br>Returns the outer context for the language being resolved.<br>public static void set(<br>  ILangChecker.IOuterContext c)<br>Stores the outer context for the language being resolved. |

public interface com.bea.language.ILangBackEnd

Defines the functionality required in order to provide a back-end to the compiler.

| | |
|---|---|
| Methods | public void generateCodes( IRClassDeclaration clazz) Produces binary or source codes for the given class (including nested classes). The implementation asks the framework (through the ILangContext ) for the paths where the generated file(s) are placed. These calls also notify the framework of which files were generated (and hence, modified) during this compile. public void generateCodes( IParseNode imports, IRStatement statements) Produces binary or source codes for a given set of functions and statements used by XScript. |

public interface com.bea.language.IDependency

Records information about a dependency of a file (or more specifically, an object in the namespace) on the state of some part of the namespace. Namespaces will often keep references to the namespace on the "target" of the dependency, which is the parent of all objects in which changes would break the dependency. This makes it easy to see if a change broke any dependencies. The framework facilitates this by allowing dependencies to set and remove these references at the appropriate time of compilation.

| | |
|---|---|
| Methods | public java.lang.String getNamespace( ) Returns the name of the namespace that created this dependency. public boolean equals( Object o) Determines whether this dependency is a duplicate of another. public int hashCode( ) Helps to determine whether this dependency is a duplicate. public void addToTarget( ) Add references to this dependency in the target if necessary. public void removeFromTarget( ) Remove any references to this dependency in the target. public IFile getTargetFile( ) Returns the file containing the target (if the target exists). public com.bea.language.IDependency.IBreakChecker getBreakChecker( ) Returns an object that can look for changes that break this. |

public static interface com.bea.language.IDependency.IBreakChecker

Allows checking for changes that break this dependency.

| | |
|---|---|
| Methods | public boolean isBrokenBy( ILangNamespace.IInfoChange change) Determines whether this dependency is broken by this change. |

public class com.bea.language.CyclicDependencyException extends java.lang.RuntimeException Thrown when a cyclic dependency is found in the resolve phase. This is an unchecked exception because it can be thrown almost anywhere.

Constructors public CyclicDependencyException( )

public class com.bea.language.Context

To simplify life for compiler writers, this class contains a static method that will return the current compilation context. This means that languages do not need to pass the context down through each component.

| | |
|---|---|
| Constructors | public Context( ) |
| Methods | public static com.bea.language.ILangContext get( ) Returns the context in which compilation is now being performed. public static void set( ILangContext c) Stores the context in which compilation is now being performed. |

Package com.bea.language.codegen

This package contains the interfaces for the intermediate representation. Its classes and interfaces are described below. public interface com.bea.language.codegen.IRXQRLStatement implements com.bea.language.codegen.IRStatement Represents a foriegn set of statement(s) in the source code.

| | |
|---|---|
| Methods | public com.bea.language.codegen.IRExpression getForeignBlock( ) Returns foreign code block. |

public interface com.bea.language.codegen.IRXMLListExpression implements com.bea.language.codegen.IRExpression

| | |
|---|---|
| Methods | public com.bea.language.codegen.IRExpression getExpression( ) Returns the expression. |

public interface com.bea.language.codegen.IRXMLExpression implements com.bea.language.codegen.IRExpression

| | |
|---|---|
| Methods | public com.bea.language.codegen.IRExpression getExpression( ) Returns the expression. |

public interface com.bea.language.codegen.IRXMLDotQuery implements com.bea.language.codegen.IRExpression

| | |
|---|---|
| Methods | public com.bea.language.codegen.IRExpression getFirst( ) public com.bea.language.codegen.IRExpression getQueryExpression( ) |

public interface com.bea.language.codegen.IRWithStatement implements com.bea.language.codegen.IRStatement

| | |
|---|---|
| Methods | public com.bea.language.codegen.IRExpression getSelector( ) Returns the list of selectors for the with. public com.bea.language.codegen.IRStatement getStatement( ) Returns the statement to be executed in the body of the scope of the with. |

public interface com.bea.language.codegen.IRWhileStatement implements com.bea.language.codegen.IRStatement

| | |
|---|---|
| Methods | public com.bea.language.codegen.IRExpression getCondition( )<br>Returns the loop condition expression.<br>public com.bea.language.codegen.IRStatement getStatement( )<br>Returns the statement to be executed in the body of the loop. |

public interface com.bea.language.codegen.IRVariableInitializer implements com.bea.language.codegen.IRNode Represents the initializer of a variable or an array element. Variable initializers can be either single expressions, if the variable being initialized is not an array or they can contain an array initializer, if the element being initialized is also an array. Variable initializers are not used directly to initialize arrays, top-level array initializers are always IRArrayInitializer s.

If is Array returns true, this variable initializer actually represents an array initializer, and you should call getArrayInitializer otherwise this initializer is just a single expression and you should call getInitializerExpression.

| | |
|---|---|
| Methods | public boolean isArray( )<br>Returns true if this initializer is for an array.<br>public com.bea.language.codegen.IRExpression getInitializerExpression( )<br>Returns the expression for this variable initializer.<br>This is only a valid method to call if this initializer is not an array initializer.<br>public com.bea.language.codegen.IRArrayInitializer getArrayInitializer( )<br>Returns the array initializer for this variable initializer.<br>This is only a valid method to call if this initializer is an array initializer.<br>public com.bea.language.codegen.IRVariableInitializer getNext( )<br>Returns the next array initializer in the list. Array initializers use linked lists of variable initializers to store the initialization expressions for each element in the array. |

public interface com.bea.language.codegen.IRUnaryExpression implements com.bea.language.codegen.IRExpression

| | |
|---|---|
| Methods | public int getOpcode( )<br>Returns the opcode for the operator. All the opcodes are defined in IROperator .<br>public com.bea.language.codegen.IRExpression getFirst( )<br>Returns the expression for the first operand. |

public interface com.bea.language.codegen.IRTypeExpression implements com.bea.language.codegen.IRExpression Represents and expression that just wraps a type.

| | |
|---|---|
| Methods | public com.bea.language.codegen.IRType getType( )<br>Returns the type for this expression. |

public interface com.bea.language.codegen.IRType implements com.bea.language.codegen.IRNode Defines the basic information about a Java type. More complicated types inherit from this class and add extra information. The type code is used to specify either one of the primitive types or a class or array type.

| | |
|---|---|
| Methods | public int getTypeCode( )<br>Returns the type code for this object. The possible codes are specified as constants on this interface. There are constants for each of the primitive types, as well as the class and array types.<br>public IType getInfo( )<br>Returns the resolved type for this type object. |
| Fields | public static final VOID<br>The void type.<br>public static final BYTE<br>The byte type.<br>public static final CHAR<br>The char type.<br>public static final SHORT<br>The short type.<br>public static final INT<br>The int type.<br>public static final LONG<br>The long type.<br>public static final FLOAT<br>The float type.<br>public static final DOUBLE<br>The double type.<br>public static final BOOLEAN<br>The boolean type.<br>public static final CLASS<br>Any class or interface type.<br>public static final ARRAY<br>The array type. |

public interface com.bea.language.codegen.IRTryStatement implements com.bea.language.codegen.IRStatement

| | |
|---|---|
| Methods | public com.bea.language.codegen.IRBlock getBody( )<br>The body of the try statement, which is the part that is “tried”.<br>public com.bea.language.codegen.IRCatches getCatchClause( )<br>The catch clause.<br>public com.bea.language.codegen.IRFinally getFinallyClause( )<br>The finally clause. |

public interface com.bea.language.codegen.IRThrowStatement implements com.bea.language.codegen.IRStatement

| | |
|---|---|
| Methods | public com.bea.language.codegen.IRExpression getExpression( )<br>Returns the expression that will be evaluated to produce the thrown class type. |

public interface com.bea.language.codegen.IRThisExpression implements com.bea.language.codegen.IRExpression Represents a reference to a this pointer. A this expression can be qualified by an arbitrary name.

| | |
|---|---|
| Methods | public com.bea.language.codegen.IRName getClassName( )<br>Returns the name of the class whose ‘this’ is being referenced. |

public interface com.bea.language.codegen.IRTernaryExpression implements com.bea.language.codegen.IRExpression

| | |
|---|---|
| Methods | public int getOpcode( )<br>Returns the opcode for the operator. The opcodes are defined in IROperator .<br>public com.bea.language.codegen.IRExpression getFirst( )<br>Returns the expression for the first operand.<br>public com.bea.language.codegen.IRExpression getSecond( )<br>Returns the expression for the second operand.<br>public com.bea.language.codegen.IRExpression getThird( )<br>Returns the expression for the third operand. |

public interface com.bea.language.codegen.IRSynchronizedStatement implements com.bea.language.codegen.IRStatement

| | |
|---|---|
| Methods | public com.bea.language.codegen.IRExpression getExpression( )<br>Returns the expression to synchronize on.<br>public com.bea.language.codegen.IRBlock getBody( )<br>Returns the body of the synchronized statement. This must be a block. |

public interface com.bea.language.codegen.IRSwitchStatement implements com.bea.language.codegen.IRStatement

| | |
|---|---|
| Methods | public com.bea.language.codegen.IRExpression getSwitchExpression( )<br>Returns the expression for this switch statement. This is the expression that is evaluated in order to determine which case to execute.<br>public com.bea.language.codegen.IRSwitchBlockStatementGroup getSwitchBlocks( )<br>Returns a linked list of IRSwitchBlockStatementGroup objects which represent the body of the switch statement. |

public interface com.bea.language.codegen.IRSwitchLabel implements com.bea.language.codegen.IRNode

| | |
|---|---|
| Methods | public com.bea.language.codegen.IRExpression getCaseExpression( )<br>Returns the expression for this case.<br>public com.bea.language.codegen.IRSwitchLabel getNext( )<br>Returns the next label in the list. Switch labels are chained together in a linked list when the appear contiguously in source code. |

public interface com.bea.language.codegen.IRSwitchBlockStatementGroup implements com.bea.language.codegen.IRNode Represents a block of labels and statments that make up the body of a switch statement. A single switch block statement group represents a contiguous set of labels followed by the statements to be executed if any of those labels are matched. For example, the following:

case a: case b: case c: System.out.println("foo"); break;

is one switch block statement group where a, b and c are the labels and the println and the break are the statements.

| | |
|---|---|
| Methods | public com.bea.language.codegen.IRSwitchLabel getLabels( )<br>Returns the list of labels.<br>public com.bea.language.codegen.IRStatement getStatements( )<br>Returns the list of statements. |

-continued

| | |
|---|---|
| | public com.bea.language.codegen.IRSwitchBlockStatementGroup getNext( )<br>Returns the next group in the list. Switch block statement groups are chained together in linked lists to form the body of a switch statement. |

public interface com.bea.language.codegen.IRStatementExpression implements com.bea.language.codegen.IRStatement Represents an expression which is being used in a statement. there are a limited number of expressions that can be legally used as statements including:

Assignments

Pre/Post increments/decrements

Method invocations

Class instance creations

| | |
|---|---|
| Methods | public com.bea.language.codegen.IRExpression getExpression( )<br>Returns the expression used as a statement. |

public interface com.bea.language.codegen.IRStatement implements com.bea.language.codegen.IRNode

| | |
|---|---|
| Methods | public com.bea.language.codegen.IRStatement getNext( )<br>Returns the next statement in the list. Statements are chained together in a linked list in blocks. |

public interface com.bea.language.codegen.IRReturnStatement implements com.bea.language.codegen.IRStatement

| | |
|---|---|
| Methods | public com.bea.language.codegen.IRExpression getExpression( )<br>Returns the expression that will produce the return value. |

public interface com.bea.language.codegen.IRParenthesizedExpression implements com.bea.language.codegen.IRExpression

| | |
|---|---|
| Methods | public com.bea.language.codegen.IRExpression getExpression( )<br>Returns the expression. |

public interface com.bea.language.codegen.IROperator implements com.bea.language.codegen.IRNode

| | |
|---|---|
| Fields | public static final EQ<br>The = operator.<br>public static final PLUSEQ<br>The += operator.<br>public static final MINUSEQ<br>The −= operator.<br>public static final MULTEQ<br>The *= operator.<br>public static final DIVEQ<br>The /= operator.<br>public static final ANDEQ |

-continued

The <code>&=</code> operator.
public static final OREQ
The |= operator.
public static final XOREQ
The ^ = operator.
public static final MODEQ
The % = operator.
public static final LSHIFTEQ
The <code><<<=</code> operator.
public static final RSHIFTEQ
The = operator.
public static final URSHIFTEQ
The = operator.
public static final OROR
The || operator.
public static final ANDAND
The <code>&&</code> operator.
public static final OR
The | operator.
public static final XOR
The ^ operator.
public static final AND
The <code>&</code> operator.
public static final EQEQ
The == operator.
public static final NOTEQ
The != operator.
public static final LT
The <operator.
public static final GT
The >operator.
public static final LTEQ
The <= operator.
public static final GTEQ
The >= operator.
public static final LSHIFT
The operator.
public static final RSHIFT
The operator.
public static final URSHIFT
The operator.
public static final PLUS
The + operator.
public static final MINUS
The – operator.
public static final MULT
The * operator.
public static final DIV
The / operator.
public static final MOD
The % operator.
public static final PREPLUSPLUS
The prefix ++ operator.
public static final PREMINUSMINUS
The prefix –– operator.
public static final POSTPLUSPLUS
The postfix ++ operator.
public static final POSTMINUSMINUS
The postfix –– operator.
public static final NOT
The ! operator.
public static final COMP
The ~ operator.
public static final CONDITIONAL
The ?: operator.
public static final INSTANCEOF
The instanceof operator.
public static final EQEQEQ
The === operator strict comparision for XScript.
public static final NOTEQEQ
The !== operator strict comparision for XScript.
public static final IN
The in operator used in for/in for XScript.
public static final TYPEOF
The typeof operator used in XScript.

public interface com.bea.language.codegen.IRNode

The base class for all nodes in the intermediate representation. Every node has a unique node type code. All the possible node types are defined as members of this interface.

| | |
|---|---|
| Methods | public int getNodeType( )<br>Returns the node type code. This uniquely identifies a node.<br>public IToken getFirstToken( )<br>Returns the start of the source range of this node or null.<br>public IToken getLastToken( )<br>Returns the end of the source range of this node or null. |
| Fields | public static final LITERAL<br>public static final TYPE<br>public static final CLASSORINTERFACETYPE<br>public static final ARRAYTYPE<br>public static final NAME<br>public static final COMPILATIONUNIT<br>public static final IMPORTDECLARATION<br>public static final MODIFIERS<br>public static final CLASSDECLARATION<br>public static final CLASSBODYDECLARATION<br>public static final FIELDDECLARATION<br>public static final METHODDECLARATION<br>public static final FORMALPARAMETER<br>public static final INITIALIZERBLOCK<br>public static final CONSTRUCTORDECLARATION<br>public static final CONSTRUCTORINVOCATION<br>public static final ARRAYINITIALIZER<br>public static final VARIABLEINITIALIZER<br>public static final BLOCK<br>public static final CLASSDECLARATIONSTATEMENT<br>public static final LOCALVARIABLEDECLARATION-STATEMENT<br>public static final LOCALVARIABLEDECLARATION<br>public static final STATEMENT<br>public static final EMPTYSTATEMENT<br>public static final LABELEDSTATEMENT<br>public static final STATEMENTEXPRESSION<br>public static final IFTHENELSESTATEMENT<br>public static final SWITCHSTATEMENT<br>public static final SWITCHBLOCKSTATEMENTGROUP<br>public static final SWITCHLABEL<br>public static final WHILESTATEMENT<br>public static final DOSTATEMENT<br>public static final FORSTATEMENT<br>public static final IDENTIFIEROPT<br>public static final BREAKSTATEMENT<br>public static final CONTINUESTATEMENT<br>public static final RETURNSTATEMENT<br>public static final THROWSTATEMENT<br>public static final SYNCHRONIZEDSTATEMENT<br>public static final TRYSTATEMENT<br>public static final CATCHES<br>public static final FINALLY<br>public static final ASSERTSTATEMENT<br>public static final PARENTHESIZEDEXPRESSION<br>public static final CLASSLITERAL<br>public static final THISEXPRESSION<br>public static final CLASSINSTANCECREATION-EXPRESSION<br>public static final ARRAYCREATIONEXPRESSION<br>public static final DIMS<br>public static final FIELDACCESS<br>public static final METHODINVOCATION<br>public static final ARRAYACCESS<br>public static final CASTEXPRESSION<br>public static final ASSIGNMENTOPERATOR<br>public static final EXPRESSION<br>public static final UNARYEXPRESSION<br>public static final BINARYEXPRESSION<br>public static final TERNARYEXPRESSION<br>public static final NAMEEXPRESSION<br>public static final TYPEEXPRESSION<br>public static final OPERATOR<br>public static final ANNOTATION<br>public static final ANNOTATIONATTRIBUTE<br>public static final FORINSTATEMENT<br>public static final DELETESTATEMENT<br>public static final METHODDECLARATIONSTATEMENT<br>public static final WITHSTATEMENT |

```
public static final XMLDOTQUERY
public static final XMLEXPRESSION
public static final NAMESPACESTATEMENT
public static final XMLLISTEXPRESSION
public static final XQRLSTATEMENT
```

public interface com.bea.language.codegen.IRNamespaceStatement implements com.bea.language.codegen.IRStatement

| | |
|---|---|
| Methods | public java.lang.String getName( )<br>Returns variable of type namespace.<br>public com.bea.language.codegen.IRExpression getExpression( )<br>Returns the expression that is the namespace's URI. |

public interface com.bea.language.codegen.IRNameExpression implements com.bea.language.codegen.IRExpression
Represents and expression that just contains a name.

| | |
|---|---|
| Methods | public com.bea.language.codegen.IRName getName( )<br>Returns the name for this expression.<br>public com.bea.language.info.ILangVariable getVariable( )<br>Returns the variable being referenced by this name. |

public interface com.bea.language.codegen.IRName implements com.bea.language.codegen.IRNode
Represents simple or qualified name. If the name is qualified, each simple component is represented by an <code>IRName</code>. The next component can be retrieved by using <code>getNext( )/code>. Names are stored in reverse order, that is com.bea.language would be represented as language->bea->com. <p>Also each name part can include information about what the name represents. This should be present on any name that is used in a context that allows multiple parts. Single-part names (for example, the IDs of fields and methods) will not have this information.

| | |
|---|---|
| Methods | public java.lang.String getID( )<br>Returns the identifier for this part of the name.<br>public com.bea.language.codegen.IRName.INameInfo getInfo( )<br>Returns the info for this part of the name or null if not available.<br>public com.bea.language.codegen.IRName getNext( )<br>Returns the next component of this name. |

public static interface com.bea.language.codegen.IRNameiNameInfo
Defines the type of info available on names.

| | |
|---|---|
| Methods | public int getType( )<br>Returns the type of this name.<br>public java.lang.Object get( )<br>Returns information about the object or type of object being referenced by this name. The type indicates what sort of object will be returned. |
| Fields | public static final TYPE_PACKAGE<br>Indicates that this name represents a package. The object returned will be an instanceof IPackage .<br>public static final TYPE_USERTYPE<br>Indicates that this name represents a class or interface. The object returned will be an instance of IReferenceType<br>public static final TYPE_VARIABLE<br>Indicates that this name represents a field, argument, or local variable. The object returned will be an instance of ILangVariable .<br>public static final TYPE_METHOD<br>Indicates that this name represents a method. The object returned will be an instanceof IMethodLocation . |

public interface com.bea.language.codegen.IRModifiers implements com.bea.language.codegen.IRNode

| | |
|---|---|
| Methods | public int getModifierBits( )<br>The integer which holds the bits for the modifier set. |
| Fields | public static final PUBLIC<br>The public modifier.<br>public static final PROTECTED<br>The protected modifier.<br>public static final PRIVATE<br>The private modifier.<br>public static final STATIC<br>The static modifier.<br>public static final ABSTRACT<br>The abstract modifier.<br>public static final FINAL<br>The final modifier.<br>public static final NATIVE<br>The native modifier.<br>public static final SYNCHRONIZED<br>The synchronized modifier.<br>public static final TRANSIENT<br>The transient modifier.<br>public static final VOLATILE<br>The volatile modifier.<br>public static final STRICTFP<br>The stricffp modifier. |

public interface com.bea.language.codegen.IRMethodInvocation implements com.bea.language.codegen.IRExpression

| | |
|---|---|
| Methods | public boolean isSuper( )<br>Returns true if there is a reference to super in this invocation.<br>public com.bea.language.codegen.IRName getClassName( )<br>For super invocations, returns the name of the class the method is being invoked. For non-super invocations, this returns null.<br>public com.bea.language.codegen.IRExpression getClassExpression( )<br>Returns the expression on which this method is being invoked or null if no such expression exists.<br>public com.bea.language.codegen.IRName getMethodName( )<br>Returns the method name.<br>public com.bea.language.codegen.IRExpression getArguments( )<br>Returns the linked list of argument expressions.<br>public IMethod getTarget( )<br>Returns the target method of this call. |

public interface com.bea.language.codegen.IRMethodDeclarationStatement implements com.bea.language.codegen.IRStatement

| | |
|---|---|
| Methods | public com.bea.language.codegen.IRMethodDeclaration getMethodDeclaration( )<br>Returns the method declaration. |

public interface com.bea.language.codegen.IRMethodDeclaration implements com.bea.language.codegen.IRClassBodyDeclaration

| | |
|---|---|
| Methods | public com.bea.language.codegen.IRName getName( )<br>Returns the name of the method.<br>public com.bea.language.codegen.IRModifiers getModifiers( )<br>Returns the modifiers on the method.<br>public com.bea.language.codegen.IRType getReturnType( )<br>Returns the return type of the method.<br>public com.bea.language.codegen.IRFormalParameter getParameters( )<br>Returns the list of formal parameters for the method.<br>public com.bea.language.codegen.IRClassOrInterfaceType getThrowList( )<br>Returns the list of exception types the method can throw.<br>public com.bea.language.codegen.IRAnnotation getAnnotations( )<br>Returns the root node of the annotation tree.<br>public com.bea.language.codegen.IRBlock getBody( )<br>Returns the body of this method, which must be a block.<br>public IMethod getTypeSignature( )<br>Returns the resolved type signature of this method.<br>public boolean isUsedExternally( )<br>Determines whether this method is used in another class of the file. |

public interface com.bea.language.codegen.IRLocalVariableDeclarationStatement implements com.bea.language.codegen.IRStatement

| | |
|---|---|
| Methods | public com.bea.language.codegen.IRLocalVariableDeclaration getDeclarations( )<br>Returns the list of local variable declarations for this statment. |

public interface com.bea.language.codegen.IRLocalVariableDeclaration implements com.bea.language.codegen.IRNode, com.bea.language.info.ILangVariable

| | |
|---|---|
| Methods | public java.lang.String getName( )<br>Returns the name of this local variable declaration.<br>public com.bea.language.codegen.IRType getVarType( )<br>Returns the type of this local variable declaration.<br>public IType getType( )<br>Returns the resolved type of the declaration.<br>public com.bea.language.codegen.IRModifiers getModifiers( )<br>Returns the modifiers for this local variable declaration.<br>public com.bea.language.codegen.IRVariableInitializer getInitializer( )<br>Returns the initializer for this local variable declaration.<br>public boolean isVar( )<br>Return is variable is marked as var (XScript)<br>public com.bea.language.codegen.IRLocalVariableDeclaration getNext( )<br>Returns the next local variable declaration in this list. Local variable declarations are chained together in a linked list whenever they appear on one line and share a type, as in:<br>int i, j, k; |

public interface com.bea.language.codegen.IRLiteral implements com.bea.language.codegen.IRExpression A literal represents a literal value that can appear in the source code such as "foo" or 1.0e+123. A literal consists of a type code, to identify the type of the literal and a string value.

| | |
|---|---|
| Methods | public int getTypeCode( )<br>Returns the type code for this literal. The possible type codes are defined as static constants.<br>public java.lang.String getValue( )<br>Returns the string value of this literal. |
| Fields | public static final INTEGER<br>An integer value.<br>public static final FLOAT<br>A floating point (float or double) value.<br>public static final BOOLEAN<br>A boolean value.<br>public static final CHARACTER<br>A character value.<br>public static final STRING<br>A string value.<br>public static final XML<br>An XML value.<br>public static final XMLLIST<br>An XML value.<br>public static final VARIANT<br>A Variant value used by XScript for Undefined, NaN, Infinity.<br>public static final NULL<br>A null value. |

public interface com.bea.language.codegen.IRLabeledStatement implements com.bea.language.codegen.IRStatement Represents a statement that has a label next to it.

| | |
|---|---|
| Methods | public java.lang.String getLabel( )<br>Returns the text of the label.<br>public com.bea.language.codegen.IRStatement getStatement( )<br>Returns the statement after the label. |

public interface com.bea.language.codegen.IRInitializerBlock implements com.bea.language.codegen.IRClassBodyDeclaration

| | |
|---|---|
| Methods | public boolean isStatic( )<br>Returns true if this is a static initializer.<br>public com.bea.language.codegen.IRBlock getBody( )<br>Returns the body of the initializer, which must be a block. |

public interface com.bea.language.codegen.IRIffhenElseStatement implements com.bea.language.codegen.IRStatement

| | |
|---|---|
| Methods | public com.bea.language.codegen.IRExpression getCondition( )<br>Returns the test condition for the if .<br>public com.bea.language.codegen.IRStatement getTrueStatement( )<br>Returns the statement to execute if the condition is true.<br>public com.bea.language.codegen.IRStatement getFalseStatement( )<br>Returns the statement to execute if the condition is false. |

public interface com.bea.language.codegen.IRForStatement implements com.bea.language.codegen.IRStatement

| | |
|---|---|
| Methods | public com.bea.language.codegen.IRStatement getInitStatement( )<br>Returns the statement used to initialize the for loop. |

-continued

| | |
|---|---|
| | public com.bea.language.codegen.IRExpression getTestExpression( )<br>Returns the test expression for the loop.<br>public com.bea.language.codegen.IRStatement getUpdateStatement( )<br>Returns the statement used to iterate the loop.<br>public com.bea.language.codegen.IRExpression getEnumeratorVariable( )<br>Returns the lhs of the IN operator for/in in XScript.<br>public com.bea.language.codegen.IRExpression getEnumExpression( )<br>Returns the expression to enumerate on for the IN operator for/in in XScript<br>public com.bea.language.codegen.IRStatement getBody( )<br>Returns the statement executed in the body of the loop. |

public interface com.bea.language.codegen.IRFormalParameter implements com.bea.language.codegen.IRNode, com.bea.language.info.ILangVariable

| | |
|---|---|
| Methods | public java.lang.String getName( )<br>Returns the name of this formal parameter.<br>public com.bea.language.codegen.IRType getParamType( )<br>Returns the type of this formal parameter.<br>public IType getType( )<br>Returns the resolved type of this formal parameter.<br>public com.bea.language.codegen.IRModifiers getModifiers( )<br>Returns the modifiers object for this formal paramter.<br>public com.bea.language.codegen.IRFormalParameter getNext( )<br>Returns the next formal parameter in the list. This is used to chain together the formal parameters for a method into a linked list. |

public interface com.bea.language.codegen.IRFinally implements com.bea.language.codegen.IRNode

| | |
|---|---|
| Methods | public com.bea.language.codegen.IRBlock getBody( )<br>Returns the body of this finally clause. |

public interface com.bea.language.codegen.IRFieldDeclaration implements com.bea.language.codegen.IRClassBodyDeclaration

| | |
|---|---|
| Methods | public java.lang.String getName( )<br>Returns the name of this field.<br>public com.bea.language.codegen.IRModifiers getModifiers( )<br>Returns the modifiers for this field.<br>public com.bea.language.codegen.IRType getType( )<br>Returns the type of this field.<br>public com.bea.language.codegen.IRVariableInitializer getInitializer( )<br>Returns the initializer for this field.<br>public com.bea.language.codegen.IRAnnotation getAnnotations( )<br>Returns the root node of the annotation tree.<br>public IField getTypeSignature( )<br>Returns the resolved type signature for this field.<br>public boolean isUsedExternally( )<br>Determines whether this field is used in another class of the file. |

public interface com.bea.language.codegen.IRFieldAccess implements com.bea.language.codegen.IRExpression Represents a field access. There are few wrinkes here that are worth mentioning.

Field accesses can refer to the super class in which case is Super will be true. Depending on the situation, the class on which the field is being accessed can either be represented by a name or an expression. For instance new Foo( ).bar is a field access using an expression as the class name.

| | |
|---|---|
| Methods | public boolean isSuper( )<br>Returns true if the super keyword is used in this expression.<br>public com.bea.language.codegen.IRName getClassName( )<br>For accesses using 'super', this returns the name of the class on which the field access is occuring.<br>public com.bea.language.codegen.IRExpression getClassExpression( )<br>For accesses without 'super, this returns the expression that evaluates to the object on which the field is to be accessed.<br>public java.lang.String getFieldName( )<br>Returns the name of the accessed field.<br>public IField getTarget( )<br>Returns the target field access. |

public class com.bea.language.codegen.IRFactory

| | |
|---|---|
| Constructors | public IRFactory( ) |
| Methods | public static com.bea.language.codegen.IIRFactory get( )<br>public static void set(<br>IIRFactory factory) |

public interface com.bea.language.codegen.IRExpression implements com.bea.language.codegen.IRNode

| | |
|---|---|
| Methods | public IType getCheckedType( )<br>Returns the type checked type of this expression.<br>public boolean isConstant( )<br>Determines whether this expression has a constant value.<br>public com.bea.language.info.IConstant getConstant( )<br>Returns the constant value of this expression if constant. This will throw an exception if the expression is not constant.<br>public com.bea.language.codegen.IRExpression getNext( )<br>Returns the next expression in the list. There are too many cases to enumerate them all. |

public interface com.bea.language.codegen.IREmptyStatement implements com.bea.language.codegen.IRStatement Empty statements represent the case where a; is used as a statement. They do nothing and are simply placeholders.

public interface com.bea.language.codegen.IRDoStatement implements com.bea.language.codegen.IRStatement

| | |
|---|---|
| Methods | public com.bea.language.codegen.IRExpression getCondition( )<br>Returns the loop condition expression.<br>public com.bea.language.codegen.IRStatement getStatement( )<br>Returns the statement to be executed in the body of the loop. |

public interface com.bea.language.codegen.IRDeleteStatement implements com.bea.language.codegen.IRStatement

| | |
|---|---|
| Methods | public com.bea.language.codegen.IRExpression getExpression( )<br>Returns the expression that will be evaluated and deleted |

public interface com.bea.language.codegen.IRContinueStatement implements com.bea.language.codegen.IRStatement

| | |
|---|---|
| Methods | public java.lang.String getLabel( )<br>Returns the label for the continue statement.<br>public com.bea.language.codegen.IRStatement getTarget( )<br>Returns the target statement to break/continue at, if labeled it's the labeled statement. |

public interface com.bea.language.codegen.IRConstructorInvocation implements com.bea.language.codegen.IRExpression

| | |
|---|---|
| Methods | public com.bea.language.codegen.IRExpression getClassExpression( )<br>Returns the expression for the class on which this constructor is being invoked, if one exists.<br>public boolean isSuper( )<br>Returns true if there is a reference to super in this invocation.<br>public IConstructor getTarget( )<br>Returns the target constructor of this call.<br>public com.bea.language.codegen.IRExpression getArguments( )<br>Returns the linked list of argument expressions. |

public interface com.bea.language.codegen.IRConstructorDeclaration implements com.bea.language.codegen.IRClassBodyDeclaration

| | |
|---|---|
| Methods | public com.bea.language.codegen.IRName getName( )<br>Returns the name of the constructor. This should match the class name in which this constructor appears.<br>public com.bea.language.codegen.IRModifiers getModifiers( )<br>Returns the modifiers for the constructor.<br>public com.bea.language.codegen.IRFormalParameter getParameters( )<br>Returns the list of formal parameters for the constructor.<br>public com.bea.language.codegen.IRClassOrInterfaceType getThrowList( )<br>The list of exception types this constructor can throw.<br>public com.bea.language.codegen.IRAnnotation getAnnotations( )<br>Returns the root node of the annotation tree.<br>public com.bea.language.codegen.IRBlock getBody( )<br>Returns the body of the constructor, which must be a block.<br>public IConstructor getTypeSignature( )<br>Returns the resolved type signature for the constructor.<br>public boolean isUsedExternally( )<br>Determines whether this is used by another class of the file. |

public interface com.bea.language.codegen.IRCompilationUnit implements com.bea.language.codegen.IRNode

| | |
|---|---|
| Methods | public com.bea.language.codegen.IRName getPackage( )<br>Returns the package declaration for this file.<br>public com.bea.language.codegen.IRClassDeclaration getClasses( )<br>Returns the list of classes defined in this file. |

public interface com.bea.language.codegen.IRClassOrInterfaceType implements com.bea.language.codegen.IRType Represents a class or interface. It should be noted that the names of these types are not resolved. If you want those you should get the IReferenceType object for the type.

| | |
|---|---|
| Methods | public com.bea.language.codegen.IRName getName( )<br>Returns the name of this type.<br>public com.bea.language.codegen.IRClassOrInterfaceType getNext( )<br>Returns the next type in the list. These types are chained into a linked list in three cases:<br>In the list of interfaces that a class implements.<br>In the list of interfaces that another interface extends.<br>In the list of types on a throws clause of a method. |

public interface com.bea.language.codegen.IRClassLiteral implements com.bea.language.codegen.IRExpression Represents literal references to the class object for a particular type. An example would be Object.class.

| | |
|---|---|
| Methods | public com.bea.language.codegen.IRType getClassType( )<br>Returns the type whose class is being retrieved. |

public interface com.bea.language.codegen.IRClassInstanceCreationExpression implements combea.language.codegen.IRExpression Represents a class creation expression, which is basically an expression that up a class. There are a two special things that can appear as part of one of these expressions.

First, a new expression may be qualified by a type, which is used to create inner classes outside of the class in which they are defined. This qualifier appears right before the new operator. Second, a new expression may have a "body" when an anonymous class is being created. This body will be a list of class body declarations which are used to extend the base class.

| | |
|---|---|
| Methods | public com.bea.language.codegen.IRExpression getQualifier( )<br>Returns the qualifier before the new operator.<br>public com.bea.language.codegen.IRType getType( )<br>Returns the type of the class (or base class) that is being created.<br>public com.bea.language.codegen.IRExpression getArguments( )<br>Returns the list of expressions that will be the arguments to the constructor.<br>public boolean hasBody( )<br>Determines whether this instance has a body (i.e., this is an instantiation of an anonymous class).<br>public com.bea.language.codegen.IRClassBodyDeclaration getBodyDeclarations( )<br>Returns the class body declarations that are present if this is the declaration of an anonymous class.<br>public java.util.Collection getReferencedVariables( )<br>Returns a collection of variables from immediately enclosing statement blocks that were referenced inside this anonymous class or null if no local variables were referenced or this expression has no body.<br>public IConstructor getConstructor( )<br>Returns the constructor that is being called for this expression. |

public interface com.bea.language.codegen.IRClassDeclarationStatement implements com.bea.language.codegen.IRStatement

| | |
|---|---|
| Methods | public com.bea.language.codegen.IRClassDeclaration getClassDeclaration( )<br>Returns the class declaration. |

public interface com.bea.language.codegen.IRClassDeclaration implements com.bea.language.codegen.IRClassBodyDeclaration Represents a class or interface declaration.

| | |
|---|---|
| Methods | public java.lang.String getName( )<br>Returns the name of this class.<br>public boolean isInterface( )<br>Returns true if this declaration represents an interface.<br>public com.bea.language.codegen.IRModifiers getModifiers( )<br>Returns the modifiers for this declaration.<br>public com.bea.language.codegen.IRType getSuperClassType( )<br>Returns the list of super classes for this declaration.<br>public com.bea.language.codegen.IRType getInterfaceTypes( )<br>Returns the list of super interfaces for this declaration.<br>public com.bea.language.codegen.IRAnnotation getAnnotations( )<br>Returns the root node of the annotation tree.<br>public com.bea.language.codegen.IRClassBodyDeclaration getBodyDeclarations( )<br>Returns the declarations in the body of this declaration.<br>public IReferenceType getTypeSignature( )<br>Returns the resolved type signature for this class declaration.<br>public java.util.Collection getReferencedVariables( )<br>Returns a collection of variables from immediately enclosing statement blocks that were referenced inside this anonymous class or null if no local variables were referenced. |

public interface com.bea.language.codegen.IRClassBodyDeclaration implements com.bea.language.codegen.IRNode Represents any declaration that can appear directly in a class. This includes fields, methods, classes, interfaces, constructors, and initializers.

| | |
|---|---|
| Methods | public com.bea.language.codegen.IRClassBodyDeclaration getNext( )<br>Returns the next class body declaration in the list. Class body declarations are chained in a linked list to define the definitions inside a class body. |

public interface com.bea.language.codegen.IRCatches implements com.bea.language.codegen.IRNode

| | |
|---|---|
| Methods | public com.bea.language.codegen.IRFormalParameter getParameter( )<br>Returns the single formal parameter for this catch clause.<br>public com.bea.language.codegen.IRBlock getBody( )<br>Gets the body of this catch clause, which must be a block.<br>public com.bea.language.codegen.IRCatches getNext( )<br>Returns the next catch clause in the list. Catch clauses are chained together in this list when they appear together in the source code.<br>public IReferenceType getResolvedType( )<br>Returns the resolved type of the class being caught. |

public interface com.bea.language.codegen.IRCastExpression implements com.bea.language.codegen.IRExpression

| | |
|---|---|
| Methods | public com.bea.language.codegen.IRExpression getTypeExpression( )<br>Returns the expression defining the type to cast to.<br>public com.bea.language.codegen.IRExpression getExpression( )<br>Returns the expression defining the object to cast. |

public interface com.bea.language.codegen.IRBreakStatement implements com.bea.language.codegen.IRStatement

| | |
|---|---|
| Methods | public java.lang.String getLabel( )<br>Returns the label for the break statement.<br>public com.bea.language.codegen.IRStatement getTarget( )<br>Returns the target statement to break/continue at, if labeled it's the labeled statement. |

public interface com.bea.language.codegen.IRBlock implements com.bea.language.codegen.IRStatement

| | |
|---|---|
| Methods | public com.bea.language.codegen.IRStatement getStatementList( )<br>Returns the list of statements in the block. |

public interface com.bea.language.codegen.IRBinaryExpression implements com.bea.language.codegen.IRExpression

| | |
|---|---|
| Methods | public int getOpcode( )<br>Returns the opcode for the operator. The opcodes are defined in IROperator.<br>public com.bea.language.codegen.IRExpression getFirst( )<br>Returns the expression for the first operand.<br>public com.bea.language.codegen.IRExpression getSecond( )<br>Returns the expression for the second operand. |

public interface com.bea.language.codegen.IRAssertStatement implements com.bea.language.codegen.IRStatement Represents an assert statement in the source code.

| | |
|---|---|
| Methods | public com.bea.language.codegen.IRExpression getCondition( )<br>Returns the test condition for the assert.<br>public com.bea.language.codegen.IRExpression getDetail( )<br>Returns the detail message for the assert. |

public interface com.bea.language.codegen.IRArrayType implements com.bea.language.codegen.IRType

| | |
|---|---|
| Methods | public com.bea.language.codegen.IRType getElementType( )<br>Returns the type of an element in this array. This type is always a primitive type or a class type. So for an array of type int[ ][ ][ ][ ] the returned type will still be int.<br>public int getDimension( )<br>Returns the dimensionality of this array. |

public interface com.bea.language.codegen.IRArrayInitializer implements com.bea.language.codegen.IRNode Represents the initializer of an array, or an element of an array that is also an array. Array initializers are composed of a linked list of IRVariableInitializer s.

| | |
|---|---|
| Methods | public com.bea.language.codegen.IRVariableInitializer getInitializerList( )<br>Returns the list of variable initializers for each of the elements in this array initializer. These inidividual initializers can be arrays themselves. |

public interface com.bea.language.codegen.IRArrayCreationExpression implements com.bea.language.codegen.IRExpression Represents an expression that creates a new instance of an array. All such valid expressions will satisfy these invariant that the number of dimensions in the type of the array expression itself is equal to the number of dimension expressions plus the number of extra dimensions.

| | |
|---|---|
| Methods | public com.bea.language.codegen.IRType getType( )<br>Returns the element type of the array.<br>public com.bea.language.codegen.IRExpression getDimensionExpressions( )<br>Returns the list expressions used to size the array.<br>public int getExtraDimensions( )<br>Returns the number of dimensions that do not have sizes.<br>public com.bea.language.codegen.IRArrayInitializer getInitializer( )<br>Returns the array initializer for this new array. |

public interface com.bea.language.codegen.IRArrayAccess implements com.bea.language.codegen.IRExpression

| | |
|---|---|
| Methods | public com.bea.language.codegen.IRExpression getArrayExpression( )<br>Returns the expression used to specify the array.<br>public com.bea.language.codegen.IRExpression getSubscriptExpression( )<br>Returns the subscript expression. |

public interface com.bea.language.codegen.IRAnnotationAttribute implements com.bea.language.codegen.IRNode Describes an attribute of an annotation on an declared entity in the file. An annotation attribute is similar to an attribute in XML.

| | |
|---|---|
| Methods | public java.lang.String getName( )<br>Returns the name of this attribute, which may include a ':'.<br>public java.lang.Object getValue( )<br>Returns the value of this attribute.<br>public java.lang.String getText( )<br>Returns the original text value of this attribute.<br>public IAnnotation getTypeSignature( )<br>public com.bea.language.codegen.IRAnnotationAttribute getNextSibling( )<br>Returns the next attribute on this annotation. |

public interface com.bea.language.codegen.IRAnnotation implements com.bea.language.codegen.IRNode Describes an annotation on a declared entity in the file. An annotation is similar to a tag in XML.

| | |
|---|---|
| Methods | public java.lang.String getName( )<br>Returns the name of this annotation, which may include a ':'.<br>public com.bea.language.codegen.IRAnnotationAttribute getFirstAttribute( )<br>Returns the first attribute of this annotation.<br>public IAnnotation getTypeSignature( )<br>Returns the resolved shape of this annotation.<br>public com.bea.language.codegen.IRAnnotation getFirstChild( )<br>Returns the first child of this annotation.<br>public com.bea.language.codegen.IRAnnotation getNextSibling( )<br>Returns the next sibling of this annotation. |
| Fields | public static final ROOT_NAME<br>Defines the name of the root node in the annotation tree. This contains the ' and ' characters which are illegal in normal tag names. |

public interface com.bea.language.codegen.IIRFactory

| | |
|---|---|
| Methods | public com.bea.language.codegen.IRAnnotation createAnnotation(<br>String name,<br>IRAnnotationAttribute attrs,<br>IRAnnotation children,<br>IAnnotation signature,<br>IRAnnotation next)<br>Creates an annotation with the properties. The attributes and children must be already be linked together with the given references being to the head of the lists.<br>public com.bea.language.codegen.IRAnnotation createAnnotation(<br>String name,<br>Collection attrs,<br>Collection children,<br>IAnnotation signature,<br>IRAnnotation next)<br>Creates an annotation with the given properties. The attributes and children will be linked together in the given order.<br>Note that all of these attributes must have been created with this factory.<br>public com.bea.language.codegen.IRAnnotation createAnnotationRoot(<br>IRAnnotation children)<br>Creates the root of the annotation root for any entity.<br>public com.bea.language.codegen.IRAnnotationAttribute createAnnotationAttribute(<br>String name,<br>Object value,<br>IAnnotation signature,<br>IRAnnotationAttribute next)<br>Creates an attribute with the same text and value. |

```
public com.bea.language.codegen.IRAnnotationAttribute createAnnotationAttribute(
    String name,
    Object value,
    String text,
    IAnnotation signature,
    IRAnnotationAttribute next)
Creates an attribute with different text and value.
public com.bea.language.codegen.IRExpression createArguments(
    Collection arguments)
Converts the given list of arguments into linked form.
It is required that each such argument have been created by this factory.
public com.bea.language.codegen.IRArrayAccess createArrayAccess(
    IRExpression arrayExpr,
    IRExpression subscriptExpr)
public com.bea.language.codegen.IRArrayCreationExpression
createArrayCreationExpression(
    IRType elemType,
    IRExpression dimExpr,
    int extraDims,
    IRArrayInitializer initializer)
Creates an array with the given properties.
Parameters
    elemType - Indicates the element type of the array. This must
be a primitive type, class, or interface.
    dimExpr - Provides the expressions for the sizes of the array dimensions.
    extraDims - Counts the number of additional array dimensions
for which sizes were not provided.
    initializer - Records the expression for initializing the
elements of the array or is null indicating that default initial
values are to be used.
public com.bea.language.codegen.IRArrayInitializer createArrayInitializer(
    IRVariableInitializer initList,
    IType info)
public com.bea.language.codegen.IRArrayType createArrayType(
    IRType elementType,
    Int dimension,
    IType info)
public com.bea.language.codegen.IRBinaryExpression createBinaryExpression(
    int opcode,
    IRExpression first,
    IRExpression second)
public com.bea.language.codegen.IRBlock createBlock(
    IRStatement statements)
Creates a block from a list of statements that are already linked.
public com.bea.language.codegen.IRBlock createBlock(
    Collection statements)
Creates a block from the given list of statements. It is required that all of the
given statements were created from this factory.
public com.bea.language.codegen.IRBreakStatement createBreakStatement(
    String label)
public com.bea.language.codegen.IRCastExpression createCastExpression(
    IRTypeExpression typeExpr,
    IRExpression expr)
public com.bea.language.codegen.IRCatches createCatches(
    IRFormalParameter param,
    IRBlock body,
    IRCatches next,
    IReferenceType type)
public com.bea.language.codegen.IRClassBodyDeclaration
createClassBodyDeclarations(
    Collection decls)
Creates a linked list of declarations from the given list.
It is required that all of the given declarations were created from this factory.
public com.bea.language.codegen.IRClassDeclaration createClassDeclaration(
    String name,
    boolean isInterface,
    IRModifiers mods,
    IRType superClass,
    IRType interTypes,
    IRAnnotation annotations,
    IRClassBodyDeclaration bodyDecls,
    IReferenceType signature,
    IRClassBodyDeclaration next)
public com.bea.language.codegen.IRClassDeclarationStatement
createDeclarationStatement(
    IRClassDeclaration declaration)
public com.bea.language.codegen.IRClassInstanceCreationExpression
createClassInstanceCreationExpression(
    IRType type,
    IRExpression arguments,
```

```
    IConstructor constructor)
Creates an instance of the given class, passing the given arguments to the constructor.
public com.bea.language.codegen.IRClassInstanceCreationExpression
createClassInstanceCreationExpression(
    IRExpression qualifier,
    IRType type,
    IRExpression arguments,
    IConstructor constructor)
Creates an instance of the member type with the given name of the type of the qualifier
expression. For example: A a = ...; a.new B( ); This will create an instance of class
A.B, with a being the enclosing instance. Note that, in this case, the type must
consist of a single identifier.
public com.bea.language.codegen.IRClassInstanceCreationExpression
createClassInstanceCreationExpression(
    IRType type,
    IRExpression arguments,
    IConstructor constructor,
    IRClassBodyDeclaration decls)
Creates an instance of an anonymous subclass of the given class
(or an anonymous implementor of the given interface).
public com.bea.language.codegen.IRClassInstanceCreationExpression
createClassInstanceCreationExpression(
    IRExpression qualifier,
    IRType type,
    IRExpression arguments,
    IConstructor constructor,
    IRClassBodyDeclaration decls)
Creates an instance of an anonymous subclass of the given member type of the
type of the qualifying expression.
The result of evaluating the qualifying expression will be the enclosing instance.
public com.bea.language.codegen.IRClassLiteral createClassLiteral(
    IRType classType)
public com.bea.language.codegen.IRClassOrInterfaceType
createClassOrInterfaceType(
    IRName name,
    IRClassOrInterfaceType next,
    IType type)
public com.bea.language.codegen.IRConstructorDeclaration
createConstructorDeclaration(
    IRName name,
    IRModifiers modifiers,
    IRFormalParameter param,
    IRClassOrInterfaceType throwList,
    IRAnnotation annotations,
    IRBlock body,
    IConstructor typeSignature,
    IRClassBodyDeclaration decl)
public com.bea.language.codegen.IRConstructorInvocation
createConstructorInvocation(
    boolean isSuper,
    IRExpression classExpr,
    IRExpression arguments,
    IConstructor target)
Creates a call to a constructor of this class or the superclass.
This is only legal as the first statement of a constructor.
Parameters
    isSuper - Determines whether this is a call to a constructor in the superclass
or this class.
    classExpr - An expression for the outer class required by the superclass or null
if this is not a super call or if the superclass does not require a different outer class.
    arguments - The arguments to the constructor.
    target - The type info for the constructor being called.
public com.bea.language.codegen.IRContinueStatement createContinueStatement(
    String label)
public com.bea.language.codegen.IRDoStatement createDoStatement(
    IRExpression condition,
    IRStatement statement)
public com.bea.language.codegen.IREmptyStatement createEmptyStatement( )
public com.bea.language.codegen.IRExpression createExpression(
    IType type,
    IRExpression next)
public com.bea.language.codegen.IRFieldAccess createFieldAccess(
    IRExpression classExpression,
    String fieldName,
    IField target)
Creates an access to the given field on the result of the given expression.
public com.bea.language.codegen.IRFieldAccess createFieldAccess(
    IRName className,
    String fieldName,
    IField target)
```

```
Creates an access to a field in a superclass. The classType is optional, and if present,
indicates the name of the superclass in which the field exists.
public com.bea.language.codegen.IRFieldAccess createFieldAccess(
    boolean isSuper,
    IRName className,
    IRExpression classExpression,
    String fieldName,
    IField target)
This version of createFieldAccess takes all possible parameters and is mainly useful
when copying another field access.
public com.bea.language.codegen.IRFieldDeclaration
    createFieldDeclaration(
    String name,
    IRModifiers modifiers,
    IRType type,
    IRVariableInitializer initializer,
    IRAnnotation annotations,
    IField signature,
    IRClassBodyDeclaration next)
public com.bea.language.codegen.IRFinally createFinally(
IRBlock body)
public com.bea.language.codegen.IRFormalParameter createFormalParameter(
    String name,
    IRType paramType,
    IType type,
    IRModifiers modifiers,
    IRFormalParameter next)
public com.bea.language.codegen.IRForStatement createForStatement(
    IRStatement init,
    IRExpression test,
    IRStatement update,
    IRStatement body)
public com.bea.language.codegen.IRIfThenElseStatement createIfThenElseStatement(
    IRExpression condition,
    IRStatement trueStatement,
    IRStatement falseStatement)
public com.bea.language.codegen.IRInitializerBlock createInitializerBlock(
    boolean isStatic,
    IRBlock body,
    IRClassBodyDeclaration next)
public com.bea.language.codegen.IRLabeledStatement createLabeledStatement(
    String label,
    IRStatement statement)
public com.bea.language.codegen.IRLiteral createLiteral(
    int value)
Creates an integer literal with the given value.
public com.bea.language.codegen.IRLiteral createLiteral(
    long value)
Creates a long literal with the given value.
public com.bea.language.codegen.IRLiteral createLiteral(
    float value)
Creates a float literal with the given value.
public com.bea.language.codegen.IRLiteral createLiteral(
    double value)
Creates a double literal with the given value.
public com.bea.language.codegen.IRLiteral createLiteral(
    boolean value)
Creates a boolean literal with the given value.
public com.bea.language.codegen.IRLiteral createLiteral(
    char value)
Creates a character literal with the given value.
public com.bea.language.codegen.IRLiteral createLiteral(
    String value)
Creates a string literal with the given value.
public com.bea.language.codegen.IRLiteral createNullLiteral( )
Creates a null literal.
public com.bea.language.codegen.IRLiteral createLiteral(
    IType type,
    int typeCode,
    String value,
    Constant constValue)
Creates a literal with the given value. This should only be used when copying a literal.
public com.bea.language.codegen.IRLocalVariableDeclaration
createLocalVariableDeclaration(
    String name,
    IRType varType,
    IType type,
    IRModifiers modifiers,
    IRVariableInitializer init,
    IRLocalVariableDeclaration next,
```

```
   boolean fVarEncountered)
public com.bea.language.codegen.IRLocalVariableDeclarationStatement
createLocalVariableDeclarationStatement(
   IRLocalVariableDeclaration declaration)
public com.bea.language.codegen.IRMethodDeclaration createMethodDeclaration(
   IRName name,
   IRModifiers modifiers,
   IRType returnType,
   IRFormalParameter params,
   IRClassOrInterfaceType throwList,
   IRAnnotation annotations,
   IRBlock body,
   Method typeSignature,
   IRClassBodyDeclaration next)
public com.bea.language.codegen.IRMethodDeclarationStatement
createMethodDeclarationStatement(
   IRMethodDeclaration methodDeclaration)
public com.bea.language.codegen.IRMethodInvocation createMethodInvocation(
   IRName methodName,
   IRExpression arguments,
   IMethod target)
Creates a method call where a name is used by itself without
a preceding expression. Here are some examples:
System.out.println("hello") foo( ) In the latter case, foo could
be a method in that class.
public com.bea.language.codegen.IRMethodInvocation createMethodInvocation(
   IRExpression precExpr,
   String methodName,
   IRExpression arguments,
   IMethod target)
Creates a method call where the name is preceded by some kind of expression.
Here is an example: "foo".substring(1)
public com.bea.language.codegen.IRMethodInvocation createSuperMethodInvocation(
   IRName className,
   String methodName,
   IRExpression arguments,
   Method target)
Creates a method call where the super operator is used.
Here is an example:
MyClass.super.foo( )
public com.bea.language.codegen.IRMethodInvocation createMethodInvocation(
   IRName className,
   IRExpression classExpr,
   IRName methodName,
   boolean isSuper,
   IMethod target,
   IRExpression arguments)
Creates a method call. This version takes all possible parts that could be used
in a method invocation. This should never be called except to copy another
method invocation.
public com.bea.language.codegen.IRModifiers
   createModifiers(
   int modifierBits)
public com.bea.language.codegen.IRName createName(
   String ident,
   IRName qual)
Creates a name with the given ID and qualifier but no info.
public com.bea.language.codegen.IRName createName(
   String ident,
   IRName.INameInfo info,
   IRName qual)
Creates a name with the given ID, qualifier, and info.
public com.bea.language.codegen.IRNameExpression createNameExpression(
   IRName name,
   ILangVariable variable)
public com.bea.language.codegen.IRParenthesizedExpression
createParenthesizedExpression(
   IRExpression expr)
public com.bea.language.codegen.IRReturnStatement createReturnStatement(
   IRExpression expr)
public com.bea.language.codegen.IRStatementExpression createStatementExpression(
   IRExpression expr)
public com.bea.language.codegen.IRSwitchBlockStatementGroup
createSwitch BlockStatementGroup(
   IRSwitchLabel label,
   IRStatement statements,
   IRSwitchBlockStatementGroup next)
public com.bea.language.codegen.IRSwitchLabel createSwitchLabel(
   IRExpression caseExpr,
   IRSwitchLabel next)
```

-continued

```
public com.bea.language.codegen.IRSwitchStatement createSwtichStatement(
   IRExpression switchExpr,
   IRSwitchBlockStatementGroup groups)
public com.bea.language.codegen.IRSynchronizedStatement
createSynchronizedStatement(
   IRExpression expr,
   IRBlock body)
public com.bea.language.codegen.IRTernaryExpression createTernaryExpression(
   int opcode,
   IRExpression first,
   IRExpression second,
   IRExpression third)
public com.bea.language.codegen.IRThisExpression createThisExpression(
   IReferenceType outerType,
   IRName className)
Creates a reference to 'this' optionally qualified by the given class name.
public com.bea.language.codegen.IRDeleteStatement createDeleteStatement(
   IRExpression expr)
public com.bea.language.codegen.IRThrowStatement createThrowStatement(
   IRExpression expr)
public com.bea.language.codegen.IRTryStatement createTryStatement(
   IRBlock body,
   IRCatches catchClause,
   IRFinally fin)
public com.bea.language.codegen.IRType createType(
   int typeCode,
   IType info)
public com.bea.language.codegen.IRTypeExpression createTypeExpression(
   IRType type)
public com.bea.language.codegen.IRUnaryExpression createUnaryExpression(
   int opcode,
   IRExpression first)
public com.bea.language.codegen.IRVariableInitializer createVariableInitializer(
   boolean isArray,
   IRExpression initExpr,
   IRArrayInitializer arrayInit,
   IRVariableInitializer next)
public com.bea.language.codegen.IRWhileStatement createWhileStatement(
   IRExpression condition,
   IRStatement statement)
public void setRange(
   IRNode node,
   IToken first,
   IToken last)
Sets the token range for the given node. It is required that the given node have been
created with this interface.
```

Package com.bea.language.enterprise

This package provides information about the enterprise context of the project. Its classes and interfaces are described below.

public interface com.bea.language.enterprise.ILangEntContext

Provides additional context for enterprise projects.

| | |
|---|---|
| Methods | public boolean isEntProject( )<br>Determines if this is an enterprise project.<br>public IEntProject.IWebAppProject getWebAppProject( )<br>Returns the web app project, if appropriate, for the current project.<br>public IEntProject.IWebAppProject[ ] getWebAppProjects( )<br>Returns all web app projects in the current enterprise application. |

public class com.bea.language.enterprise.EntContext

Provides access to the enterprise context for this project.

| | |
|---|---|
| Constructors | public EntContext( ) |
| Methods | public static<br>com.bea.language.enterprise.ILangEntContext get( )<br>Returns the enterprise context of compilation. |

Package com.bea.Ianguage.feature

This package defines how a language extension accesses information about certain features of the source code. Its classes and interfaces are described below.

public interface com.bea.language.feature.IProjectFeature

The interface all features must provide to the framework.

| | |
|---|---|
| Methods | public java.lang.Object clone( )<br>Creates a copy of this feature.<br>public void setProject(<br>IProject proj)<br>Sets project on which this feature is to act. |

public interface com.bea.language.feature.ILangTokenUpdateFeature implements com.bea.language.feature.ILangFeature Provided by languages that want to perform updating of their token sets to changes in real time.

| | |
|---|---|
| Methods | public boolean isStartToken(<br>IToken start)<br>Token updating code will iterate backward from a change |

| | |
|---|---|
| | looking for a valid start token.<br>public void setStartToken(<br>IToken start)<br>Sets the start token for subsequent scanning.<br>public void setContext(<br>ILangTokenUpdateFeature.IContext context)<br>Provides additional context for this feature.<br>public boolean isMatchingState(<br>int newType,<br>int oldType)<br>Determines from new and old token types whether the scanners that produced the tokens were in a matching state. It is assumed that token types can be mapped back to scanner states.<br>A stateless scanner, should simply return true always.<br>public boolean getNextToken( )<br>Adds the next token in the stream via the context. |

public static interface com.bea.language.feature.ILangTokenUpdateFeature.IContext Callback interface to the update framework.

| | |
|---|---|
| Methods | public int getStart( )<br>Returns the inclusive start of the changed text.<br>public int getOldEnd( )<br>Returns the exclusive end of the removed text.<br>public int getNewEnd( )<br>Returns the exclusive end of the inserted text.<br>public int getSizeChange( )<br>Returns the size of the inserted text minus the removed text.<br>public com.bea.language.ILangReader getReader( )<br>Returns a reader for the stream being re-tokenized.<br>public com.bea.language.ILangCompiler getLangCompiler( )<br>Returns the compiler used to compile this node<br>public void addNextToken(<br>int type,<br>int size)<br>Adds the next token found in the stream. |

public interface com.bea.language.feature.ILangTokenInfoFeature implements com.bea.language.feature.ILangFeature

| | |
|---|---|
| Methods | public java.lang.String getTokenName(<br>IToken token)<br>Returns a displayable name for the token.<br>public java.lang.String[ ] getTokenNames( )<br>Returns all the token names. |

public interface com.bea.language.feature.ILangStructureFeature implements com.bea.language.feature.ILangFeature

| | |
|---|---|
| Methods | public IStructureNode createStructure(<br>IStructureBuilder builder)<br>Creates a structure tree using the specified builder.<br>public Range getRangeInSource(<br>IStructureNode node)<br>Returns the range of the specified node in the source code.<br>public Range getRangeInSource(<br>IStructureNode node,<br>StructureCode propCode)<br>Returns the range of the specified property in the source code.<br>public java.lang.Object getSourceValue(<br>IStructureNode node,<br>StructureCode propCode)<br>Returns the syntactic value of the specified property.<br>public void addChild(<br>IStructureNode parent,<br>IAuthorNode child)<br>Updates the source to add the given child to the parent.<br>public void removeChild(<br>IStructureNode child)<br>Updates the source to remove the given child.<br>public void replaceNode(<br>IStructureNode oldNode,<br>IAuthorNode newNode)<br>Updates the source to replace the given node. |

public interface com.bea.language.feature.ILangSourceInfoFeature implements com.bea.language.feature.ILangFeature

| | |
|---|---|
| Methods | public java.lang.Object getIdentifierinfo(<br>int offset)<br>Returns the object referenced by the identifier at the given offset or null if the information could not be produced.<br>public boolean isCompletionChar(<br>int offset,<br>char ch)<br>Determines whether the given character, just typed, should initiate an attempt at completion (after a pause).<br>public Range getCompletionRange(<br>int offset)<br>Returns the range in the text that holds the current value of the completion that has been chosen. This is what will be replaced when a new completion is chosen.<br>public java.util.List getCompletions(<br>int offset,<br>char ch)<br>Returns all of the possible objects whose names could be used in place of the identifier at the given offset (or that would be at the given offset). The return value will be null if the information could not be produced.<br>public java.util.List getEnclosingContext(<br>int offset)<br>Returns information about the enclosing context of the given offset. |

public interface com.bea.language.feature.ILangPropertyInfoFeature implements com.bea.language.feature.ILangFeature

| | |
|---|---|
| Methods | public IDescription getDescription(<br>IStructureNode node)<br>Returns the description associated with the given node<br>public java.util.Iterator getAllTags(<br>IStructureNode node)<br>Returns the list of possible annotation tags on the given node.<br>The iterator elements must be of type ITag |

public interface com.bea.language.feature.ILangFeature

The interface all language specific features provide.

public static interface com.bea.language.feature.ILangFeature.IContext

The context provided to all language specific features.

| | |
|---|---|
| Methods | public IToken getToken(<br>int offset)<br>Returns the token at the specified offset.<br>public java.util.Iterator getTokens( )<br>Returns an iterator over all the language tokens starting at the beginning of the file. This iterator MUST be released with a call to release.<br>public java.util.Iterator getTokens(<br>boolean forward) |

-continued

| | |
|---|---|
| | Returns an iterator over all the language tokens in the requested direction. This iterator MUST be released with a call to release.<br>public java.util.Iterator getTokens(<br>int offset,<br>boolean forward)<br>Returns an iterator over the language tokens starting at the given offset and moving in the given direction. This iterator MUST be released with a call to release.<br>public java.util.Iterator getTokens(<br>int offset,<br>int length,<br>boolean forward)<br>Returns an iterator over the language tokens starting at the given offset and moving in the given direction that will stop after the given length. This iterator MUST be released with a call to release.<br>public void release(<br>Iterator iter)<br>Releases the lock on the tokens held by the given iterator.<br>public java.lang.Object getParseTree( )<br>Returns the parse tree for this language node.<br>public com.bea.language.ILineColumn toLineColumn(<br>int offset)<br>Returns the line and column of the given offset.<br>public java.lang.String getText(<br>int start,<br>int end)<br>Gets the text within the given range.<br>public void replaceText(<br>String text,<br>int start,<br>int end)<br>Replaces the text in the specified range with the specified text.<br>public INamespace getNamespace(<br>String name)<br>Returns the namespace with the given unique name.<br>public com.bea.language.ILangCompiler getLangCompiler( )<br>Returns the compiler for this file.<br>public IFileStore.IEntry getEntry( )<br>Returns the file entry for this feature.<br>public IProject getProject( )<br>Returns the project for this feature. |

public static class com.bea.language.feature.ILangFeature.Context

A static context object used to set and retrieve the context from TLS.

| | |
|---|---|
| Constructors | public ILangFeature.Context( ) |
| Methods | public static<br>com.bea.language.feature.ILangFeature.IContext get( )<br>Gets the context.<br>public static void set(<br>ILangFeature.IContext c)<br>Sets the context. |

public interface com.bea.language.feature.IFileFeature implements com.bea.language.feature.IProjectFeature Defines the shape of a feature that pertains to a particular file in the project. These features can maintain state and can lock the state of the file as well.

| | |
|---|---|
| Methods | public void setContext(<br>IFileFeature.IContext context)<br>Sets the context for this feature. |

public static interface com.bea.language.feature.IFileFeature.IContext

Defines the context available to an in-use feature.

| | |
|---|---|
| Methods | public INode getRootNode( )<br>Returns the root language for this file.<br>public INode getNode(<br>int offset)<br>Returns inner-most language at the specified offset.<br>public java.util.List getNodes(<br>int offset)<br>Returns the languges from outer to inner at the given offset.<br>public IToken getToken(<br>INode node,<br>int offset)<br>Returns the token at the specified offset in the node.<br>public java.util.Iterator getTokens(<br>INode node,<br>int offset,<br>boolean forward)<br>Returns an iterator over this node's tokens starting at the given offset and moving in the given direction. This iterator MUST be released with a call to release.<br>public java.util.Iterator getTokens(<br>INode node,<br>int offset,<br>int length,<br>boolean forward)<br>Returns an iterator over this node's tokens starting at the given offset and moving in the given direction that will stop after the given length. This iterator MUST be released with a call to release.<br>public void lockState(<br>int state)<br>Locks the file into a particular compilation state.<br>public void releaseState( )<br>Releases the lock on the file. |

Package com.bea.language.fileinfo

This package defines interfaces implemented by compilers that wish to access or manipulate file information. Its classes and interfaces are described below.

public interface com.bea.language.fileinfo.ILangFileResolver

Implemented by compilers that wish to expose their content in the file namespace.

| | |
|---|---|
| Methods | public com.bea.language.fileinfo.ILangFileResolver.IContent getContent( )<br>Returns an object recording the content of this file. |

public static interface com.bea.language.fileinfo.ILangFileResolver.IContent

Represents the content of the file. Implementations will probably want to store the content in only one form, but may wish to make it available in other forms uppon request.

| | |
|---|---|
| Methods | public java.lang.String[ ] getContentTypes( )<br>Returns the types of contents supported by this file.<br>public java.lang.Object getContent(<br>String type)<br>Returns the content in the given type or null if not supported.<br>public boolean equals(<br>Object o)<br>Compares this content to the given one. This must be implemented for changes to the namespace to be correctly determined. |

public interface com.bea.language.fileinfo.ILangFileCompiler implements com.bea.language.ILangCompiler Implemented by compilers that wish to participate more fully in the file namespace.

| | |
|---|---|
| Methods | public com.bea.language.fileinfo.ILangFileResolver getFileResolver( )<br>Returns a resolver to use for the file namespace shape of this file. |

Package com.bea.language.info

This package defines mutable versions of the compiler info interfaces of com.bea.compiler.info. Its classes and interfaces are described below.

public class com.bea.language.info.LangInfoFactory

Provides access to the factory of info structores.

| | |
|---|---|
| Constructors | public LangInfoFactory( ) |
| Methods | public static com.bea.language.infoILangInfoFactory get( )<br>Returns the singleton instance of Lang InfoFactory.<br>public static void set(<br>ILangInfoFactory factory)<br>Sets the singleton instance of ILangInfoFactory. This should only be called by the implementation of the interface. |

public interface com.bea.language.info.IScope

Represents a set of defined entities in the source. Note that this allows only for resolution of simple names. Typically, a language will add its own algorithm for resolving multi-part names on top of the scope.

| | |
|---|---|
| Methods | public IPackage resolvePackage(<br>String name)<br>Returns the package with the given name or null if none exists.<br>public IReferenceType resolveType(<br>String name)<br>Returns the type with the given short name or null if none exists.<br>public com.bea.language.info.ILangVariable resolveVariable(<br>String name,<br>boolean onlyStatic)<br>Returns the type of the variable (field or whatever) with the given short name or null if none exists.<br>public IReferenceType resolveMethod(<br>String name,<br>boolean onlyStatic)<br>Returns the type containing a method with the given short name or null if none exists. |

public interface com.bea.languageinfo.IMethodLocation

Represents the location in which the method with the given ID was looked for (taking into account the argument types).

| | |
|---|---|
| Methods | public IReferenceType getType( )<br>Returns the type that must have contained the method.<br>public boolean isOnlyStatic( )<br>Determines whether only static methods could be referenced. |

public interface com.bea.languageinfo.ILangVariable

Encapsulates information about a variable defined in the source. This variable can be a local variable, a method parameter, a field of a user type, and so on.

| | |
|---|---|
| Methods | public boolean isConstant( )<br>Determines whether this variable has a constant initializer.<br>public com.bea.language.info.IConstant getConstant( )<br>Returns the constant initializer of this variable. |

public interface com.bea.language.info.ILangUserType implements com.bea.language.info.ILangReferenceTypeMember A mutable version of IReferenceType. Note that no mutation should ever be performed after the type is handed to the framework.

| | |
|---|---|
| Methods | public void setInterface(<br>boolean isInterface)<br>Sets whether this type is an interface.<br>public void setCanonicalName(<br>boolean hasCanonicalName)<br>Sets whether this type has a canonial name.<br>public void setAbstract(<br>boolean isAbstract)<br>Sets whether this type is not implemented.<br>public void setStatic(<br>boolean isStatic)<br>Sets whether this type has an outer type at run-time.<br>public void setFinal(<br>boolean isFinal)<br>Sets whether this type can be subclassed.<br>public void setStrictFP(<br>boolean isStrictFP)<br>Sets whether this type uses strict floating point operations.<br>public void setSynthetic(<br>boolean isSynthetic)<br>Sets whether this type is not available at compile-time.<br>public void setName(<br>IName name)<br>Sets the name of this type to the value given. Note that this should never be called on a type that has already been returned from the language to the framework.<br>public void setOuterType(<br>IReferenceType outerType)<br>Sets the outer type of this member. Note that this is called automatically for member types found during the resolve phase. This method is only needed for synthetic inner classes found during type checking (e.g. local and anonymous classes in Java). |

public interface com.bea.language.info.ILangReferenceTypeMember implements com.bea.language.info.ILangDeclaredEntity A mutable version of IReferenceTypeMember.

| | |
|---|---|
| Methods | public void setModifiers(<br>int mods)<br>Sets all of the modifiers in an bitfield. |

public interface com.bea.language.info.ILangMethod implements com.bea.language.info.ILangReferenceTypeMember, com.bea.language.info.ILangCallable A mutable version of IMethod.

| | |
|---|---|
| Methods | public com.bea.language.info.ILangMethod.ISignature getKey( )<br>Returns an object representing the signature of this type, which is used as the key for this method in the method members map.<br>public void setID(<br>String id)<br>Sets the ID of this member.<br>public void setReturnType(<br>IType returnType)<br>Sets the return type of this method.<br>public void setAbstract(<br>boolean isAbstract)<br>Sets whether this method is not implemented.<br>public void setStatic( |

-continued

```
        boolean isStatic)
    Sets whether this is a class method.
    public void setFinal(
        boolean isFinal)
    Sets whether this method can be overriden.
    public void setSynchronized(
        boolean isSynchronized)
    Sets whether this method is automatically synchronized.
    public void setNative(
        boolean isNative)
    Sets whether this method is implemented in native code.
    public void setStrictFP(
        boolean isStrictFP)
    Sets whether this method uses strict floating point operations.
```

public static interface com.bea.language.info.ILangMethod.ISignature

Defines the shape by which methods are said to define the same method.

| | |
|---|---|
| Methods | public java.lang.String getName( )<br>Returns the name of the method.<br>public IType getType( )<br>Returns the tuple type of the method arguments. |

public interface com.bea.language.info.ILangInfoFactory

Defines the interface for creation of compiler info structures.

For each type of structure that can be created, this provides one "constructor" that takes all of the information at creation time and another that returns a structure with null/default fields that must be filled in afterward.

```
Methods public IName createName(
        String id,
        IName qual)
    Returns a name with the given id and qualifier (can be null).
    public IName createName(
        String qname)
    Returns a name from the given qualified name (containing '.'s).
    public com.bea.language.info.ILangArrayType createArray( )
    Returns an array type with default properties.
    public com.bea.language.info.ILangArrayType createArray(
        IType elemType)
    Returns an array type with the given element type.
    public com.bea.language.info.ILangUserType createClass( )
    Returns a class type with default properties.
    public com.bea.language.info.ILangUserType createClass(
        Object source,
        String id,
        boolean isCanonical,
        String pkg,
        boolean isSynthetic)
    Returns a class reference type with the given properties.
    public com.bea.language.info.ILangUserType createClass(
        Object source,
        String id,
        boolean isCanonical,
        String pkg,
        IAccess access,
        boolean isAbstract,
        boolean isStatic,
        boolean isFinal,
        boolean isStrictFP,
        boolean isSynthetic,
        IAnnotationSet annotations)
    Returns a class reference type with the given properties.
    public com.bea.language.info.ILangUserType createInterface(
        Object source,
        String id,
```

-continued

```
        boolean isCanonical,
        String pkg,
        IAccess access,
        boolean isStrictFP,
        boolean isSynthetic,
        IAnnotationSet annotations)
    Returns an interface reference type with the given properties.
    public com.bea.language.info.ILangField createField( )
    Returns a field with default properties.
    public com.bea.language.info.ILangField createField(
        Object source,
        String id,
        IType type,
        IAccess access,
        boolean isStatic,
        boolean isFinal,
        boolean isTransient,
        boolean isVolatile,
        IAnnotationSet annotations)
    Returns a field with the given properties.
    public com.bea.language.info.ILangMethod createMethod( )
    Returns a method with default properties.
    public com.bea.language.info.ILangMethod createMethod(
        Object source,
        String id,
        IType returnType,
        List arguments,
        List throwTypes,
        IAccess access,
        boolean isAbstract,
        boolean isStatic,
        boolean isFinal,
        boolean isSynchronized,
        boolean isNative,
        boolean isStrictFP,
        IAnnotationSet annotations)
    Returns a method with the given properties.
    public com.bea.language.info.ILangConstructor
    createConstructor( )
    Returns a constructor with default properties.
    public com.bea.language.info.ILangConstructor
    createConstructor(
        Object source,
        List arguments,
        List throwTypes,
        IAccess access,
        IAnnotationSet annotations)
    Returns a constructor with the given properties.
    public com.bea.language.info.ILangArgument
    createArgument( )
    Returns an argument with default properties.
    public com.bea.language.info.ILangArgument
    createArgument(
        String id,
        IType type)
    Returns an argument with the given name and type.
    public com.bea.language.info.ILangAnnotationSet
    createAnnotationSet( )
    Creates an annotation set with default properties.
    public com.bea.language.info.ILangAnnotationSet
    createAnnotationSet(
        String shortDesc,
        String desc,
        ILangAnnotation root)
    Creates an annotation set with the given properties.
    public com.bea.language.info.ILangAnnotation
    createAnnotation( )
    Returns an annotation with the default properties.
    public com.bea.language.info.ILangAnnotation
    createAnnotation(
        Object source,
        String id,
        Object value,
        IAccess access,
        ILangAnnotation parent,
        ILangAnnotation firstChild,
        ILangAnnotation nextSibling)
    Returns an annotation with the specified properties.
    public IType createTupleType(
        IType[ ] types)
```

-continued

| | |
|---|---|
| | Returns a tuple type with the given component types that can be used to look up methods on IReferenceType . |

public interface com.bea.language.info.ILangField implements com.bea.language.info.ILangReferenceTypeMember, com.bea.language.info.ILangVariable A mutable version of IField.

| | |
|---|---|
| Methods | public void setID(<br>String id)<br>Sets the ID of this member.<br>public void setType(<br>IType type)<br>Sets the type of this field.<br>public void setStatic(<br>boolean isStatic)<br>Sets whether this is a class field.<br>public void setFinal(<br>boolean isFinal)<br>Sets whether this field can be modified.<br>public void setTransient(<br>boolean isTransient)<br>Sets whether this field is serialized.<br>public void setVolatile(<br>boolean isVolatile)<br>Sets whether this field can change value unexpectedly.<br>public void setConstant(<br>IConstant constant)<br>Sets the constant initializer value of this field. |

public interface com.bea.language.info.ILangDeclaredEntity

A mutable version of IReferenceTypeMember.

| | |
|---|---|
| Methods | public java.lang.Object getSource( )<br>Returns the node in the parse tree from which this was created.<br>public void setSource(<br>Object source)<br>Sets the node in the parse tree from which this was created.<br>public void setAccess(<br>IAccess access)<br>Records the accessability of this entity.<br>public void setAnnotations(<br>IAnnotationSet annotations)<br>Records the annotations on this entity. |

public interface com.bea.language.info.ILangConstructor implements com.bea.language.info.ILangDeclaredEntity, com.bea.language.info.ILangCallable A mutable version of IConstructor.

public interface com.bea.language.info.ILangCallable

A mutable version of ICallable.

| | |
|---|---|
| Methods | public void setAccess(<br>IAccess access)<br>Sets the accessability of this type.<br>public void setExceptionTypes(<br>List types)<br>Sets the types that can be thrown by this method.<br>public void setArguments(<br>List args)<br>Sets the arguments of this method. |

public interface com.bea.language.info.ILangArrayType implements com.bea.language.info.ILangReferenceTypeMember Represents a mutable version of array reference types.

| | |
|---|---|
| Methods | public void setElementType(<br>IType elemType)<br>Sets the element type of the array. |

public interface com.bea.language.info.ILangArgument

A mutable version of IArgument.

| | |
|---|---|
| Methods | public void setName(<br>String name)<br>Returns the name of this argument.<br>public void setType(<br>IType type)<br>Returns the type of this argument. |

public interface com.bea.language.info.ILangAnnotationSet

Represents a mutable version of the annotation set, which also exposes the fact that the annotations are stored in a tree. Note that the root node of the tree is insignificant.

| | |
|---|---|
| Methods | public void setShortDescription(<br>String shortDesc)<br>Sets the short (one sentence) description of this entity.<br>public void setDescription(<br>String desc)<br>Sets the full description of this entity.<br>public com.bea.language.info.ILangAnnotation getRoot( )<br>Returns the root node of the annotation tree.<br>public void setRoot(<br>ILangAnnotation root)<br>Records the root node of the annotation tree. |

public interface com.bea.language.info.ILangAnnotation

Represents a mutable version of annotations. This version also exposes the fact that the annotations are arranged into a tree, which has links between siblings and from the parent to the first child.

| | |
|---|---|
| Methods | public java.lang.Object getSource( )<br>Returns the node in the parse tree from which this was created.<br>public void setSource(<br>Object source)<br>Sets the node in the parse tree from which this was created.<br>public void setID(<br>String id)<br>Records the ID of the annotation.<br>public void setAccess(<br>IAccess access)<br>Records the accessability range of this annotation.<br>public void setValue(<br>Object value)<br>Records the value of the annotation.<br>public com.bea.language.info.ILangAnnotation getParent( )<br>Returns the parent of this annotation (if it has one).<br>public void setParent(<br>ILangAnnotation parent)<br>Records the parent of this annotation (if it has one).<br>public com.bea.language.info.ILangAnnotation getFirstChild( )<br>Returns the first child of this annotation.<br>public void setFirstChild(<br>ILangAnnotation firstChild)<br>Records the first child of this annotation.<br>public com.bea.language.info.ILangAnnotation getNext Sibling( ) |

-continued

| | |
|---|---|
| | Returns the next sibiling of this annotation.<br>public void setNextSibling(<br>    ILangAnnotation nextSibling)<br>Records the next sibiling of this annotation. |

public interface com.bea.language.info.ILangAmbiguous

Represents a member of a reference type that is ambiguous. For fields and types, this means that the type inheritted two entities with the same name. For methods, this means that the type inheritted two methods with the same signature. In the case of methods, this is not ever an error.

Methods public java.util.Iterator getMembers( )

Returns the members that created the ambiguity.

public interface com.bea.language.info.IConstantFactory

Provides methods for creating implementations of IConstant.

| | |
|---|---|
| Methods | public com.bea.language.info.IConstant create(<br>    boolean val)<br>public com.bea.language.info.IConstant create(<br>    char val)<br>public com.bea.language.info.IConstant create(<br>    int val)<br>public com.bea.language.info.IConstant create(<br>    long val)<br>public com.bea.language.info.IConstant create(<br>    float val)<br>public com.bea.language.info.IConstant create(<br>    double val)<br>public com.bea.language.info.IConstant create(<br>    String val) |

public interface com.bea.language.info.IConstant

Records the constant value of a field or expression in the source. This interface allows implementations to compute the values on demand. This can improve performance as computing the value of some constants (strings) can be very expensive.

| | |
|---|---|
| Methods | public java.lang.Object getValue( )<br>Returns the value of this constant, which will be an instance of Boolean , Character , Number , or String .<br>public com.bea.language.info.IConstant cast(<br>    int type)<br>Casts this constant into one for the given primitive type.<br>public com.bea.language.info.IConstant convertToString( )<br>Casts this constant into one for a string with this value.<br>public boolean fits(<br>    int type)<br>Determines whether this primitive integral value will fit in the given primitive integral type.<br>public com.bea.language.info.IConstant operator(<br>    int opcode)<br>Performs the given unary operation on this constant.<br>public com.bea.language.info.IConstant operator(<br>    int opcode,<br>    IConstant arg)<br>Performs the given binary operation on this and the given constant, which must be of the same type.<br>public com.bea.language.info.IConstant operator(<br>    int opcode,<br>    IConstant arg1,<br>    IConstant arg2)<br>Performs the given ternary operation on this and the given constants. The two given arguments must be of the same type. |

public class com.bea.language.info.ConstantFactory

Provides access to the singleton constant factory.

| | |
|---|---|
| Constructors | public ConstantFactory( ) |
| Methods | public static com.bea.language.info.IConstantFactory get( )<br>Returns the singleton constant factory.<br>public static void set(<br>    IConstantFactory factory)<br>Sets the singleton constant factory. This should only be called by the implementation of IConstantFactory . |

Package com.bea.language.java

This package defines how the Java language implementation can be extended to create support for other languages based on Java and its annotations. Its classes and interfaces are described below.

public class com.bea.language.java.TransformSymbol

| | |
|---|---|
| Constructors | public TransformSymbol( ) |
| Fields | public static final SHORT<br>public static final IDENTIFIER<br>public static final ANDEQ<br>public static final GT<br>public static final IMPLEMENTS<br>public static final CONST<br>public static final STRICTFP<br>public static final NOTEQ<br>public static final PLUSEQ<br>public static final RBRACK<br>public static final CATCH<br>public static final COMMA<br>public static final RBRACE<br>public static final THROW<br>public static final RPAREN<br>public static final LBRACK<br>public static final LT<br>public static final ANDAND<br>public static final OROR<br>public static final DOUBLE<br>public static final SUB<br>public static final LBRACE<br>public static final TRANSIENT<br>public static final LPAREN<br>public static final XOREQ<br>public static final PROTECTED<br>public static final INTEGER_LITERAL<br>public static final NOT<br>public static final COMMENT_SHORT<br>public static final FINAL<br>public static final GOTO<br>public static final URSHIFTEQ<br>public static final PACKAGE<br>public static final JAVADOC_COMMENT<br>public static final COMP<br>public static final EQ<br>public static final BOOLEAN_LITERAL<br>public static final MOD<br>public static final CLASS<br>public static final SUPER<br>public static final ABSTRACT<br>public static final NATIVE<br>public static final LONG<br>public static final PLUS<br>public static final QUESTION<br>public static final WHILE<br>public static final EXTENDS<br>public static final INTERFACE<br>public static final CHAR<br>public static final BOOLEAN<br>public static final SWITCH<br>public static final DO<br>public static final FOR<br>public static final RSHIFTEQ<br>public static final VOID |

-continued

| |
|---|
| public static final DIV |
| public static final PUBLIC |
| public static final RETURN |
| public static final MULT |
| public static final ELSE |
| public static final TRY |
| public static final GTEQ |
| public static final BREAK |
| public static final DOT |
| public static final INT |
| public static final NULL_LITERAL |
| public static final THROWS |
| public static final STRING_LITERAL |
| public static final EQEQ |
| public static final EOF |
| public static final SEMICOLON |
| public static final THIS |
| public static final DEFAULT |
| public static final MULTEQ |
| public static final IMPORT |
| public static final MINUS |
| public static final LTEQ |
| public static final OR |
| public static final error |
| public static final URSHIFT |
| public static final SYNCHRONIZED |
| public static final DIVEQ |
| public static final WHITESPACE |
| public static final LSHIFTEQ |
| public static final FINALLY |
| public static final CONTINUE |
| public static final INSTANCEOF |
| public static final IF |
| public static final MODEQ |
| public static final MINUSMINUS |
| public static final ASSERT |
| public static final COLON |
| public static final CHARACTER_LITERAL |
| public static final OREQ |
| public static final VOLATILE |
| public static final CASE |
| public static final PLUSPLUS |
| public static final NEW |
| public static final RSHIFT |
| public static final BYTE |
| public static final AND |
| public static final PRIVATE |
| public static final STATIC |
| public static final LSHIFT |
| public static final XOR |
| public static final COMMENT_LONG |
| public static final FLOATING_POINT_LITERAL |
| public static final MINUSEQ |

public class com.bea.language.java.JavaLanguageFactory

Contains the reference to the template instance of the Java language.

| | |
|---|---|
| Constructors | public JavaLanguageFactory( ) |
| Methods | public static com.bea.language.java.<br>IJavaLanguageFactory get( )<br>Returns a reference to the implemention of IJavaLanguageFactory .<br>public static void set(<br>IJavaLanguageFactory instance)<br>Sets the reference to the implementation of IJavaLanguageFactory . This will be called once when the implementation class is loaded. This should not be called but by the framework. |

public class com.bea.language.java.JavaFeatureContext

Provides access to the implementation of IJavaFeatureContext.

| | |
|---|---|
| Constructors | public JavaFeatureContext( ) |
| Methods | public static com.bea.language.java.<br>IJavaFeatureContext get( )<br>public static void set(<br>IJavaFeatureContext context) |

public class com.bea.language.java.JavaContext

Provides access to the implementation of IJavaContext.

| | |
|---|---|
| Constructors | public JavaContext( ) |
| Methods | public static com.bea.language.java.IJavaContext get( )<br>Returns the context for the Java compilation currently in progress.<br>public static void set(<br>IJavaContext c)<br>Sets the context for the Java compilation currently in progress. This should only ever be called by the implementor of IJavaContext (i.e., the Java language). |

public interface com.bea.language.java.IJavaStructureNode

| | |
|---|---|
| Methods | public StructureCode getTypeCode( )<br>public void setTypeCode(<br>StructureCode typeCode)<br>public StructureCode getBaseTypeCode( ) |

public static interface com.bea.language.java.IJavaStructureNodennit implements com.bea.languagejava.IJavaStructureNode

| | |
|---|---|
| Methods | public com.bea.language.java.IJavaStructureNode.IPackage getPackage( )<br>public void setPackage(<br>IJavaStructureNode.IPackage pkg)<br>public java.util.List getImports( )<br>public void setImports(<br>List imports)<br>public java.util.List getClasses( )<br>public void setClasses(<br>List classes) |

public static interface com.bea.languagejava.IJavaStructureNode.IPackage implements com.bea.languagejava.IJavaStructureNode

| | |
|---|---|
| Methods | public java.lang.String getName( )<br>public void setName(<br>String name) |

public static interface com.bea.languagejava.IJavaStructureNode.IImport implements com.bea.languagejava.IJavaStructureNode

| | |
|---|---|
| Methods | public java.lang.String getName( )<br>public void setName(<br>String name)<br>public boolean isMultiple( )<br>public void setMultiple(<br>boolean multiple) |

public static interface com.bea.language.java.IJavaStructureNode.IClass implements com.bea.languagejava.IJavaStructureNode

| | |
|---|---|
| Methods | public java.lang.String getName( )<br>public void setName(<br>String name)<br>public boolean isInterface( )<br>public void setInterface(<br>boolean interfaze)<br>public com.bea.language.java.IJavaStructureNode.IModifiers getModifiers( )<br>public void setModifiers(<br>IJavaStructureNode.IModifiers modifiers)<br>public java.util.List getDeclarations( )<br>public void setDeclarations(<br>List declarations)<br>public com.bea.language.java.IJavaStructureNode.IComment getComment( )<br>public void setComment(<br>IJavaStructureNode.IComment comment) |

public static interface com.bea.language.java.IJavaStructureNode.IMethod implements com.bea.language.java.IJavaStructureNode

| | |
|---|---|
| Methods | public java.lang.String getName( )<br>public void setName(<br>String name)<br>public java.lang.String getType( )<br>public void setType(<br>String type)<br>public com.bea.language.java.IJavaStructureNode.IModifiers getModifiers( )<br>public void setModifiers(<br>IJavaStructureNode.IModifiers modifiers)<br>public java.util.List getParameters( )<br>public void setParameters(<br>List parameters)<br>public com.bea.language.java.IJavaStructureNode.IComment getComment( )<br>public void setComment(<br>IJavaStructureNode.Comment comment) |

public static interface com.bea.language.java.IJavaStructureNode.IField implements com.bea.language.java.IJavaStructureNode

| | |
|---|---|
| Methods | public java.lang.String getName( )<br>public void setName(<br>String name)<br>public java.lang.String getType( )<br>public void setType(<br>String type)<br>public com.bea.language.java.IJavaStructureNode.IModifiers getModifiers( )<br>public void setModifiers(<br>IJavaStructureNode.IModifiers modifiers)<br>public com.bea.language.java.IJavaStructureNodeiComment getComment( )<br>public void setComment(<br>IJavaStructureNode.IComment comment) |

public static interface com.bea.language.java.IJavaStructureNode.IParameter implements com.bea.language.java.IJavaStructureNode

| | |
|---|---|
| Methods | public java.lang.String getName( )<br>public void setName(<br>String name)<br>public java.lang.String getType( )<br>public void setType(<br>String type)<br>public com.bea.language.java.IJavaStructureNode.IModifiers getModifiers( )<br>public void setModifiers(<br>IJavaStructureNode.IModifiers modifiers) |

public static interface com.bea.language.java.IJavaStructureNode.IModifiers implements com.bea.language.java.IJavaStructureNode

| | |
|---|---|
| Methods | public java.lang.String getAccess( )<br>public void setAccess(<br>String access)<br>public boolean isStatic( )<br>public void setStatic(<br>boolean _static)<br>public boolean isAbstract( )<br>public void setAbstract(<br>boolean _abstract)<br>public boolean isFinal( )<br>public void setFinal(<br>boolean _final)<br>public boolean isNative( )<br>public void setNative(<br>boolean _native)<br>public boolean isSynchronized( )<br>public void setSynchronized(<br>boolean _synchronized)<br>public boolean isTransient( )<br>public void setTransient(<br>boolean _transient)<br>public boolean isVolatile( )<br>public void setVolatile(<br>boolean _volatile)<br>public boolean isStrictFP( )<br>public void setStrictFP(<br>boolean _strictfp) |

public static interface com.bea.language.java.IJavaStructureNode.IComment implements com.bea.languagejava.IJavaStructureNode

| | |
|---|---|
| Methods | public java.util.List getTags( )<br>public void setTags(<br>List tags) |

public static interface com.bea.language.java.IJavaStructureNode.ITag implements com.bea.language.java.IJavaStructureNode

| | |
|---|---|
| Methods | public java.lang.String getName( )<br>public void setName(<br>String name)<br>public java.util.List getAttributes( )<br>public void setAttributes(<br>List attributes) |

public static interface com.bea.language.java.IJavaStructureNode.IAttribute implements com.bea.language.java.IJavaStructureNode

| | |
|---|---|
| Methods | public java.lang.String getName( )<br>public void setName(<br>String name)<br>public java.lang.String getValue( )<br>public void setValue(<br>String value) |

public interface com.bea.language.java.IJavaResolver

Allows an extender of the Java language to change the compile-time visible shape of the class. To change the run-time shape of the class, implement IJavaGenerator.

Objects are created by the ILangInfoFactory returned by LangInfoFactory.get( ).

Note that while all the methods below are defined in terms of adding new entities, extensions can also modify the entries already present. This should be done with great care, however, as such an operation has a high potential for confusing the (user) programmer.

| | |
|---|---|
| Methods | public void addTypes(<br>List types)<br>Adds top-level types to the file. Each entry must be an instance of ILangUserType .<br>public void updateSuperTypes(<br>ILangUserType outerType,<br>ILangResolver.ITypeResolver.SuperTypes superTypes)<br>Allows the extension to modify the superclass and/or interfaces of the given outer type.<br>public void addMemberTypes(<br>ILangUserType outerType,<br>Map types)<br>Adds member types to a type defined in the file. The given map is from string IDs to ILangUserType s.<br>public void addMemberFields(<br>ILangUserType outerType,<br>Map fields)<br>Adds member fields to a type defined in the file. The given map is from string IDs to ILangField s.<br>public void addMemberMethods(<br>ILangUserType outerType,<br>Map methods)<br>Adds member methods to a type defined in the file. The given map is from ILangMethod.ISignature s to ILangMethod s.<br>public void addConstructors(<br>ILangUserType outerType,<br>Map constructors)<br>Adds constructors to a type defined in the file. The given map is from IType (tuples of arguments) to ILangConstructor s.<br>public void addAnnotations(<br>ILangUserType outerType,<br>ILangAnnotation parent,<br>List children)<br>Adds additional children to an annotation defined in the file. If the name of the parent is ROOT_NAME, then that would be adding new tags. Otherwise, it would be adding new attributes. Each entry in the given list must be an instance of ILangAnnotation . |

public interface com.bea.language.java.IJavaLanguageFactory

Defines the shape of the Java language object, which can be cloned in order to create languages based on Java with annotations.

| | |
|---|---|
| Methods | public com.bea.language.ILangLanguage createInstance(<br>IJavaExtension extension)<br>Returns a new instance of the Java language with the given extensions. |

public interface com.bea.language.java.IJavaGenerator

Allows an extender of the Java language to change the run-time shape of the class. To change the compile-time shape of the class, implement IJavaResolver.

Objects are created by the IIRFactory returned by IRFactory.get( ).

Note that while all the methods below are defined in terms of adding new entities, extensions can also modify the entries already present. This should be done with great care, however, as such an operation has a high potential for confusing the (user) programmer.

| | |
|---|---|
| Methods | public void addTypes(<br>List types)<br>Adds top-level types to the file. Each entry must be an instance of IRClassDeclaration .<br>public void addBodyDeclarations(<br>IReferenceType outerType,<br>List decls)<br>Adds new members (types, fields, or methods), constructors, or initializer blocks to the body of the given class. Each entry must be an instanceof IRClassBodyDeclaration .<br>public void addAnnotations(<br>IDeclaredEntity entity,<br>IAnnotation parent,<br>List children)<br>Adds additional children to an annotation defined in the file. Each entry in the given list must be an instance of IRAnnotation .<br>public void addAnnotationAttributes(<br>IDeclaredEntity entity,<br>IAnnotation annotation,<br>List attributes)<br>Adds additional attributes to an annotation defined in the file. Each entry in the given list must be an instance of IRAnnotationAttribute . |

public interface com.bea.language.java.IJavaFeatureContext

Provides additional context to a Java feature.

| | |
|---|---|
| Methods | public com.bea.language.javalslavaExtension<br>getExtension( )<br>Returns the Java extension used to compile this file. |

public interface com.bea.language.java.IJavaFeature implements com.bea.language.feature.ILangFeature Defines extra context available to an extend feature of Java.

| | |
|---|---|
| Methods | public void setContext(<br>IJavaFeature.IContext context)<br>Sets the extra context available to Java features. |

public static interface com.bea.language.java.IJavaFeature.IContext

Defines the extra context available to this feature.

| | |
|---|---|
| Methods | public IDeclaredEntity getEntity(<br>IStructureFeature.IStructureNode node)<br>Returns the info shape for the entity in the given node. |

public interface combea.language.java.IJavaExtension

Defines the way to create extended versions of the Java language.

| | |
|---|---|
| Methods | public java.lang.Object clone( )<br>Returns a new copy of this extension that is ready for use on a particular file.<br>public com.bea.language.java.IJavaResolver getResolver( )<br>Returns the extensions to the resolve phase of Java compilation.<br>public com.bea.language.javanavaChecker getChecker( )<br>Returns the extension for the checking phase of Java compilation.<br>public com.bea.language.java.IJavaGenerator getGenerator( )<br>Returns the extensions to the codegen phase of Java compilation.<br>public com.bea.language.javalJavaFeature getFeature(<br>    Class clazz)<br>Returns an object that implements the given feature or null if the feature is not supported.<br>public com.bea.language.java.lJavaBuilder getBuilder( )<br>Returns the builder for the structure tree of the file. |

public interface com.bea.language.java.IJavaContext

Provides additional context to a Java extension.

| | |
|---|---|
| Methods | public com.bea.language.ILangLocator getLocator( )<br>Returns a locator that can provide text ranges for errors found by the framework.<br>public com.bea.language.java.I.JavaExtension getExtension( )<br>Returns the Java extension currently compiling.<br>public com.bea.languagejava.IJavaChecker getChecker( )<br>Returns the Java extension currently checking.<br>public IDeclaredEntity getEntity( )<br>Returns the entity whose annotations are currently being checked.<br>public IReferenceType resolveUserType(<br>    String type,<br>    IToken first,<br>    IToken last)<br>Returns the user defined type with the given name or null if none exists in this scope.<br>public void addImport(<br>    IRName name,<br>    boolean isMultiple)<br>Don't use this method. |

public interface com.bea.language.java.IJavaChecker

Allows a Java extension to perform further checks on the Java code. Diagnostics can be issued by calling Context. get( ).addDiagnostic( . . . ).

The container will make a depth-first traversal of the entities in the file, giving this extension checker a chance to perform checking on each of the entities found. During this process, the checker will be notified when the traversal is entering a particular type. Just for cleaniness, the container will check a type before it is entered (in theory, any such checking could be done in either startType or endType).

Each declared entity given will be either an IReferenceType, IField, IMethod, or IConstructor. It is not necessary to use instanceof, however, because IDeclaredEntity has methods that can determine what type of entity you have.

| | |
|---|---|
| Methods | public void startFile(<br>    IToken first,<br>    IToken last)<br>Performs checking before any types are examined.<br>public com.bea.language.schema.IGrammar getAnnotationGrammar(<br>    IDeclaredEntity entity,<br>    IToken first,<br>    IToken last)<br>Returns the grammar for the annotations above the given entity.<br>public void check(<br>    IDeclaredEntity entity,<br>    IToken first,<br>    IToken last)<br>Performs additional checking on the given entity.<br>public void startType(<br>    IReferenceType type,<br>    IToken first,<br>    IToken last)<br>Notifies the checker that we are about to begin checking the entities in the given type.<br>public void endType(<br>    IReferenceType type,<br>    IToken first,<br>    IToken last)<br>Notifies the checker that we have finished checking the entities in the given type.<br>public void endFile(<br>    IToken first,<br>    IToken last)<br>Performs checking after all types are examined. |

public interface com.bea.language.java.IJavaBuilder

| | |
|---|---|
| Methods | public com.bea.language.java.IJavaStructureNode rebuildStructure(<br>    IJavaStructureNode node)<br>Takes a proto-Java structure tree and rebuilds it into the proper shape for the language extension.<br>Parameters<br>    node - the root of the tree<br>Returns<br>    the new tree<br>public int mapTypeCode(<br>    int code)<br>Maps type codes for this unit into type codes for Java.<br>Parameters<br>    code - the type code for the language extension<br>Returns<br>    the type code for the Java language |

Package com.bea.language.schema

This package provides interfaces for building parsers and validity checkers for tree shaped data. Its classes and interfaces are described below.

public class com.bea.language.schema.SchemaFactory

Contains a reference to the singleton instance of the implementation of the ISchemaFactory interface.

| | |
|---|---|
| Constructors | public SchemaFactory( ) |
| Methods | public static com.bea.language.schema.ISchemaFactory get( )<br>Returns the singleton instance of ISchemaFactory .<br>public static void set(<br>    ISchemaFactory factory)<br>Sets the singleton instance of ISchemaFactory . This should be called only by the framework. |

public interface com.bea.language.schema.ISimpleType implements com.bea.language.schema.IContentType Represents a content type that is "simple" in the sense that its value is not parsed beyond tokenization on whitespace. Simple types are further categorized by whether they take their value as an atomic unit (after whitespace is transformed) or as a list of whitespace separated tokens.

| | |
|---|---|
| Methods | public boolean isAtomic( )<br>Determines whether this type takes its value as a single unit.<br>public boolean isList( )<br>Determines whether this type takes its value as a list of tokens. |

public interface com.bea.language.schema.ISimpleOrderedType implements com.bea.language.schema.ISimpleAtomicType Represents a simple atomic type whose value set can be ordered.

| | |
|---|---|
| Methods | public boolean isDecimal( )<br>Determines whether this is a decimal type.<br>public boolean isDateTime( )<br>Determines whether this is a date-time type.<br>public int compare(<br>Object value1,<br>Object value2)<br>Compares the given processed values and returns −1 for less than, 0 for equal, and 1 for greater than. |

public interface com.bea.language.schema.ISimpleListType implements com.bea.language.schema.ISimpleType Represents a simple type that takes its value as a whitespace separated list of tokens.

| | |
|---|---|
| Methods | public java.util.List compile(<br>Collection tokens)<br>Compiles the given value, which has been tokenized by whitespace as would StringTokenizer, into an intermediate form. If the value is found to be invalid, the checker should emit an error into the compilation context and return null.<br>Each token is an instance of the IListToken class below. These can be created by the schema factory. |

public static interface com.bea.language.schema.ISimpleListType.IListToken

Represents a single token in the list to be compiled.

| | |
|---|---|
| Methods | public java.lang.String getValue( )<br>Returns the text of this token.<br>public IToken getFirst( )<br>Returns the first underlying token that makes up this token.<br>public IToken getLast( )<br>Returns the last underlying token that makes up this token. |

public interface com.bea.language.schema.ISimpleDecimalType implements com.bea.language.schema.ISimpleOrderedType Represents an ordered atomic type for decimal numbers.

| | |
|---|---|
| Methods | public int getTotalDigits(<br>Object value)<br>Returns the total number of digits in the given compiled value.<br>public int getFractionDigits(<br>Object value)<br>Returns the total number of fractional digits in the compiled value. |

public interface com.bea.language.schema.ISimpleDateTimeType implements com.bea.language.schema.ISimpleOrderedType Represents an ordered atomic type for dates and times.

public interface com.bea.language.schema.ISimpleAtomicType implements com.bea.language.schema.ISimpleType Represents a simple type that takes its value as a single atomic unit, after whitespace has been transformed.

| | |
|---|---|
| Methods | public boolean isOrdered( )<br>Determines whether this type is ordered.<br>public int getWhitespaceType( )<br>Returns the operation to perform on the whitespace before validity checking a value of this type.<br>public java.lang.Object compile(<br>String value,<br>IToken first,<br>IToken last)<br>Compiles the given value into an intermediate form after transforming the whitespace as per the whitespace type. If the value is found to be invalid, the checker should emit an error into the compilation context and return null.<br>The returned value may be used for additional checking such as range checks or comparing to the fixed value.<br>public java.lang.Object compileTransformed(<br>String value,<br>IToken first,<br>IToken last)<br>Like compile, but assumes that the value has already been transformed for whitespace. This is intended for use by types that aggregate access to another type. Clients should normally call compile instead. |
| Fields | public static final WHITESPACE_PRESERVE<br>Indicates that whitespace should not be modified.<br>public static final WHITESPACE_REPLACE<br>Indicates that all whitespace should be transformed into space characters.<br>public static final WHITESPACE_COLLAPSE<br>Indicates that leading and trailing whitespace should be removed and each inner whitespace sequence should be transformed into a single space character. |

public interface com.bea.language.schema.ISchemaFactory

Contains methods for creating schemas, types, and related objects. Built-in types and grammars are provided to handle (essentially) all of XML Schema and DTD. Note: collections passed in to create*( ) methods are not cloned, so it is caller's responsibility to maintain them.

| | |
|---|---|
| Methods | public com.bea.language.schema.IQualifiedName createQualifiedName(<br>String qualifier,<br>String name)<br>Returns a qualified name with the given parts. The qualifier should be null if no qualifier was present.<br>public com.bea.language.schema.IElementSchema createElementSchema(<br>IQualifiedName name,<br>IElementType type,<br>Object defValue,<br>boolean fixed)<br>Returns an element schema with the given parts. Note that the default value must match the compilation type of the element. |

-continued

```
public com.bea.language.schema.IElementType createElementType(
    IAttributeGrammar attrGrammar,
    IGrammar bodyGrammar)
Returns an element type with the given parts.
public com.bea.language.schema.IAttributeSchema createAttributeSchema(
    IQualifiedName name,
    IContentType type,
    Object defValue,
    boolean fixed)
Returns an attribute schema with the given parts. Note that the default value must match the
compilation type of the attribute.
public com.bea.language.schema.IAttributeGrammar createEmptyAttributeGrammar( )
Returns a grammar that accepts no attributes.
public com.bea.language.schema.IAttributeGrammar createAnyAttributeGrammar( )
Returns a grammar that accepts any attributes.
public com.bea.language.schema.IAttributeGrammar createAttributeGrammar(
    Collection attrOccurs)
Returns a grammar for the attributes with the given specifications. Each object in the
collection must be an instance of IAttributeOccurance.
This grammar will verify that each attribute appears the number of times described in the
specification. Note that more complex grammars could be created, but this interface does not
provide that.
public com.bea.language.schema.ISchemaFactory.IAttributeOccurance
createAttributeOccurance(
    IAttributeSchema attrSchema,
    int useType)
Returns an attribute occurance with the given parts.
public com.bea.language.schema.IGrammar createEmptyGrammar( )
Returns a grammar for a body that can contain no elements or non-whitespace content.
public com.bea.language.schema.IGrammar createAnyGrammar( )
Returns a grammar that accepts any content and elements.
public com.bea.language.schema.IGrammar createSimpleGrammar(
    IContentType type)
Returns a grammar for a body that can contain only content of the given type (i.e., no
elements).
public com.bea.language.schema.IGrammar createComplexGrammar(
    ISchemaFactory.IGroupOccurance occurs,
    boolean mixed)
Returns a grammar for the group of elements with the given specification. The mixed
parameter determines whether non-whitespace content is allowed between the elements.
Note that an "all" group is allowed only as the top-most group in the specification.
public com.bea.language.schema.ISchemaFactory.IElementOccurance
createElementOccurance(
    IElementSchema element,
    int minOccurs,
    int maxOccurs)
Returns an element occurance with the given parts.
public com.bea.language.schema.ISchemaFactory.IGroupOccurance
createSequenceOccurance(
    Collection members,
    int minOccurs,
    int maxOccurs)
Returns a sequence occurance with the given parts.
public com.bea.language.schema.ISchemaFactory.IGroupOccurance
createChoiceOccurance(
    Collection members,
    int minOccurs,
    int maxOccurs)
Returns a choice occurance with the given parts.
public com.bea.language.schema.ISchemaFactory.IGroupOccurance
createAllOccurance(
    Collection members,
    int minOccurs,
    int maxOccurs)
Returns an all occurance with the given parts. Note that the members must be element
occurances whose max occurs is not greater than one. Futhermore, this can only be the top-
most group in a grammar.
public com.bea.language.schema.ILanguageType createLanguageType(
    IQualifiedName name,
    ILangLanguage language)
Returns a language type for the given language.
public com.bea.language.schema.ISimpleDecimalType createDecimalType(
    int type)
Returns a type object for the decimal type with the given code.
public com.bea.language.schema.ISimpleDateTimeType createDateTimeType(
    int type)
Returns a type object for the date-time type with the given code.
public com.bea.language.schema.ISimpleOrderedType createOrderedType(
    int type)
Returns a type object for the ordered type with the given code.
```

-continued

```
public com.bea.language.schema.ISimpleAtomicType createAtomicType(
    int type)
Returns a stype object for the atomic type with the given code.
public com.bea.language.schema.ISimpleType createAnySimpleType( )
Returns a type object for the any simple type.
public com.bea.language.schema.ISimpleType createSimpleType(
    int type)
Returns a type object for the given built-in simple type.
public com.bea.language.schema.ISimpleListType createListType(
    IQualifiedName name,
    ISimpleAtomicType type)
Returns a type object for a whitespace delimited list of values of the given type.
public com.bea.language.schema.ISimpleListType.IListToken createListToken(
    String value,
    IToken first,
    IToken last)
Returns a list token that can be passed to the compile method of a list type.
public com.bea.language.schema.ISimpleType createUnionType(
    IQualifiedName name,
    Collection type)
Returns a type object whose value set is the union of the value sets of the given simple types.
public com.bea.language.schema.ISimpleAtomicType createPatternRestrictedType(
    IQualifiedName name,
    ISimpleAtomicType type,
    String pattern,
    boolean caseSensitive,
    String message)
Returns a type object whose value set is the value set of the given type intersected with the
given pattern.
public com.bea.language.schema.ISimpleAtomicType
createEnumerationRestructedType(
    IQualifiedName name,
    ISimpleAtomicType type,
    Object[] values)
Returns a type object whose value set is the value set of the given type intersected with the
given list of possible values. Each value must be of the compiled type of the underlying type.
public com.bea.language.schema.ISimpleType createLengthRestrictedType(
    IQualifiedName name,
    ISimpleType type,
    int minLength,
    int maxLength)
Returns a type object whose value set is the value set of the given type intersected with the
values whose lengths are in the given range. Note that length means the number of
characters for atomic types but the number of non-whitespace tokens for list types.
public com.bea.language.schema.ISimpleDecimalType createPrecisionRestrictedType(
    IQualifiedName name,
    ISimpleDecimalType type,
    int maxTotalDigits,
    int maxFractionDigits)
Returns a type object whose value set is the value set of the given decimal type restricted to
the given numbers of total and fractional digits. Note that -1 can be passed to indicate an
unbounded maximum.
public com.bea.language.schema.ISimpleOrderedType createRangeRestrictedType(
    IQualifiedName name,
    ISimpleOrderedType type,
    Object minValue,
    boolean minInclusive,
    Object maxValue,
    boolean maxInclusive)
Returns a type object whose value set is the value set of the given ordered type restricted to
the given range of values. Either value can be null to indicate no bound on that side. Note that
these values' types must match the compilation type of type.
public com.bea.language.schema.ISimpleAtomicType
createWhitespaceRestrictedType(
    IQualifiedName name,
    ISimpleAtomicType type,
    int wspaceType)
Returns a type object whose value set is the value set of the given atomic type with the
whitespace transformation changed as indicated.
public java.lang.String transformWhitespace(
    String value,
    int wspaceType)
Performs the given whitespace transformation on the value.
Fields    public static final TYPE_DECIMAL
Represents the type of decimal numbers.
public static final TYPE_INTEGER
Represents the type of decimal numbers without fractions.
public static final TYPE_NONNEGATIVEINTEGER
Represents the type of integers that are not positive.
public static final TYPE_NONPOSITIVEINTEGER
```

-continued

Represents the type of integers that are not negative.
public static final TYPE_NEGATIVEINTEGER
Represents the type of integers that are negative.
public static final TYPE_POSITIVEINTEGER
Represents the type of integers that are not positive.
public static final TYPE_LONG
Represents the type of integers that are limited to 64 bits.
public static final TYPE_UNSIGNEDLONG
Represents the type of integers that are limited to 64 unsigned bits.
public static final TYPE_INT
Represents the type of integers that are limited to 32 bits.
public static final TYPE_UNSIGNEDINT
Represents the type of integers that are limited to 32 unsigned bits.
public static final TYPE_SHORT
Represents the type of integers that are limited to 16 bits.
public static final TYPE_UNSIGNEDSHORT
Represents the type of integers that are limited to 16 unsigned bits.
public static final TYPE_BYTE
Represents the type of integers that are limited to 8 bits.
public static final TYPE_UNSIGNEDBYTE
Represents the type of integers that are limited to 8 unsigned bits.
public static final TYPE_DATETIME
Represents the XML date-time type.
public static final TYPE_TIME
Represents the XML time type.
public static final TYPE_DATE
Represents the XML date type.
public static final TYPE_GYEARMONTH
Represents the XML year-month type.
public static final TYPE_GYEAR
Represents the XML year type.
public static final TYPE_GMONTHDAY
Represents the XML month-day type.
public static final TYPE_GDAY
Represents the XML day type.
public static final TYPE_GMONTH
Represents the XML month type.
public static final TYPE_FLOAT
Represents the IEEE single precision floating point type.
public static final TYPE_DOUBLE
Represents the IEEE double precision floating point type.
public static final TYPE_DURATION
Represents the XML Schema duration type.
public static final TYPE_STRING
Represents the type of strings with whitespace preserved.
public static final TYPE_NORMALIZEDSTRING
Represents the type of strings with whitespace replaced.
public static final TYPE_TOKEN
Represents the type of strings with whitespace collapsed.
public static final TYPE_LANGUAGENAME
Represents the type of identifiers for natural languages.
public static final TYPE_BOOLEAN
Represents the boolean type.
public static final TYPE_HEXBINARY
Represents the type of binary numbers encoded in hex.
public static final TYPE_BASE64BINARY
Represents the type of binary numbers encoded in base 64.
public static final TYPE_URI
Represents the type of all valid URIs.
public static final TYPE_XML_NMTOKEN
Represents the type of tokens whose characters can legally appear in an XML name.
public static final TYPE_XML_NAME
Represents the type of valid names in XML documents.
public static final TYPE_XML_NCNAME
Represents the type of valid XML names without colons.
public static final TYPE_XML_QNAME
Represents the type of qualified names, that is, a URI followed by a colon followed by an NCName.
public static final TYPE_JAVA_ID
Represents the type of valid Java identifiers.
public static final TYPE_JAVA_NAME
Represents the type of (optionally) qualified Java names.
public static final TYPE_ANY
Represents the any simple type.
public static final TYPE_XML_NMTOKENS
Represents a list of the NMToken type.

public static interface com.bea.language.schema.ISchema-Factory.IAttributeOccurance Provides a specification for how an attribute is allowed to appear in the attribute list of a particular element.

| | |
|---|---|
| Methods | public com.bea.language.schema.IAttributeSchema getAttribute( )<br>Returns the schema for the attribute in question.<br>public int getUseType( )<br>Returns the rule for how it can be used. |
| Fields | public static final USE_PROHIBITED<br>Indicates that the attribute cannot be used.<br>public static final USE_OPTIONAL<br>Indicates that the attribute can optionally be used.<br>public static final USE_REQUIRED<br>Indicates that the attribute must be used. |

public static interface com.bea.language.schemanchema-Factory.IOccurance

Provides a specification for how an element or group of elements is allowed to appear in the body of a particular element.

| | |
|---|---|
| Methods | public boolean isElement( )<br>Determines whether this is an IElementOccurance.<br>public boolean isGroup( )<br>Determines whether this is an IGroupOccurance.<br>public int getMinOccurs( )<br>Returns the minimum number of times this group or element may occur. This must be less than or equal to max occurs.<br>public int getMaxOccurs( )<br>Returns the maximum number of times this group or element may occur. This must be greater than or equal to min occurs. |

public static interface com.bea.language.schernanchema-Factory.IElementOccurance implements com.bea.languag-e.schema.ISchemaFactory.IOccuranee Provides a specification for how an element is allowed to appear in the body of a particular element.

| | |
|---|---|
| Methods | public com.bea.language.schema.IElementSchema getElement( )<br>Returns the schema for the element in question. |

public static interface com.bea.language.schema.ISchema-Factory.IGroupOccurance implements com.bea.language.schema.ISchemaFactory.IOccurance Provides a specification for how a group is allowed to appear in the body of a particular element.

| | |
|---|---|
| Methods | public int getGroupType( )<br>Returns the type (i.e. operation) of this group.<br>public java.util.Collection getGroupMembers( )<br>Returns the members of this group (i.e. the groups or elements to which the group rule applies). |
| Fields | public static final TYPE_SEQUENCE<br>Indicates that this group allows the members to appear in the order provided to it.<br>public static final TYPE_CHOICE<br>Indicates that this group allows one of the members to occur for each instance of the group.<br>public static final TYPE_ALL<br>Indicates that this group allows its members to occur in any order. Futhermore, the members must all be elements. |

public interface com.bea.language.schema.IQualifiedName

Represents a namespace qualified name of an element in the tree.

| | |
|---|---|
| Methods | public java.lang.String getQualifier( )<br>Returns the qualifier on the name.<br>public java.lang.String getName( )<br>Returns the name without the qualifier. |

public interface com.bea.language.schema.ILanguageType implements com.bea.language.schema.IContentType Represents a content type is parsed and checked as a nested language of the host language.

| | |
|---|---|
| Methods | public com.bea.language.ILangLanguage getLanguage( )<br>Returns the language object for this content type. |

public interface com.bea.language.schema.IGrammar

Encapsulates the rules about how content and elements can appear in the source. Each instance of the grammar is intended to operate as a finite state machine. (Although it need not be implemented as one.)

The only restriction built into this interface is that it must be possible to determine the schema for the next element given only its name and the names of the previous elements. Hence, a finite state machine is almost always sufficient for describing the grammar.

Information about the sequence of names found is delivered in the requests that are made of the grammar. Whenever content is found, a call is made to getNextContent. Whenever an element is found, a call is made to getNextElement.

| | |
|---|---|
| Methods | public java.lang.Object clone( )<br>Returns a new instance of the state machined that is ready for use.<br>public boolean begin(<br>IToken first,<br>IToken last)<br>Notifies the machine that processing will now begin. The return value indicates whether no errors were found.<br>public com.bea.language.schema.IContentType getNextContent(<br>IToken first,<br>IToken last)<br>Returns the type for the content that appears next or null if it is illegal to have content here.<br>public com.bea.language.schema.IElementSchema getNextElement(<br>IQualifiedName name,<br>IToken first,<br>IToken last)<br>Returns the schema for the element with the given name or null if this element does not match the grammar.<br>public boolean end(<br>IToken first,<br>IToken last)<br>Notifies the machine that all input has been seen. The return value indicates whether no errors were found. |

public interface com.bea.language.schema.IElementType

Provides information about the legal content of an element.

| | |
|---|---|
| Methods | public com.bea.language.schema.IAttributeGrammar getAttributeGrammar( )<br>Returns a grammar for the attributes of this element. |

-continued

| | |
|---|---|
| | public com.bea.language.schema.IGrammar getBodyGrammar( ) Returns a grammar for the body of this element. |

public interface com.bea.language.schema.IElementSchema

Provides information about the legal shape of an element in the tree.

| | |
|---|---|
| Methods | public com.bea.language.schema.IQualifiedName getName( )<br>Returns the qualified name of this element.<br>public com.bea.language.schema.IElementType getType( )<br>Returns the type of this element.<br>public java.lang.Object getDefaultValue( )<br>Returns the default value of this element or null if it has none. The default values type must match the compilation type of the element.<br>public boolean isFixed( )<br>Determines whether the value of this element must be equal to its default value. |

public interface com.bea.language.schema.IContentType

Provides information about the legal values for "content" in the tree. Content appears as the value of an attribute or in the body of an element.

We separate content types into two varieties: simple and language. The former parses as a string of whitespace separated text and is checked for validity by calling a method. The latter uses its own parser and type checker, which can be completely generic.

| | |
|---|---|
| Methods | public com.bea.language.schema.IQualifiedName getName( )<br>Returns the name of this type.<br>public boolean isSimple( )<br>Determines whether this is a simple content type.<br>public boolean isLanguage( )<br>Determines whether this is a language content type. |

public interface com.bea.language.schema.IAttributeSchema

Provides information about the legal shape of an attribute on an element in the tree.

| | |
|---|---|
| Methods | public com.bea.language.schema.IQualifiedName getName( )<br>Returns the qualified name of this attribute. Normally, the qualifier on the name will be null.<br>public com.bea.language.schema.IContentType getType( )<br>Returns the type of this attribute.<br>public java.lang.Object getDefaultValue( )<br>Returns the default value of this element or null if it has none. The default value's type must<br>match the compiled type of the attribute.<br>public boolean isFixed( )<br>Determines whether the value of this element must be equal to its default value. |

public interface com.bea.language.schema.IAttributeGrammar

Encapsulates the rules about how attributes can appear on a particular element in the tree. As with IGrammar, this grammar is intended to operate as a finite state machine.

| | |
|---|---|
| Methods | public java.lang.Object clone( )<br>Returns a new instance of the state machined that is ready for use.<br>public boolean begin(<br>IToken first,<br>IToken last)<br>Notifies the machine that processing will now begin.<br>The return value indicates whether no errors were found.<br>public com.bea.language.schema.IAttributeSchema getNextAttribute(<br>IQualifiedName name,<br>IToken first,<br>IToken last)<br>Returns the schema for the attribute that with the given name or null if this attribute does not match the grammar.<br>public boolean end(<br>IToken first,<br>IToken last)<br>Notifies the machine that all input has been seen.<br>The return value indicates whether no errors were found. |

Package com.bea.language.transform

This package provides interfaces for building transforming compilers that transform a source language to a target language. Its classes and interfaces are described below.

public class com.bea.language.transform.TransformTargetScanner

Exposes a base level ITransformTargetScanner implementation for use in implementing target language specific versions. This implementation maintains the list of tokens, and implements a simple fake token type for insertion among real tokens gathered from the source language parse.

| | |
|---|---|
| Constructors | public TransformTargetScanner( ) |
| Methods | public static void set(<br>TransformTargetScanner.IBaseTransformTargetScanner base)<br>public static com.bea.language.transform.ITransformTargetScanner<br>createBaseScanner( ) |

public static interface com.bea.language.transform.TransformTargetScanner.IBaseTransformTarget Scanner implements com.bea.language.transform.ITransformTargetScanner

| | |
|---|---|
| Methods | public java.lang.Object clone( )<br>Create a new instance of this base target scanner. |

public interface com.bea.language.transform.ITransformTargetScanner

An in memory scanner that allows one language to transform its parse tree into a list of tokens for parsing by a target language.

| | |
|---|---|
| Methods | public void addToken(<br>IToken token)<br>Adds a token scanned from the document, already in the target language, presumably by way of a nested language in the original parse.<br>public void addToken(<br>int type,<br>String text)<br>Adds a fake token to the scanner.<br>Parameters |

-continued

| | |
|---|---|
| | type - public token type exposed in the target language's public API<br>text - text string of the token, or null if no string applies<br>public void addToken(<br>int type,<br>String text,<br>IToken start,<br>IToken end)<br>Adds a fake token to the scanner, with a given range in the original file.<br>Parameters<br>type - public token type exposed in the target language's public API<br>text - text string of the token, or null if no string applies<br>start - starting token of the range (from source language parse)<br>end - ending token of the range (from source language parse)<br>public IToken getNextToken( )<br>Returns the next token in the stream or null if the end has been reached. Each token returned will be either a normal token from the scripting scanner or a fake token produced by the transform. The latter tokens will implement the ITransform Token interface. For these tokens, the provided text must be used instead of requesting the text from the file. |

public static interface com.bea.language.transform.ITransformTargetScanner.ITransformToken Extends IToken to provide text for tokens that did not come from the real source code.

| | |
|---|---|
| Methods | public java.lang.String getText( )<br>Returns the text of this token. |

public interface com.bea.language.transform.ITransformSourceScanner

Supports a simple scan of a section of the source file being transformed, returning language native tokens of the target language for use in the transform.

| | |
|---|---|
| Methods | public IToken getNextToken( )<br>Returns the next token in the input stream or null if the end has been reached. This token should have been added to the token set. |

public interface com.bea.language.transform.ILangTransformParser implements com.bea.language.ILangParser A parser that allows its tokens to be supplied by a transform scanner. ILangTransformCompiler.getParser( ) returns an ILangParser that may be cast to ILangTransformParser.

| | |
|---|---|
| Methods | public com.bea.language.transform.ITransformTargetScanner createTransformScanner( )<br>Creates a new transform scanner for this parser. When the parse( ) method on this parser is called, it will read tokens from the transform scanner.<br>Returns<br>a language specific transform scanner |

public interface com.bea.language.transform.ILangTransformLanguage implements com.bea.language.ILangLanguage Marker interface for a language that returns an ILangTransformCompiler from its getCompiler( ) method.

public interface com.bea.language.transform.ILangTransformCompiler implements com.bea.language.ILangCompiler ILangTransformLanguage.getCompiler returns an ILangCompiler which may be cast to an ILangTransformCompiler.

| | |
|---|---|
| Methods | public com.bea.language.transform.ITransformSourceScanner getScanner(<br>ILangReader reader)<br>Returns a new file scanner for this language. |

Package com.bea.language.typeinfo

This package provides interface for languages that need to access or manipulate type information. Its classes and interfaces are described below.

public interface com.bea.language.typeinfo.ILangTypeNamespace

Exposes additional methods available to languages.

| | |
|---|---|
| Methods | public void setTypes(<br>List types)<br>Sets the types of the file being compiled.<br>public void resolve(<br>ILangResolver.ITypeResolver resolver,<br>IReferenceType refType)<br>Performs complete resolution of the given type using the given<br>resolver. This is used for resolving types that are not visible in the namespace and have special context that is needed when resolving.<br>If this attempts to resolve a type that is currently resolving, then an exception will be thrown.<br>This situation indicates that a cyclic dependency has been encountered in the files.<br>PHASE: resolve, check<br>Parameters<br>resolver - The resolver to use for resolving this type.<br>refType - The type to resolve.<br>public void addAllMembersDependency(<br>IReferenceType target)<br>Adds a dependency on all members of the given type.<br>public com.bea.language.info.ILangInfoFactory getFactory( )<br>Returns the factory for type namespace objects.<br>public IType getType(<br>String signature)<br>Returns the type object corresponding to the given signature.<br>public boolean setExternalFile(<br>ILangUserType type,<br>String path)<br>Used to update the file for inner class .class files.<br>public !Name getClassName(<br>IFile file)<br>Get the expected name of a class defined in the given file. |

Package com.bea.Ianguage.xscript

This package provides interfaces for accessing and manipulating XScript code (JavaScript with native XML support). Its classes and interfaces are described below.

public class com.bea.language.xscript.XScriptLanguageFactory

Contains the reference to the template instance of the Java language.

| | |
|---|---|
| Constructors | public XScriptLanguageFactory( ) |
| Methods | public static com.bea.language.xscript.IXScriptLanguageFactory get( )<br>Returns a reference to the implemention of IJavaLanguageFactory . |

```
public static void set(
        IXScriptLanguageFactory instance)
Sets the reference to the implementation of
IJavaLanguageFactory . This will be called once when
the implementation class is loaded.
This should not be called but by the framework.
```

public interface com.bea.language.xscript.IXScriptLanguageFactory

Defines the shape of the XScript language object, which can be cloned in order to create languages based on XScript with annotations.

```
Methods   public com.bea.language.ILangLanguage createInstance(
                  IJavaExtension extension)
          Returns a new instance of the Java language with the given
          extensions.
```

public interface com.bea.language.xscript.IXSCodeBlock

```
Methods   public void setName(
                  String icbName)
          public java.lang.String getName( )
          public void setFunctionType(
                  byte icbFunctionType)
          public byte getFunctionType( )
          public void setICode(
                  byte[ ] icbICode)
          public byte[ ] getICode( )
          public void setICodeTop(
                  int icbICodeTop)
          public int getICodeTop( )
          public void setStringTable(
                  String[ ] icbStringTable)
          public java.lang.Stringa getStringTable( )
          public void setStringTableIndex(
                  int icbStringTableIndex)
          public int getStringTableIndex( )
          public void setNumberTable(
                  Number[ ] icbNumberTable)
          public java.lang.Number[ ] getNumberTable( )
          public void setNumberTableIndex(
                  int icbNumberTableIndex)
          public int getNumberTableIndex( )
          public void setMaxStack(
                  int icbMaxStack)
          public int getMaxStack( )
          public void setMaxLocals(
                  int icbMaxLocals)
          public int getMaxLocals( )
          public void setMaxTryDepth(
                  int icbMaxTryDepth)
          public int getMaxTryDepth( )
          public com.bea.language.xscript.IXSCodeBlock[ ] create-
          CodeBlocks(
                  int entries)
          public void setNestedFunctions(
                  IXSCodeBlocka icbNestedFunctions)
          public com.bea.language.xscript.IXSCodeBlock[ ] get-
          NestedFunctions( )
          public void setVariableTable(
                  String[ ] icbVariableTable)
          public java.lang.Stringa getVariableTable( )
          public void setVariableIndex(
                  int icbVariableIndex)
          public int getVariableIndex( )
          public void setSourceFile(
                  String icbSourceFile)
          public java.lang.String getSourceFile( )
          public void setLineNumberTable(
                  Hashtable icbSLineNumberTable)
          public java.util.Hashtable getLineNumberTable( )
```

```
          public void markAsValid( )
          public byte[ ] serialize( )
          public com.bea.language.xscript.IXSCodeBlock deserialize(
                  byte[ ] serializedData)
Fields    public static final FUNCTION_STATEMENT
          There are three types of functions that can be defined. The
          first is a function statement. This is a function appearing as a
          top-level statement (i.e., not nested inside some other statement)
          in either a script or a function. The second is a function
          expression, which is a function appearing in an expression
          except for the third type, which is... The third type is a function
          expression where the expression is the top-level expression
          in an expression statement. The three types of functions have
          different treatment and must be distinguished.
          public static final FUNCTION_EXPRESSION
          public static final FUNCTION_EXPRESSION_STATEMENT
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for editing a source code file, comprising:

modifying the source code file using a language-independent source code editor, wherein the language-independent source code editor does not include a language-specific lexical analyzer or parser;

sending a change notification to an extensible multi-language compiler framework identifying a changed file, changed text, and type of change, wherein the editor communicates to the compiler framework using language-independent metadata, and wherein the compiler framework provides a stream of token nodes, supports mixing and nesting of languages within a source file, and provides the editor with information about the source file, comprising signatures of classes defined by the source file, errors found in the source file, stacks of nested languages at any point in the source file, and information exposed by any language;

retokenizing the source code file and updating token and node information;

enqueueing a task for the extensible multi-language compiler framework to complete compilation in a background thread;

repainting a screen giving immediate feedback to a user; and emptying enqueued tasks and completing remaining steps in the background thread;

wherein the extensible multi-language compiler framework has error correction in code-generation, permitting the user to run code even if there is an error in the code;

wherein a thread pool allows compilation of multiple files to be performed in parallel;

wherein a type cache contains signatures for classes.

2. The method of claim 1, wherein the step of completing remaining steps in the background thread comprises:

compiling one or more changed files in the background thread;

notifying the editor and extensible multi-language compiler framework of changes and indicating which files have changed;

re-examining the changed files and merging changes with an internal representation of the parse tree; and repainting the screen showing a visual representation of parsing results.

3. The method of claim 1, wherein integrating a new language does not require separate instructions to enable compiling or editing of the new language.

4. The method of claim 1, further comprising displaying errors for mismatched start and end extensible markup language ("XML") tags embedded in the source code and performing auto-completion of XML tags embedded in the source code.

5. The method of claim 4, wherein the displaying and performing is available independent of the host language embedding XML.

6. The method of claim 1, wherein the compiler framework enables reparsing in substantially real-time with no performance degradation noticeable to the user.

7. The method of claim 1, wherein the compiler framework enables the editor to provide visual indication of errors throughout a source file with mixed languages.

8. The method of claim 1, wherein the compiler framework keeps track of errors in all source files in a project so that the user can have a complete list of all errors in opened and unopened source code files in a project.

9. The method of claim 1, wherein most errors cause only a single error message, with the parser continuing as if the error had not occurred.

10. The method of claim 1, wherein the compiler framework allows an outer language compiler to pass off processing of a section of a document to an inner language compiler.

11. The method of claim 10, wherein a parse tree produced by the inner compiler is available to the outer compiler.

12. The method of claim 11, wherein either the inner compiler or the outer compiler determines where the span of the inner compiler's language content ends.

13. The method of claim 1, wherein the compiler framework includes a parser generator and a scanner generator.

14. The method of claim 13, wherein generated parsers are able to recover from all single token errors and missing identifiers that occur during code completion.

15. The method of claim 1, wherein the compiler framework provides the editor with the names of all classes and packages in a project and the errors found in any source files in the project.

16. The method of claim 1, wherein after the compiler framework is notified of a change to a file, the information about the file is updated within a time limit for a single-file recompile.

17. The method of claim 16, wherein after the file is recompiled, the compiler framework provides the editor with a list of changes that occurred to the file information.

18. The method of claim 1, wherein the compiler framework includes a project compiler, wherein the project compiler contains a list of source directories and a class path and maintains a type cache which contains Java signatures for all of the classes in a project.

19. The method of claim 18, wherein the type cache is indexed by file name and by class name, and maintains a current list of errors and a list of dependencies.

20. The method of claim 19, wherein the project compiler and the type cache are serializable.

21. The method of claim 1, wherein a file compiler is used to perform compilation of a single source file.

22. The method of claim 21, wherein the file compiler supports interoperation of different languages by using a common intermediate language.

23. The method of claim 21, wherein the file compiler remembers where the language nesting occurs for reuse on subsequent parses.

24. The method of claim 23, wherein the outer language implements a name resolution interface to allow the inner language to resolve references to names defined outside of the nested language.

25. The method of claim 1, wherein all parsing is performed on background threads.

26. The method of claim 1, wherein a change to one file results in several files being recompiled because of dependencies between files.

27. The method of claim 1, wherein the editor generates change notifications for each item it identifies that has changed.

28. A system, comprising:

one or more compilers and one or more processors, wherein the compilers, executed by the one or more processors, support mixing and nesting of languages within a source file and provide streams of token nodes;

an extensible multi-language compiler framework, wherein the compiler framework provides a language-independent source code editor with information about the source file, comprising signatures of classes defined by the source file, errors found in the source file, stack of nested languages at any point in the source file, and information exposed by any languages;

wherein the language-independent source code editor does not include a language-specific lexical analyzer or parser;

wherein the language-independent source code editor communicates to the compiler framework using language-independent metadata identifying a changed file, changed text, and type of change;

wherein the extensible multi-language compiler framework has error correction in code-generation, permitting a user to run code even if there is an error in the code;

wherein the compiler framework retokenizes the source code file and updates token and node information;

wherein the compiler framework enqueues a task from the compiler framework to complete compilation in a background thread;

wherein the language-independent source code editor repaints a screen (living immediate feedback to a user;

wherein the compiler framework empties enqueued tasks and completes remaining steps in the background thread;

wherein a thread pool allows compilation of multiple files to be performed in parallel; and wherein a type cache contains signatures for classes.

29. The system of claim 28, wherein integrating a new language does not require separate instructions to enable compiling or editing of the new language.

30. The system of claim 28, wherein the compiler framework reparses in substantially real-time with no performance degradation noticeable to the user.

31. The system of claim 28, wherein the compiler framework enables the language-independent source code editor to provide visual indication of errors throughout a source file with mixed languages.

32. The system of claim 28, wherein the compiler framework keeps track of errors in source files in a project so that the user can have a list of errors in opened and unopened source code files in a project.

33. The system of claim 28, wherein the compiler framework provides the source code editor with names of classes and packages in a project and errors found in any source files in the project.

34. The system of claim 33, wherein after the compiler framework is notified of a change to a file, the information about the file is updated within a time limit for a single-file recompile.

35. The system of claim 34, wherein after the file is recompiled, the compiler framework provides the source code editor with a list of changes that occurred to the file information.

36. The system of claim 28, wherein the compiler framework includes a project compiler, wherein the project compiler contains a list of source directories and a class path and maintains a type cache which contains signatures for classes in a project.

37. A non-transitory computer readable medium having instructions stored thereon that, when executed by a processor, cause the processor to:

modify a source code file using a language-independent source code editor, wherein the language-independent source code editor does not include a language-specific lexical analyzer or parser;

send a change notification to an extensible multi-language compiler framework identifying a changed file, changed text, and type of change, wherein the editor communicates to the compiler framework using language-independent metadata, and wherein the compiler framework provides a stream of token nodes, supports mixing and nesting of languages within a source file, and provides the editor with information about the source file, comprising signatures of classes defined by the source file, errors found in the source file, stack of nested languages at any point in the source file, and information exposed by any language;

retokenize the source code file and update token and node information;

enqueue a task for the extensible multi-language compiler framework to complete compilation in a background thread;

repaint a screen giving immediate feedback to a user; and empty enqueued tasks and completing remaining steps in the background thread;

wherein the extensible multi-language compiler framework has error correction in code-generation, permitting the user to run code even if there is an error in the code;

wherein a thread pool allows compilation of multiple files to be performed in parallel;

wherein a type cache contains signatures for classes.

38. The non-transitory computer readable medium of claim 37, wherein the instructions further cause the processor to have the compiler framework provide the editor with the names of all classes and packages in a project and the errors found in any source files in the project.

* * * * *